US012350202B2

(12) United States Patent
Smith

(10) Patent No.: US 12,350,202 B2
(45) Date of Patent: Jul. 8, 2025

(54) MEDICAL EXAMINATION TABLE WITH RETRACTABLE MOVING WHEELS

(71) Applicant: Midmark Corporation, Versailles, OH (US)

(72) Inventor: Arthur D. Smith, Greenville, OH (US)

(73) Assignee: Midmark Corporation, Versailles, OH (US)

( * ) Notice: Subject to any disclaimer, the term of this patent is extended or adjusted under 35 U.S.C. 154(b) by 303 days.

(21) Appl. No.: 17/687,036

(22) Filed: Mar. 4, 2022

(65) Prior Publication Data

US 2022/0183912 A1 Jun. 16, 2022

Related U.S. Application Data

(63) Continuation of application No. 16/849,644, filed on Apr. 15, 2020, now Pat. No. 11,331,237, which is a (Continued)

(51) Int. Cl.
*A61G 13/00* (2006.01)
*A61G 13/06* (2006.01)
(Continued)

(52) U.S. Cl.
CPC ......... *A61G 13/0018* (2013.01); *A61G 13/06* (2013.01); *A61G 13/104* (2013.01); *A61G 13/1225* (2013.01); *A61G 2203/12* (2013.01)

(58) Field of Classification Search
CPC .. A61G 13/0018; A61G 13/06; A61G 7/1034; A61G 13/1225; A61G 2203/12;
(Continued)

(56) References Cited

U.S. PATENT DOCUMENTS 1,686,894 A 10/1928 Buckert et al.
2,217,783 A 10/1940 Bell
(Continued)

FOREIGN PATENT DOCUMENTS

WO WO 2007/146468 A2 12/2007

OTHER PUBLICATIONS

"Caster." Wordnik, www.wordnik.com/words/caster (Year: 2015).*

*Primary Examiner* — Madison Emanski
(74) *Attorney, Agent, or Firm* — Frost Brown Todd LLP

(57) ABSTRACT

A medical examination table includes a base assembly, a table assembly, a table actuation assembly, a wheel assembly, and an actuating mobility assembly. The base assembly configured to support the medical examination table in a first mobility configuration. The table actuation assembly is configured to raise and lower the table assembly relative to the base member to thereby transition the table assembly between a lowered position and a raised position. The wheel assembly is configured to support the medical examination table in a second mobility configuration. The actuating mobility assembly is configured to cooperate with the table actuation assembly to thereby actuate the wheel assembly relative to the base assembly to thereby transition the medical examination table between the first mobility configuration to the second mobility configuration.

17 Claims, 53 Drawing Sheets

Related U.S. Application Data continuation of application No. 15/405,428, filed on Jan. 13, 2017, now Pat. No. 10,660,813.

(60) Provisional application No. 62/281,258, filed on Jan. 21, 2016.

(51) Int. Cl.
*A61G 13/10* (2006.01)
*A61G 13/12* (2006.01)

(58) Field of Classification Search
CPC .... A61G 13/104; A61G 7/018; A61G 7/1046; A61G 7/1019; A61G 13/02; A61G 7/1076; A61G 7/16; A61G 7/012; A61G 7/0528; A61G 13/04; A61G 13/08; A61G 5/10; A61G 7/08; A61G 7/1057; B66F 7/08; B66F 7/0625; B66F 7/0666; B66F 7/065; B66F 7/28
USPC ... 5/618, 611, 600, 510, 614, 616, 601, 608, 5/610, 617, 613, 86.1, 308; 414/495; 180/65.1
See application file for complete search history.

(56) References Cited

U.S. PATENT DOCUMENTS

| | | | | | |
|---|---|---|---|---|---|
| 2,624,590 | A | | 1/1953 | Tilton | |
| 2,675,285 | A | | 4/1954 | Eselle et al. | |
| 3,806,092 | A | * | 4/1974 | Richards | B66F 7/08 D34/28 |
| 3,982,741 | A | * | 9/1976 | Mitchell | A61G 7/015 5/614 |
| 4,186,917 | A | | 2/1980 | Rais et al. | |
| 5,058,871 | A | | 10/1991 | Congin et al. | |
| 5,083,625 | A | * | 1/1992 | Bleicher | A61G 7/0528 5/616 |
| 5,105,915 | A | * | 4/1992 | Gary | B66F 7/08 14/71.3 |
| 6,038,718 | A | | 3/2000 | Pennington et al. | |
| 7,137,161 | B2 | | 11/2006 | Hempker et al. | |
| 7,376,991 | B2 | | 5/2008 | Stewart et al. | |
| 7,669,260 | B2 | | 3/2010 | Smith et al. | |
| 8,226,743 | B2 | | 9/2012 | Betting et al. | |
| 8,590,073 | B2 | | 11/2013 | Bly et al. | |
| 8,662,588 | B1 | | 3/2014 | Delmestri | |
| 8,978,181 | B2 | | 3/2015 | Menke et al. | |
| 9,132,053 | B1 | | 9/2015 | Ferreri et al. | |
| 10,660,813 | B2 | | 5/2020 | Smith | |
| 11,331,237 | B2 | | 5/2022 | Smith | |
| 2003/0172459 | A1 | | 9/2003 | Roussy | |
| 2003/0193166 | A1 | | 10/2003 | Martin | |
| 2005/0015878 | A1 | * | 1/2005 | Bannister | A61G 13/06 5/618 |
| 2006/0045685 | A1 | | 3/2006 | Warner et al. | |
| 2007/0056102 | A1 | | 3/2007 | Smith | |
| 2007/0226907 | A1 | | 10/2007 | Dorenbeck | |
| 2007/0289063 | A1 | | 12/2007 | Martin et al. | |
| 2008/0035396 | A1 | * | 2/2008 | Heimbrock | A61G 7/018 180/19.1 |
| 2009/0174162 | A1 | | 7/2009 | Gass et al. | |
| 2012/0205509 | A1 | | 8/2012 | Marugg | |
| 2014/0359941 | A1 | | 12/2014 | Sharps et al. | |
| 2015/0351986 | A1 | * | 12/2015 | Ferreri | A61G 15/002 280/43.17 |
| 2016/0128884 | A1 | | 5/2016 | Wem | |

* cited by examiner

MEDICAL EXAMINATION TABLE WITH RETRACTABLE MOVING WHEELS

PRIORITY

This application is a continuation of U.S. patent application Ser. No. 16/849,644, entitled "Medical Examination Table With Retractable Moving Wheels." filed Apr. 15, 2020, which is a continuation of U.S. patent application Ser. No. 15/405,428, entitled "Medical Examination Table With Retractable Moving Wheels," filed Jan. 13, 2017 and claims priority to U.S. Provisional Pat. App. No. 62/281,258, entitled "Medical Exam Table with Retractable Moving Wheels," filed Jan. 21, 2016, the disclosures of which are incorporated by reference herein.

BACKGROUND

Articulating medical examination tables may be provided in medical examination rooms to support and place patients in various positions that facilitate examination and/or the performance of various medical procedures. Conventional examination tables may have a table assembly that includes seat section and a back section supported on a base unit. The seat and back sections are moveable relative to one another and relative to the base so that a patient can be placed in a desired position. The seat and/or back sections may be articulated by actuating mechanisms such as motors, pneumatic or hydraulic cylinders, or other devices to move the seat and back sections between the various positions and to adjust the height of the seat and back sections relative to the base.

It may be desirable to clean the floor under a medical examination table on a regular basis in order to maintain a clean medical examination room. In order to facilitate such cleaning, given the size and weight of a medical examination table, it may be desirable to enable a medical examination table to be easily moved along a floor. To the extent that a medical examination table incorporates features (e.g., wheels, rollers, balls, etc.) that enable the medical examination table to be easily moved along a floor, it may be desirable to disable such features when the medical examination table is being used to support a patient. This may prevent undesired movement of the patient with the table along the floor, such as during a medical examination.

While a variety of moveable medical examination tables have been made and used, it is believed that no one has ever made or used a medical examination table as described herein.

BRIEF DESCRIPTION OF THE DRAWINGS

While the specification concludes with claims which particularly point out and distinctly claim this technology, it is believed this technology will be better understood from the following description of certain examples taken in conjunction with the accompanying drawings, in which like reference numerals identify the same elements and in which:

FIG. 25 depicts another perspective view of the beam mounting frame assembly of

FIG. 24;

Figure 1:
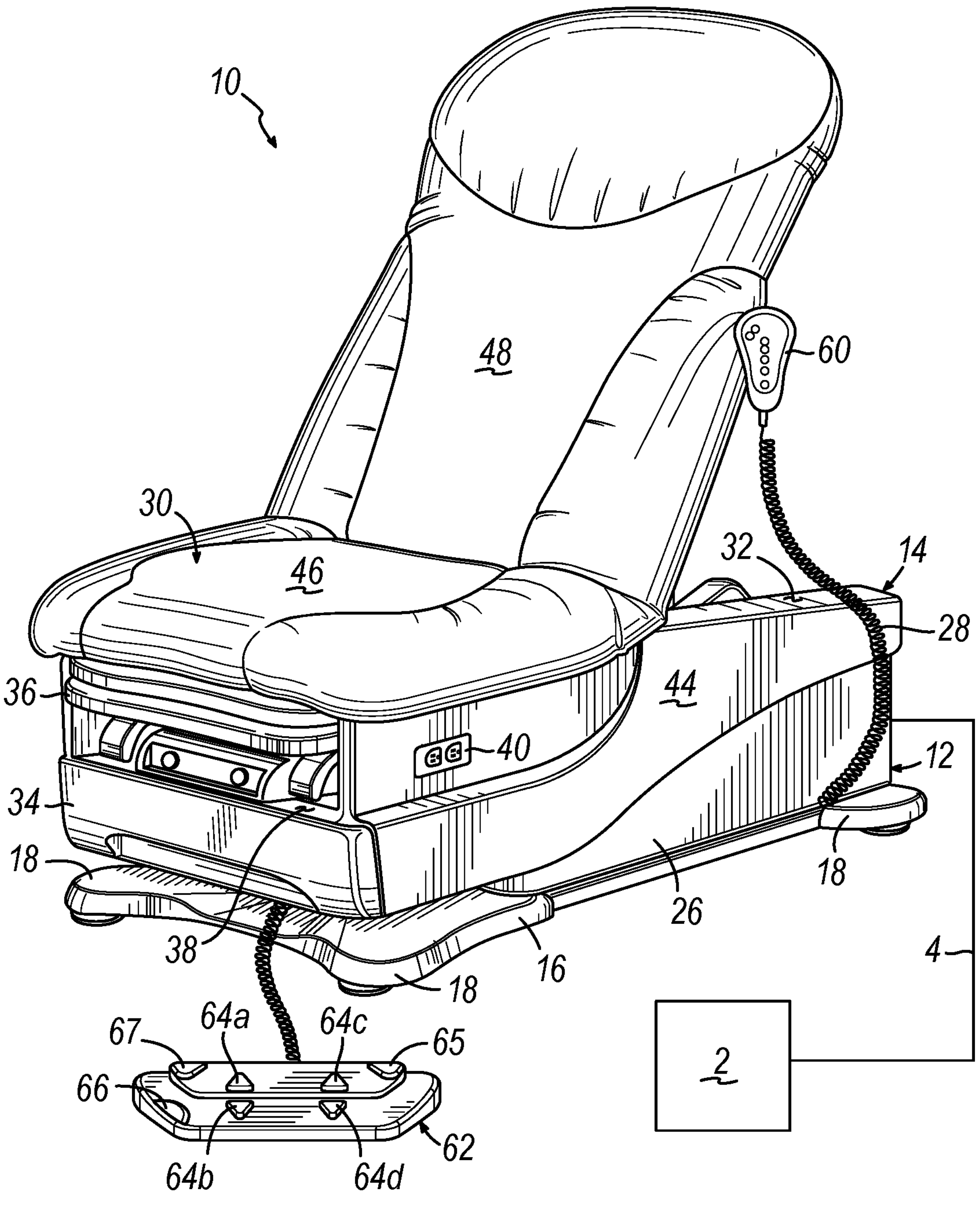
FIG. 1 depicts a perspective view of an exemplary medical examination table, where the table assembly is in a lowered position.

The drawings are not intended to be limiting in any way, and it is contemplated that various embodiments of the technology may be carried out in a variety of other ways, including those not necessarily depicted in the drawings. The accompanying drawings incorporated in and forming a part of the specification illustrate several aspects of the present technology, and together with the description serve to explain the principles of the technology; it being understood, however, that this technology is not limited to the precise arrangements shown.

DETAILED DESCRIPTION

The following description of certain examples of the technology should not be used to limit its scope. Other examples, features, aspects, embodiments, and advantages of the technology will become apparent to those skilled in the art from the following description, which is by way of illustration, one of the best modes contemplated for carrying out the technology. As will be realized, the technology described herein is capable of other different and obvious aspects, all without departing from the technology. Accordingly, the drawings and descriptions should be regarded as illustrative in nature and not restrictive.

It is further understood that any one or more of the teachings, expressions, embodiments, examples, etc. described herein may be combined with any one or more of the other teachings, expressions, embodiments, examples, etc. that are described herein. The following-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

First Exemplary Examination Table

Figure 2:
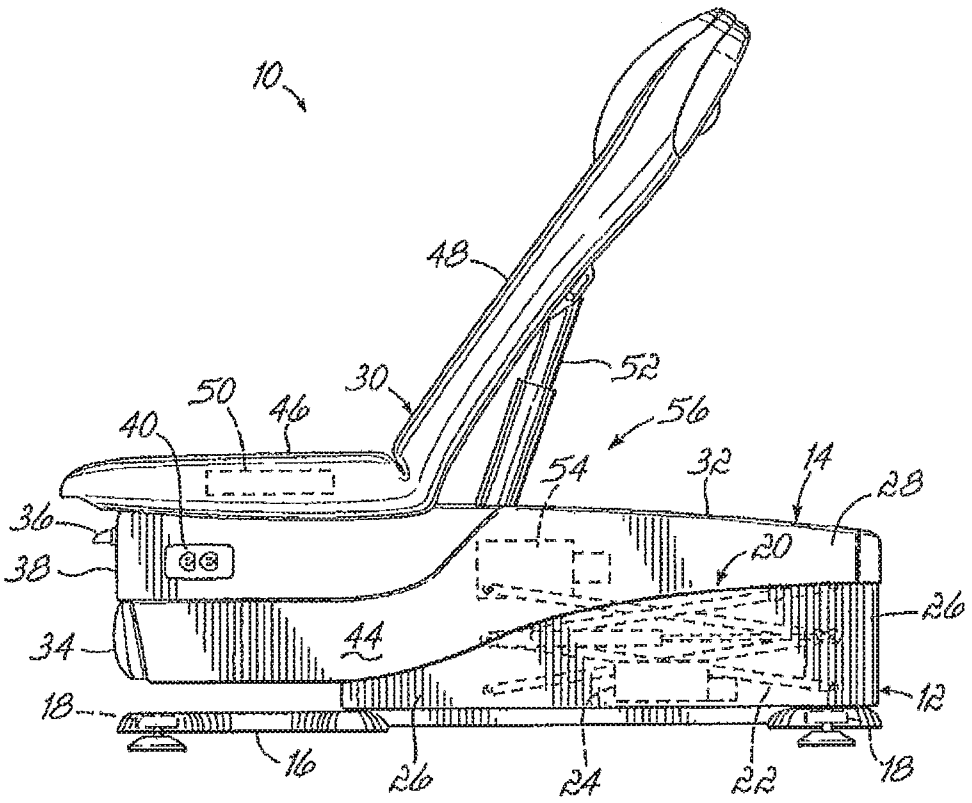
FIG. 2 depicts a side elevational view of the medical examination table of FIG. 1, where the table assembly is in a lowered position.
Figure 3:
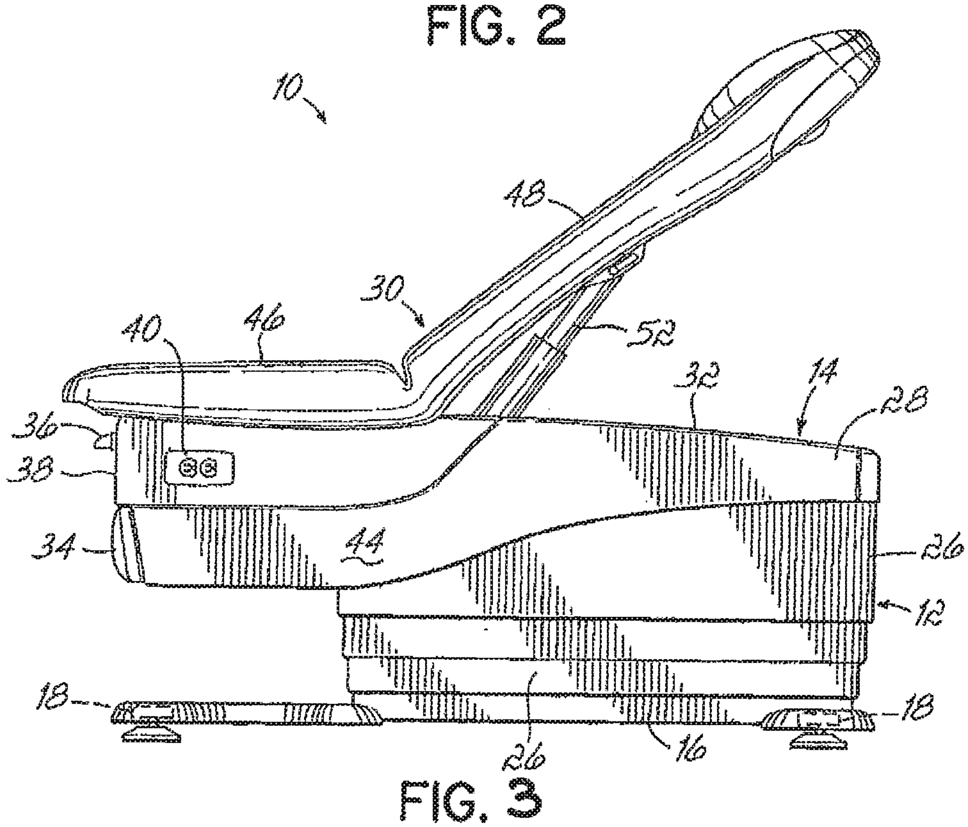
FIG. 3 depicts a side elevational view of the medical examination table of FIG. 1, where the table assembly is in a raised position.

FIGS. 1-3 show an exemplary examination table (10). Examination table (10) includes a base assembly (12) and a table assembly (14) disposed above base assembly (12). Base assembly (12) includes a base member (16), a plurality of legs (18) that support examination table (10), and a lift mechanism (20) (shown in phantom schematic form in FIG. 2). Legs (18) extend from base member (16) toward the ground. Lift mechanism (20) includes a scissor lift (22) and a lift motor (24). Scissor lift (22) engages both base member (16) and table assembly (14). Lift motor (24) is operable to drive scissor lift (22) such that scissor lift (22) actuates generally upwardly or generally downwardly in the vertical direction. Therefore, lift mechanism (20) may lower and raise table assembly (14) relative to base member (16). While lift mechanism (20) includes scissor lift (22) and lift motor (24) in this example, any other suitable mechanisms for raising and lowering table assembly (14) relative to base member (16) may be utilized as would be apparent to one having ordinary skill in the art in view of the teachings herein.

Lift mechanism (20) and all other internal components of base assembly (12) may be stored within a telescoping shroud (26). As best seen in FIGS. 2-3, telescoping shroud (26) telescopes outwardly from base member (16) to table assembly (14) to conceal lift mechanism (20).

Table assembly (14) further includes a table frame (28) and a support surface (30). Table frame (28) defines a generally planar upper surface (32) for supporting support surface (30). Table frame (28) may also include a plurality of storage drawers (34) and retractable instrument pans (36) at a front surface (38) of table frame (28). Storage drawers (34) and retractable instrument pans (36) provide convenient storage areas for the table operator while performing patient examinations and procedures. Table frame (28) may further include at least one electrical outlet (40) positioned along a side surface (44) of table frame (28). Electrical outlet (40) may be powered by a power supply (2) that is in electrical communication with examination table (10) via power cord (4). Electrical outlet (4) may thus provide a convenient source of electrical power for accessory devices used with examination table (10) or during a medical procedure.

Support surface (30) is divided into a seat portion (46) and a backrest portion (48). Support surface (30) may be generally padded or cushioned to more comfortably accommodate a patient. Seat portion (46) is rigidly coupled to upper surface (32) of table frame (28) adjacent to front surface (38), and may include a seat sensor (50) that is configured to generate a signal indicative of the presence or absence of a patient. Backrest portion (48) extends behind seat portion (46) and may be pivoted with respect to seat portion (46). A lift cylinder (52) or similar device is engaged with backrest portion (48) and table frame (28) to pivot backrest portion (48). The lift cylinder (52) is operatively coupled to a backrest motor (54) (shown in phantom in FIG. 2) to provide a reclining mechanism (56) that urges backrest portion (48) into a desired position in response to a control panel (60) or foot pedal (62). Lift mechanism (20) and reclining mechanism (56) combine to form an actuation system for adjusting examination table (10) through various positions such those shown in FIGS. 1-3. It should be understood that various other suitable lifting mechanisms and reclining mechanisms could be substituted for lift mechanism (20) and reclining mechanism (56) as would be apparent to one having ordinary skill in the art in view of the teachings herein.

As described above, examination table (10) may further include control panel (60) and/or foot pedal (62) as shown in FIG. 1. Control panel (60) and foot pedal (62) include a plurality of buttons for controlling the operation of examination table (10). Although shown as being coupled to examination table (10) by cables in FIG. 1, persons having ordinary skill in the art will understand that control panel (60) and foot pedal (62) may also be placed in communication with lift mechanism (20) and reclining mechanism (56) via a wireless connection. To this end, control panel (60) and foot pedal (62) may employ a wireless protocol, such as Bluetooth®, which is an open wireless standard managed by Bluetooth SIG, Inc. of Kirkland Wash.; Zigbee®, which is an open wireless standard managed by the ZigBee Alliance of San Ramon Calif.; a proprietary wireless protocol, or any other suitable wireless protocol to communicate with lift mechanism (20) and reclining mechanism (56).

In addition to having the foregoing components and operability, examination table (10) may also be constructed and operable in accordance with at least some of the teachings of U.S. Pat. No. 8,978,181, entitled "Medical Examination Table with Integrated Scale," issued Mar. 17, 2015, the disclosure of which is incorporated by reference herein; U.S. Pat. No. 8,226,743, entitled "Examination Table with Motion Tracking," issued Sep. 18, 2012, the disclosure of which is incorporated by reference herein; U.S. Pat. No. 7,669,260, entitled "Medical Examination Table," issued Mar. 2, 2010, the disclosure of which is incorporated by reference herein; U.S. Pat. No. 7,376,991, entitled "Medical Examination Table," issued May 27, 2008, the disclosure of which is incorporated by reference herein; U.S. Pat. No. 7,137,161, entitled "Apparatus and Method for Relocating a Medical Examination Table," issued Nov. 21, 2006, the disclosure of which is incorporated by reference herein; and/or U.S. Pat. No. 6,038,718, entitled "Surgical Table," issued Mar. 21, 2000, the disclosure of which is incorporated by reference herein.

II. Exemplary Alternative Medical Examination Tables with Selective Mobility

As noted above, in some instances, it may be desirable to move a medical examination table within the room that houses the medical examination table. For example, staff or others may desire to clean the floor under the medical examination table for purposes of administering infection control. Due to the weight of medical examination tables, it may be difficult to lift a medical examination table in order to move the table within the room. Therefore, it may be desirable to provide a medical examination table with selective mobility. Such selective mobility may be provided with retractable wheels. Retractable wheels may selectively extend from a base assembly of the medical examination table to support the medical examination table. When retractable wheels support the medical examination table, a user may push or pull table within the room on the wheels, instead of dragging and/or lifting table off the floor. When the user is finished moving the medical examination table, the user may retract wheels so that the wheels no longer support the table. This may prevent undesired movement of the table when the table is being used in a medical examination.

Figure 4A:
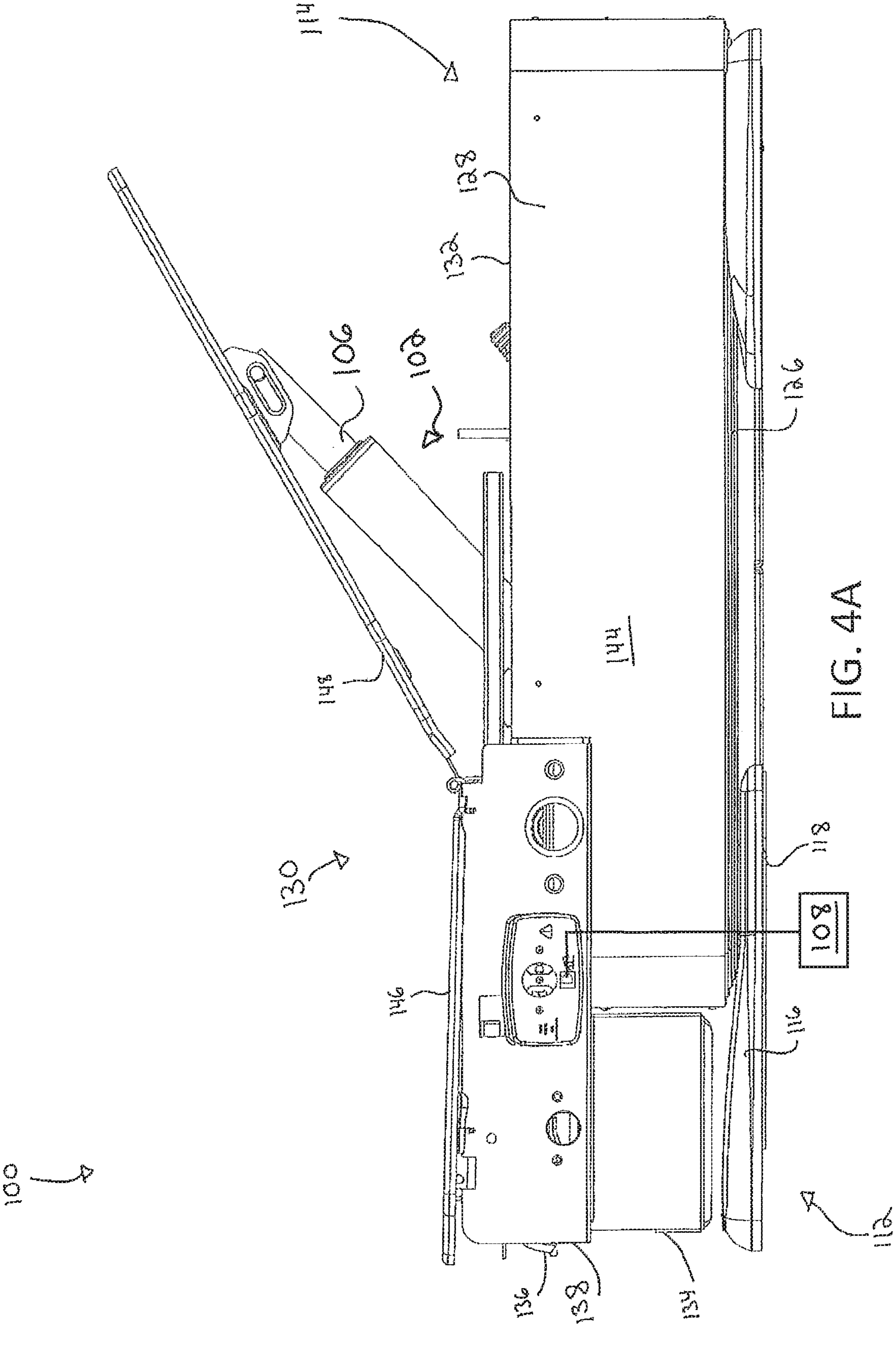
FIG. 4A depicts a side elevational view of another exemplary medical examination table, with certain housing and cushion components removed for clarity, where the table assembly is in a lowered position.
Figure 4B:
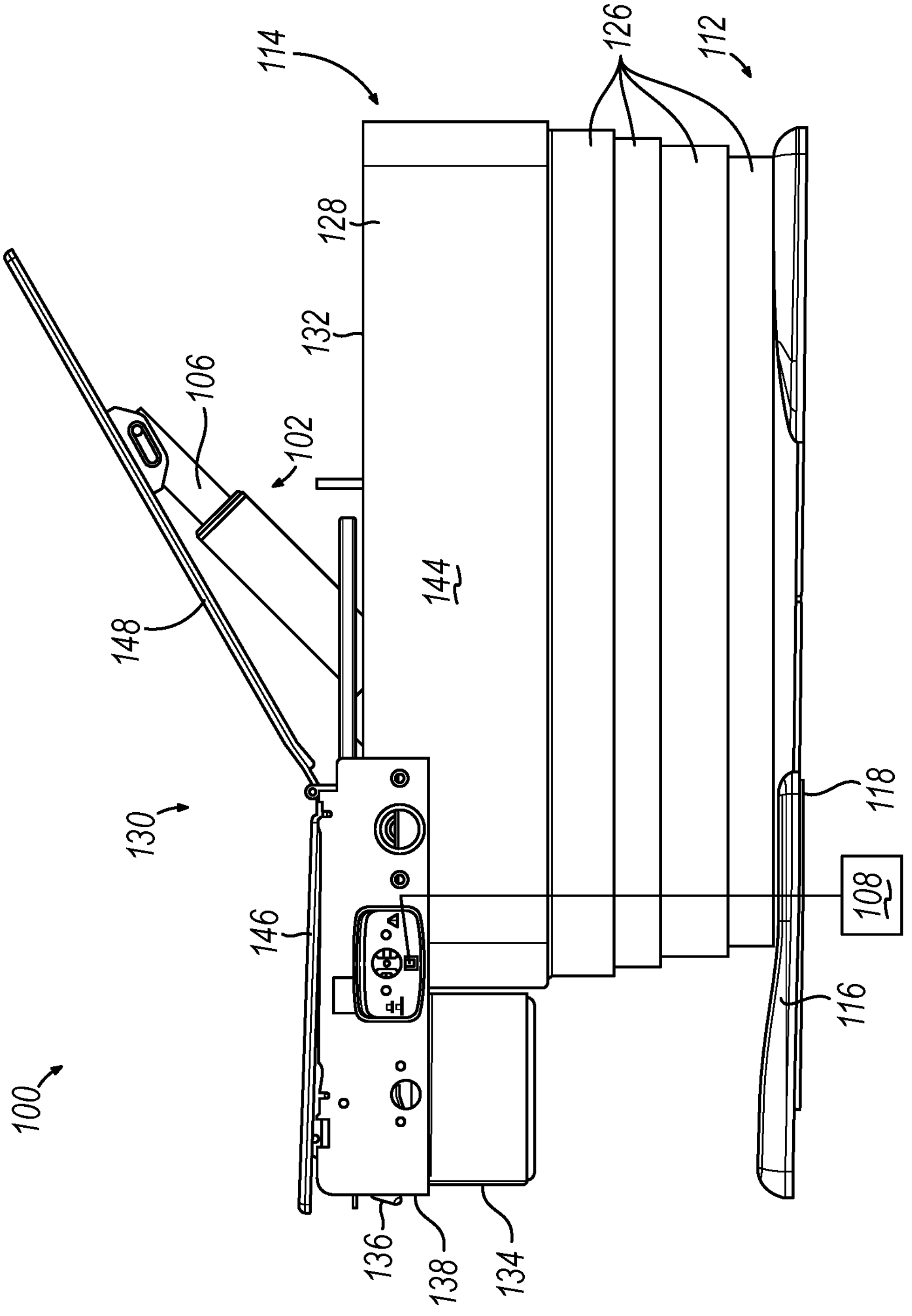
FIG. 4B depicts a side elevational view of the medical examination table of FIG. 4A, with certain housing and cushion components removed for clarity, where the table assembly is in a raised position.
Figure 5:
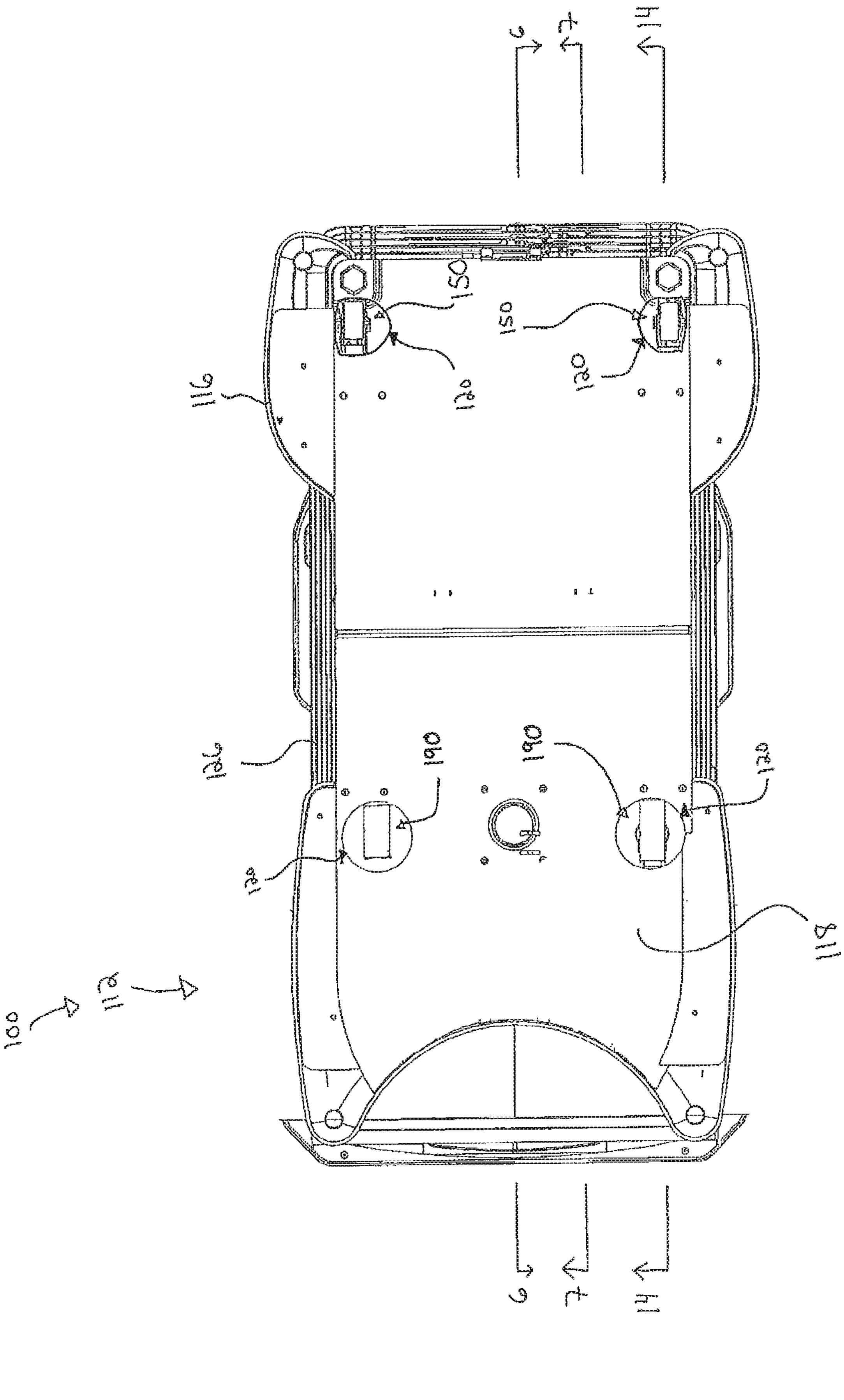
FIG. 5 depicts a bottom plan view of the medical examination table of FIG. 4A.

A. First Exemplary Alternative Medical Examination Table with Selective Mobility FIGS. 4A-5 show an exemplary examination table (100) with a pair of front wheel assemblies (190) and a pair of rear wheel assemblies (150). As will be described in greater detail below, both front wheel assemblies (190) and rear wheel assemblies (150) are configured to selectively support examination table (100) in order to provide increased mobility of examination table (100). Examination table (100) is substantially similar to examination table (10) described above, with the differences elaborated below. It should therefore be understood that, in addition to incorporating the features and operability described below, examination table (100) may incorporate the various features and operability of examination table (10) described above. Moreover, in addition to incorporating the features and operability described below, examination table (100) may be configured and operable in accordance with at least some of the teachings of the various references that are cited herein. Various ways in which the below teachings may be combined with the teachings above and/or with the teachings of the references cited herein will be apparent to those of ordinary skill in the art.

Examination table (100) includes a base assembly (112) and a table assembly (114), which are substantially similar to base assembly (12) and table assembly (14) described above, respectively, with differences elaborated below. It should therefore be understood that, as shown in FIGS. 4A-4B, table assembly (114) may rise and lower relative to a base member (116) of base assembly (112). A telescoping shroud (126) telescopes relative to base member (116) and table assembly (114) when table assembly (114) rises or lowers relative to base member (116) of base assembly (112).

Base member (116) further includes a base plate (118). Base plate (118) defines a plurality of recesses (120) that are adjacent to either front wheel assembly (190) or rear wheel assembly (150). Base plate (118) is located at the bottom of examination table (100) such that base plate (118) makes contact with ground (G), thereby supporting examination table (100), when wheel assemblies (150, 190) are retracted within base assembly (112). Examination table (100) is thus supported on base plate (118) when wheel assemblies (150, 190) are retracted within base assembly (112). Base plate (118) provides substantial friction with ground (G) such that examination table (100) is effectively immobile when examination table (100) is being supported by base plate (118) in direct contact with ground (G). In other words, absent some form of mechanical assistance, a normal human operator would be unable to push examination table (100) along ground (G) when examination table (100) is being supported by base plate (118) with wheel assemblies (150, 190) retracted within base assembly (112).

Table assembly (114) includes a support surface (130), a table frame (128), a side surface (144), an upper surface (132) and a front surface (138); which are substantially similar to support surface (30), table frame (28), side surface (44), upper surface (32) and front surface (38) described above, respectively. Therefore, table frame (128) may include a plurality of storage drawers (134) and retractable instrument pans (136) at front surface (138), which are substantially similar to storage drawers (34) and retractable instrument pans (36), respectively.

While examination table (10) includes control panel (60) and foot pedal (62) that may be used to actuate examination table (10) toward various positions, examination table (100) further includes a control panel (108). Control panel (108) may also control the various features described below in order to actuate examination table (100) toward various positions. However, it should be understood, that control panel (60) and/or foot pedal (62) may be readily incorporated into examination table (100) in order to actuate examination table (100) toward various positions.

Figure 6:
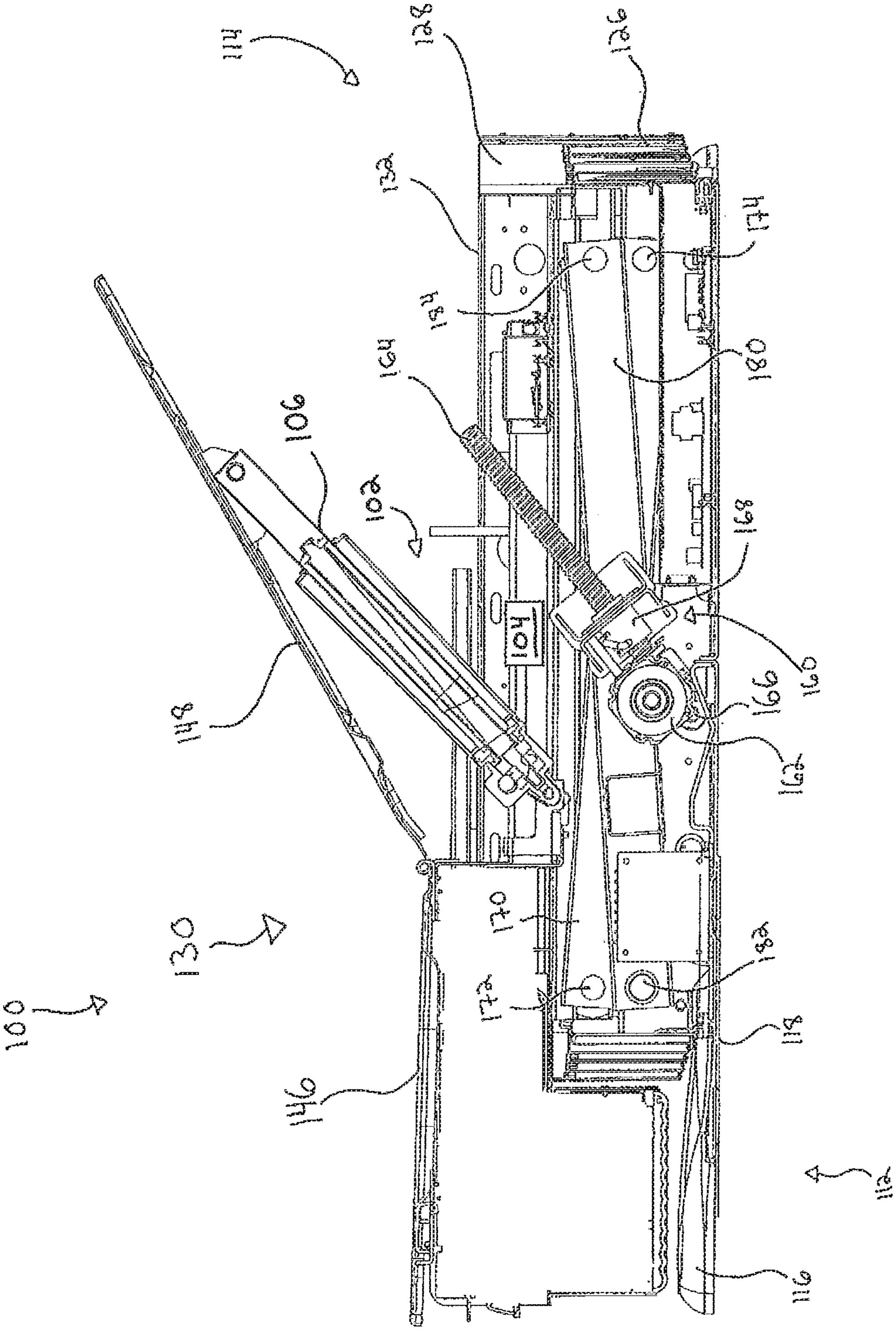
FIG. 6 depicts a cross-sectional view of the medical examination table of FIG. 4A, taken along line 6-6 of FIG. 5.

Further, support surface (130) is divided into a seat portion (146) and a backrest portion (148). Like support surface (30), support surface (130) may be generally padded or cushioned to more conformably accommodate a patient. Seat portion (146) is rigidly coupled to upper surface (132) of table frame (128) adjacent to front surface (138). Backrest portion (148) extends behind seat portion (146) and may be pivoted with respect to seat portion (146). As best seen in FIG. 6, table assembly (114) further includes a reclining mechanism (102). Reclining mechanism (102) includes a backrest motor (104), and a lift cylinder (106) that is pivotally coupled with backrest portion (148) and table frame (128). Backrest motor (104) may actuate lift cylinder (106) in order to pivot backrest portion (148) relative to seat portion (146). Control panel (108) may control backrest motor (104) in order to actuate lift cylinder (106). Therefore, a user may utilize control panel (108) in order to pivot backrest portion (148) relative to seat portion (146). While motor (104) and lift cylinder (106) are used in the present example, it should be understood that any other suitable mechanisms may be utilized to pivot backrest portion (148) relative to seat portion (146) as would be apparent to one having ordinary skill in the art in view of the teachings herein. For example, a hydraulic assembly may be utilized to actuate lift cylinder (106). Alternatively, a threaded rod may be utilized instead of lift cylinder (106).

Figure 7A:
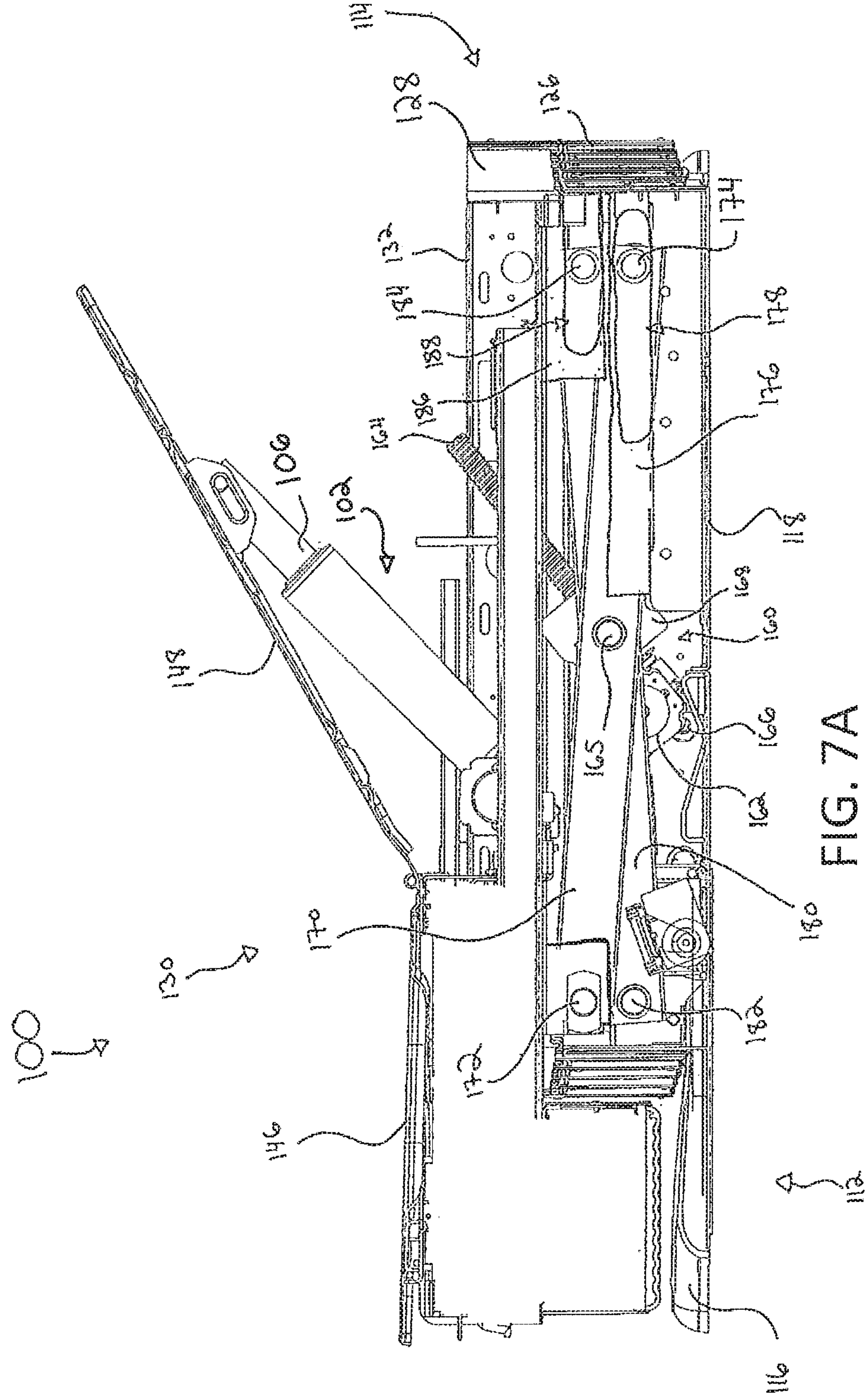
FIG. 7A depicts a cross-sectional view of the medical examination table of FIG. 4A, taken along line 7-7 of FIG. 5, where the table assembly is in the lowered position.
Figure 7B:
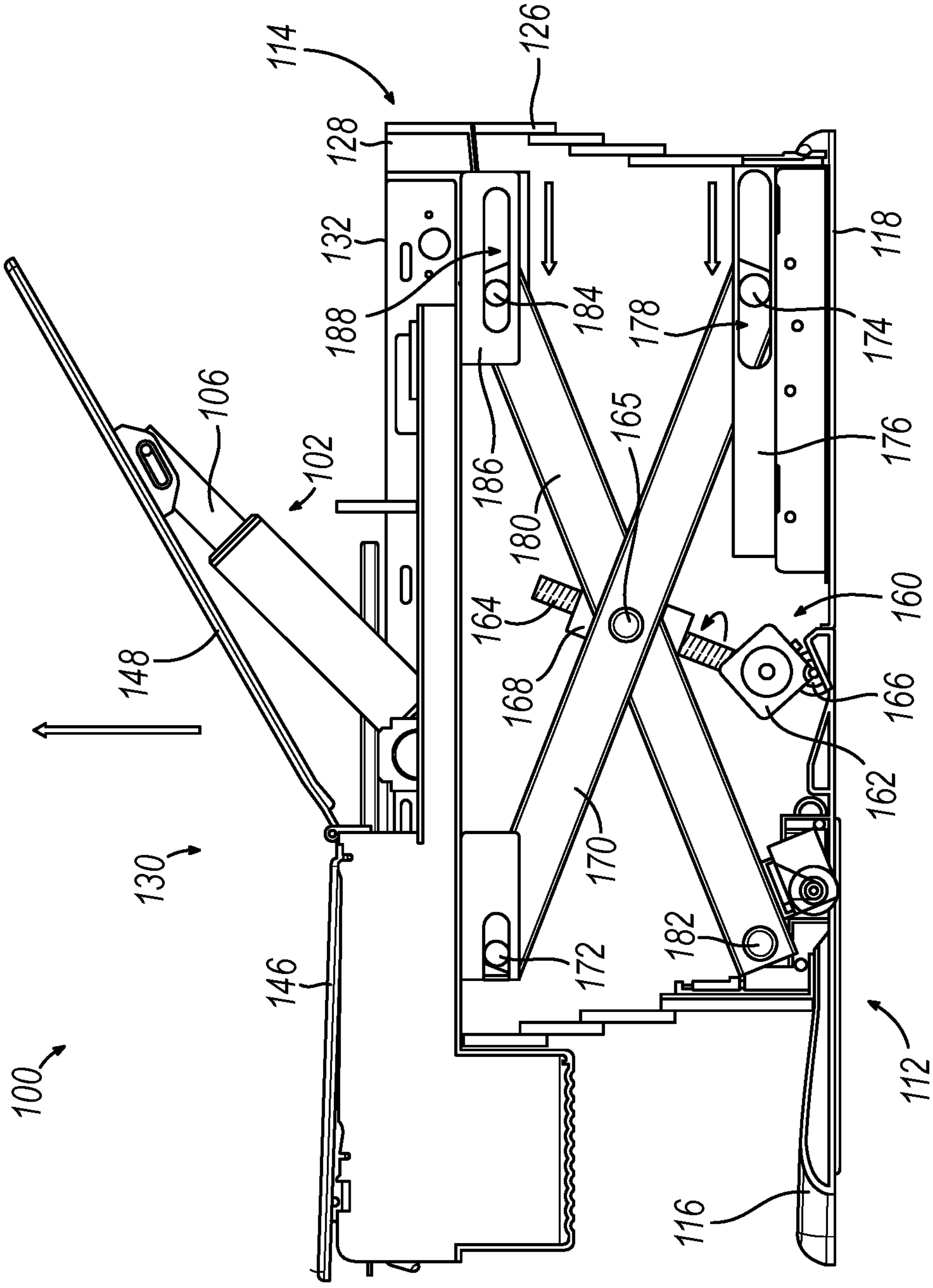
FIG. 7B depicts a cross-sectional view of the medical examination table of FIG. 4A, taken along line 7-7 of FIG. 5, where the table assembly is in the raised position.

As best seen in FIGS. 6-7B, examination table (100) further includes a lift mechanism (160) that is coupled to base assembly (112) and table assembly (114). As will be described in greater detail below, lift mechanism (160) is capable of actuating table assembly (114) in the vertical direction relative to base member (116). Lift mechanism (160) includes a motor (162) that is pivotally coupled to base member (116) via pivot pin (166). Lift mechanism (160) further includes a threaded rod (164) extending from motor (162), a ball screw nut (168) coupled to threaded rod (164), a pair of lift beams (170, 180) coupled to ball screw nut (168) via pin (165), a pair of fixed shafts (172, 182), and a pair of sliding shafts (184, 174).

Motor (162) is capable of rotating threaded rod (164) in a clockwise and counterclockwise direction about the longitudinal axis of threaded rod (164). Additionally, ball screw nut (168) is coupled to threaded rod (164) via complementary threading, such that ball screw nut (168) forms a nut. Therefore, rotation of threaded rod (164) about its own longitudinal axis drives ball screw nut (168) along the length of threaded rod (164). The direction in which ball screw nut (168) travels relative to threaded rod (164) is dependent on the direction in which threaded rod (164) rotates about its own longitudinal axis.

As mentioned above, lift beams (170, 180), are coupled to ball screw nut (168) via pin (165). Pin (165) also pivotably couples lift beams (170, 180) to each other, such that lift beams (170, 180) and pin (165) form a scissor assembly. Additionally, lift beam (170) is pivotally coupled to fixed shaft (172) and sliding shaft (174); while lift beam (180) is pivotally coupled to fixed shaft (182) and sliding shaft (174). Fixed shaft (172) is fixed relative to table assembly (114) while fixed shaft (182) is fixed relative to base member (116). Additionally, sliding shaft (174) is slidably disposed within slot (178) defined by fixed plate (176); while sliding shaft (184) is slidably disposed within slot (188) defined by fixed plate (186). Fixed plate (176) is fixed relative to base member (116) while fixed plate (186) is fixed relative to table assembly (114). Therefore, as best seen in the sequence depicted in FIGS. 7A-7B, activation of motor (162) will cause lift beams (170, 180) to pivot relative to each other in a scissoring fashion, which will in turn provide raising and lowering of table assembly (114) relative to base member (116).

For example, if motor (162) is activated to rotate threaded rod (164) in a first rotational direction about the longitudinal axis of threaded rod (164), ball screw nut (168) travels up threaded rod (164). Because ball screw nut (168) is coupled to both lift beams (170, 180) via pin (165), ball screw nut (168) raises lift beams (170, 180) while sliding shafts (174, 184) slide within their respective slots (178, 188). Motor (162), threaded rod (164), ball screw nut (168) and pin (165) rotate about pivot pin (166) while table assembly (114) ascends vertically relative to base member (116). Of course, if motor (162) is activated to rotate threaded rod (164) in a second, opposite, rotational direction about the longitudinal axis of threaded rod (164), then table assembly (114) will descend vertically relative to base member (116).

While lift mechanism (160) is used to vertically actuate table assembly (114) relative to base member (116) in this example, it should be understood that any other suitable mechanism may be utilized to vertically actuate table assembly (114) relative to base member (116), such as lift mechanism (20) described above, any of the lift mechanisms described in any of the references that are cited herein, or any other suitable mechanism that would be apparent to one having ordinary skill in the art in view of the teachings herein.

Figure 8:
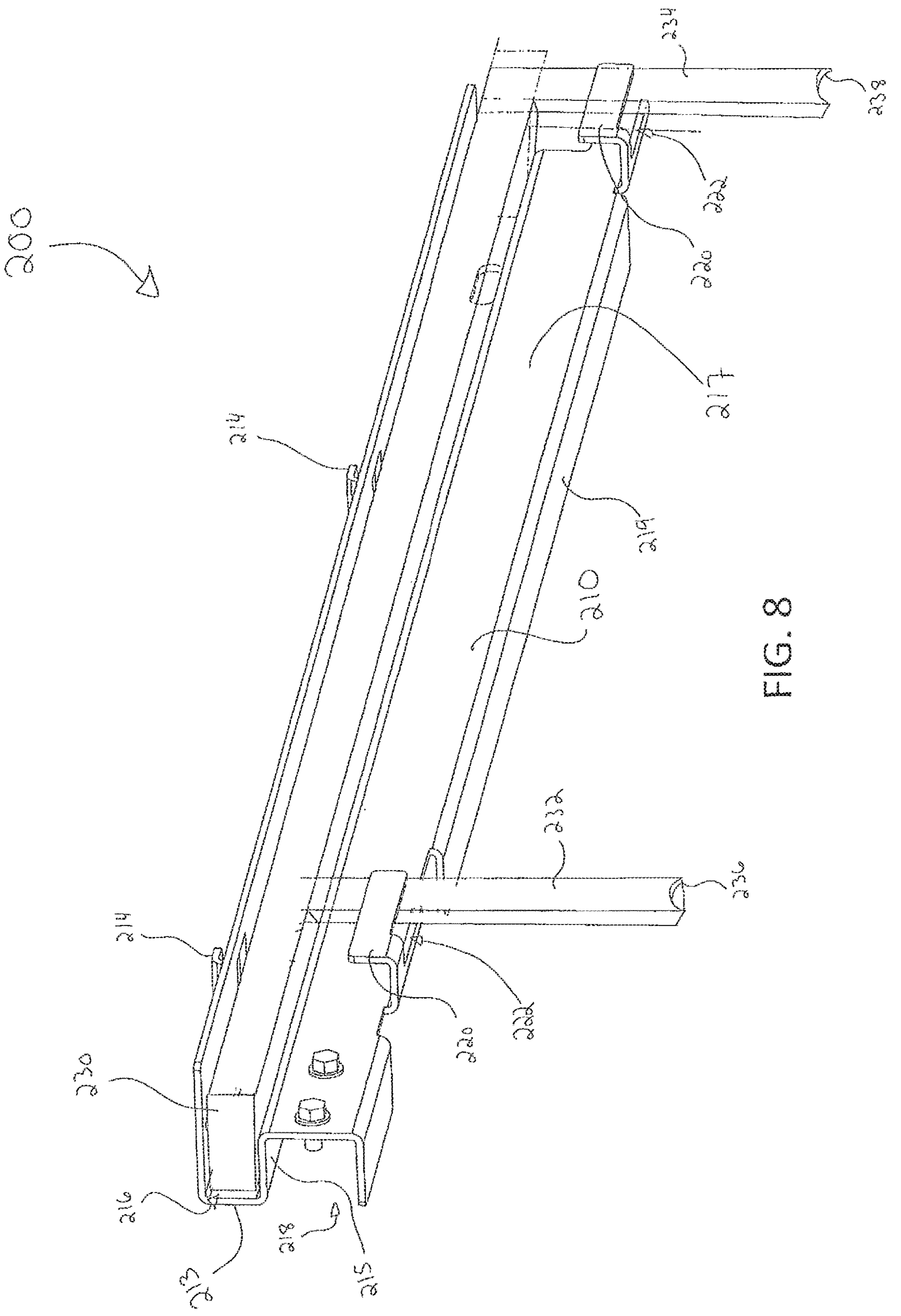
FIG. 8 depicts a perspective view of an actuating mobility assembly of the medical examination table of FIG. 4A.
Figure 9:
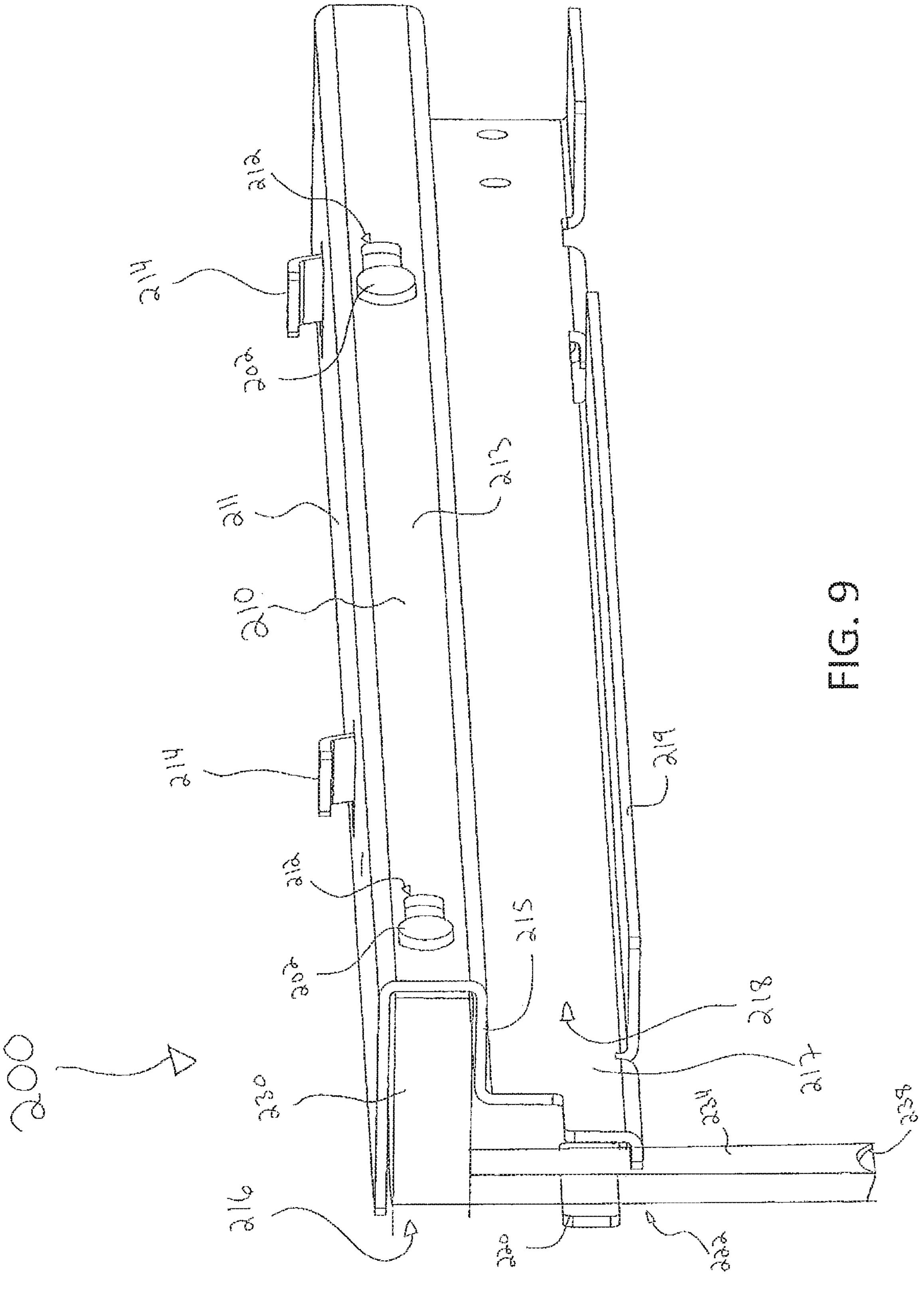
FIG. 9 depicts another perspective view of the actuating mobility assembly of FIG. 8.
Figure 10:
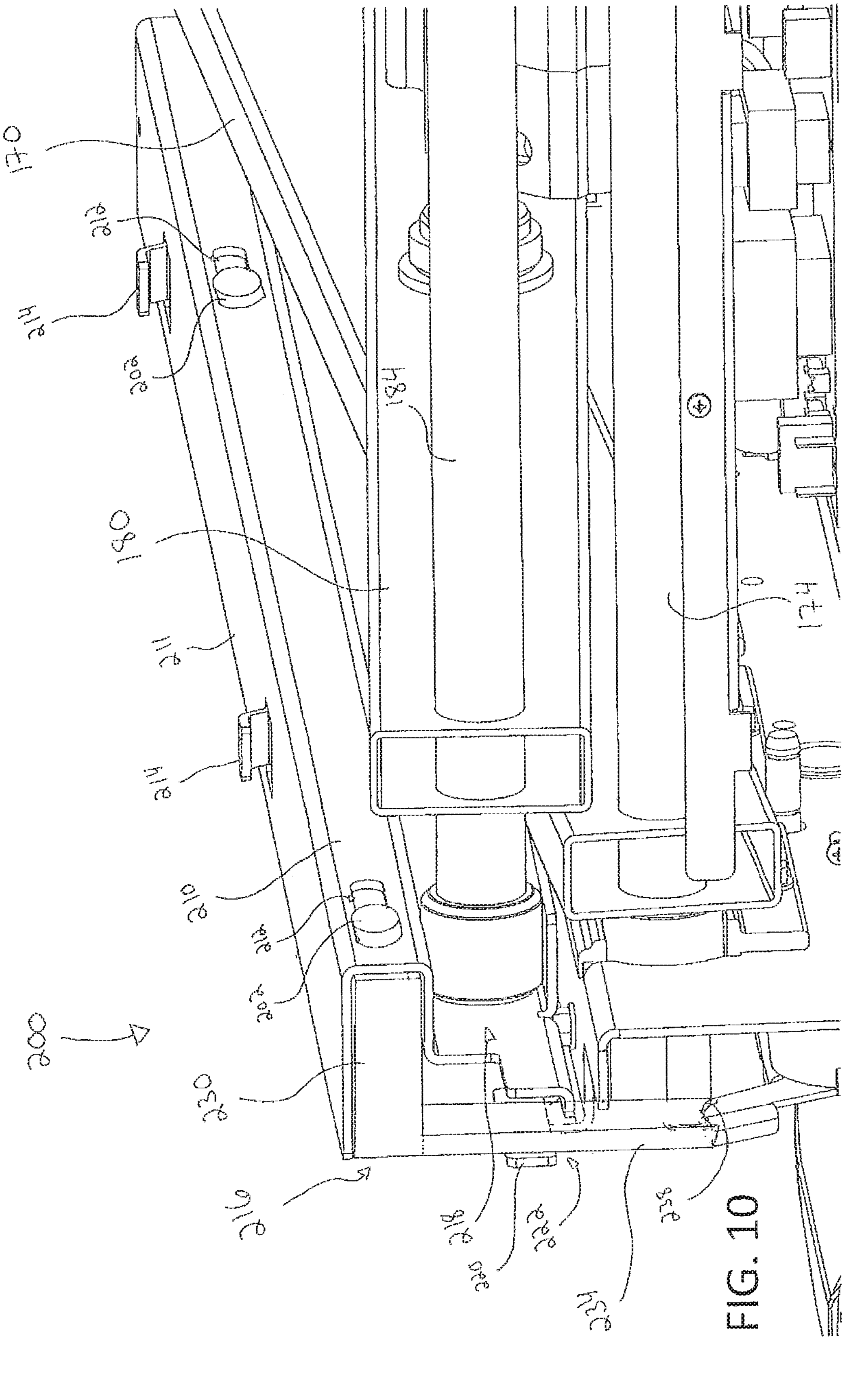
FIG. 10 depicts a perspective view of the actuating mobility assembly of FIG. 8 attached to a lift mechanism of the medical examination table of FIG. 4A.

FIGS. 8-10 show components of an exemplary actuating mobility assembly (200). As will be described in greater detail below, actuating mobility assembly (200) may be attached to table assembly (114) in order to selectively lift base plate (118) from the ground (G) such that wheel assemblies (150, 190) support examination table (100) instead of base plate (118) supporting examination table (100).

Actuating mobility assembly (200) includes a mounting frame (210) and a slidable beam (230). Mounting frame (210) includes a top horizontal surface (211), a first vertical surface (213), a middle horizontal surface (215), a second vertical surface (217), and a bottom horizontal surface (219). First vertical surface (213) defines a pair of coupling slots (212). Additionally, top horizontal surface (211), first vertical surface (213) and middle horizontal surface (215) define a guide channel (216) that is dimensioned to receive slidable beam (230). A pair of bolts (202) couple slidable beam (230) to mounting frame (210). Slidable beam (230) is thus operable to translate within guide channel (216) to the extent allowed by bolts (202) and coupling slots (212).

Slidable beam (230) may actuate within guide channel (216) by any suitable means as will be apparent to one having ordinary skill in the art in view of the teachings herein. For example, a handle may be attached to slidable beam (230), such that handle is accessible by a user. A user may then slide handle the move slidable beam (230) within guide channel (216). Alternatively, a threaded rod may be coupled to slidable beam (230), with slidable beam (230) having complementary threading. Therefore, rotation of threaded rod about its own longitudinal axis could actuate slidable beam (230) within guide channel (216). Alternatively, slidable beam (230) may be coupled with a hydraulic cylinder and pump. Actuation of the hydraulic cylinder may thus further actuate slidable beam (230) within guide channel (216). As yet another merely illustrative example, a solenoid may be used to drive slidable beam (230) within guide channel (216).

A pair of guides (220) extend from second vertical surface in the opposite direction of bottom horizontal surface (219). Guides (220) and second vertical surface (217) define slots (222), which are dimensioned to receive downwardly presented forks (232, 234) of slidable beam (230). Downwardly presented forks (232, 234) terminate at an arched end (236, 238), respectively. Downwardly presented forks (232, 234) are operable to slide within fork slots (222). As will be described in greater detail below, downwardly presenting forks (232, 234) are operable to slide from an inactivated position to an activated position, then lower with table assembly (114) in order to lift base plate (118) from the ground (G) such that wheel assemblies (150, 180) support examination table (100).

A pair of mounting tabs (214) extend upwardly from top horizontal surface (211). Mounting tabs (214) allow for mounting frame (210) to be fixedly secured to table assembly (114). Therefore, as table assembly (114) actuates in the vertical direction relative to base member (116), so does actuating mobility assembly (200).

Additionally, middle horizontal surface (215), second vertical surface (217), and bottom horizontal surface (219) define a lift channel (218). As can be seen in FIG. 10, lift channel (218) may be dimensioned to receive sliding shaft (184). Additionally, lift channel (218) may also receive fixed shaft (172). Thus, when sliding shaft (184) and fixed shaft (172) help actuate table assembly (114) relative to base member (116), as described above, sliding shaft (184) and fixed shaft (172) may also make contact with either middle horizontal surface (215) or bottom horizontal surface (219) in order to help actuate actuating mobility assembly (200). Therefore, mounting tabs (214) and lift channel (218) may both help actuate actuating mobility assembly (200) with table assembly (114). Mounting tabs (214) may be strictly utilized without lift channel (218); lift channel (218) may be utilized without mounting tabs (214); or both mounting tabs (214) and lift channel (218) may be utilized.

Figure 11:
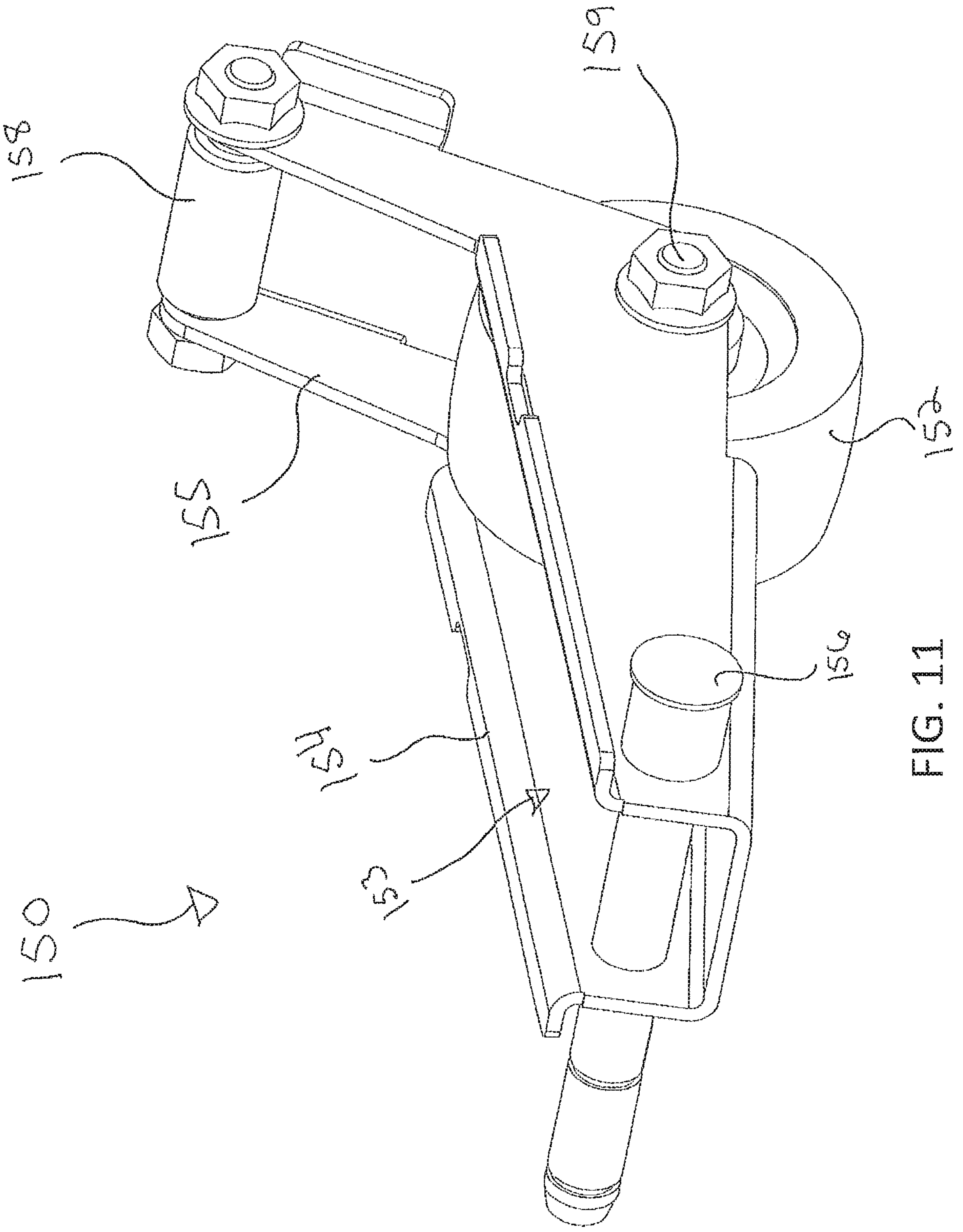
FIG. 11 depicts a perspective view of a rear wheel assembly of the medical examination table of FIG. 4A.

FIG. 11 shows rear wheel assembly (150). Rear wheel assembly (150) includes an assembly frame (154) defining a channel (153), a pair of legs (155) extending from assembly frame (154), a wheel (152) housed within channel (153) and pivotally fixed to frame (154) via pivot pin (159), a pivot mount (156) pivotally fixed to assembly frame (154), and an engagement arm (158) attached at the terminating ends of legs (155) such that engagement arm (158) may rotate about its own longitudinal axis. Since wheel (152) is housed within channel (153), wheel (152) is constrained to rotate in the direction defined by assembly frame (154). As shown in FIGS. 14A-14D, pivot mount (156) is pivotally fixed to a frame (115). Therefore, rear wheel assembly (150) may rotate about pivot mount (156) relative to frame (115); and therefore relative to base member (116). Frame (115) is fixed to base member (116). Additionally, frame (115) extends upwardly from base member (116).

Figure 12:
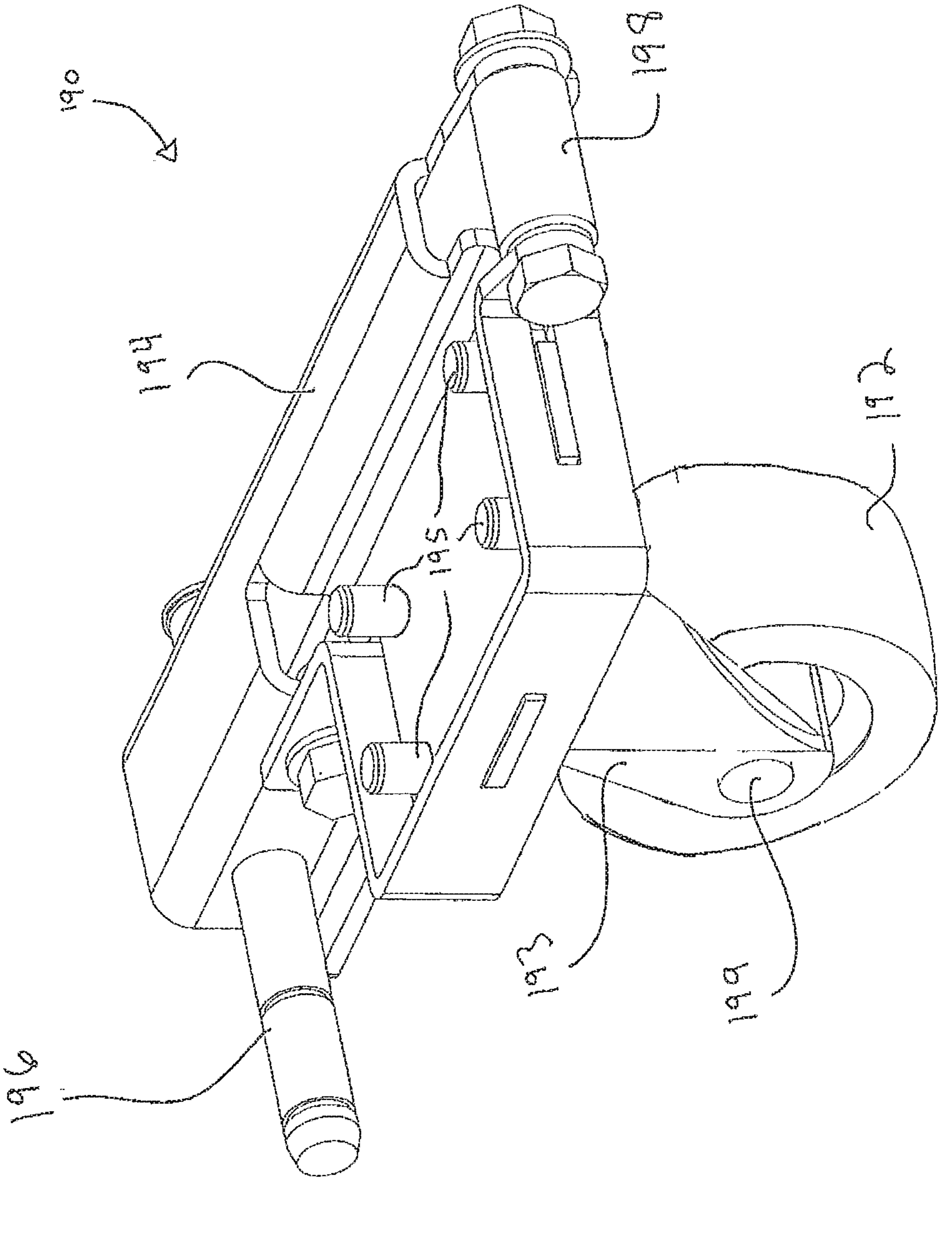
FIG. 12 depicts a perspective view of a front wheel assembly of the medical examination table of FIG. 4A.
Figure 13:
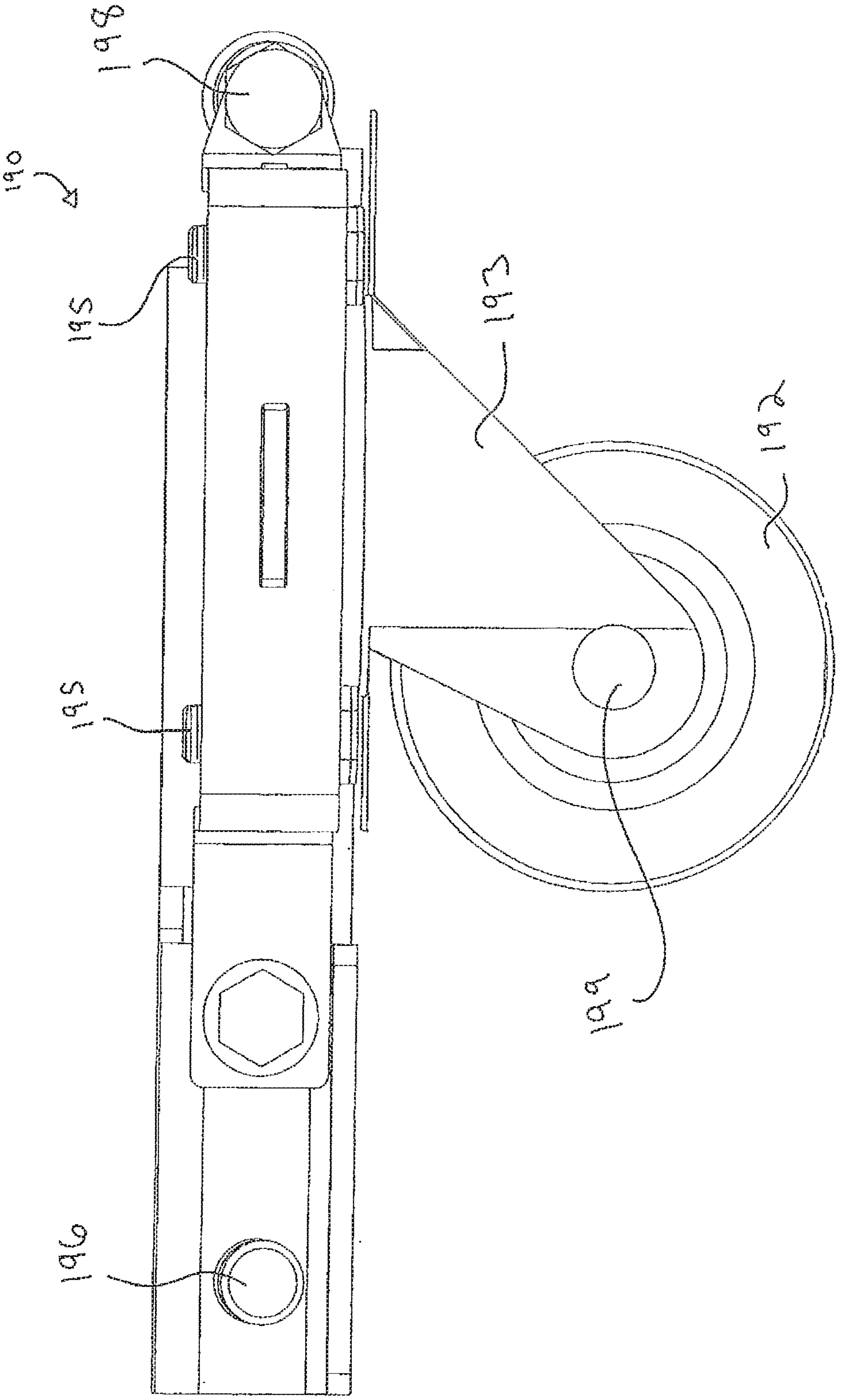
FIG. 13 depicts a side elevational view of the front wheel assembly of the medical examination table of FIG. 4A.

FIGS. 12-13 show front wheel assembly (190). Front wheel assembly includes an assembly frame (194), a pivot mount (196) pivotally fixed to one end of assembly frame (194), an engagement arm (198) rotatably attached to the opposite end of assembly frame (194) relative to pivot mount (196), a wheel (192) pivotally attached to a swivel caster (193) via pivot pin (199), and a plurality of bolts (195) attaching swivel caster (193) to assembly frame (194). It should be understood that swivel caster (193) may rotate relative to assembly frame (194). Because wheel (192) is attached to swivel caster (193) via pivot pin (199), wheel (192) may also rotate relative to assembly frame (194). Therefore, while wheel (152) of rear wheel assembly (150) is constrained to rotate in a direction defined by assembly frame (154), wheel (192) has no such constraint. In some alternative versions, wheel (152) of rear wheel assembly (150) is also mounted to a swivel caster like swivel caster (193). While four bolts (195) are used to attach swivel caster (193) to assembly frame (194) in the present example, any suitable number of bolts (195) may be used as would be apparent to one having ordinary skill in the art in view of the teachings herein. As shown in FIGS. 14A-14D, pivot mount (196) is pivotally fixed to frame (115). Therefore, front wheel assembly (190) may rotate about pivot mount (196) relative to frame (115), and therefore relative to base member (116).

While two front wheel assemblies (190) are attached to the front end of examination table (100) and two rear wheel assemblies (150) are attached to the rear end of examination table (100) in the present example, any combination of front wheel assemblies (190) and rear end assemblies (150) may be utilized. For example, four front wheel assemblies (190) may be incorporated into examination table (100). Thus, two front wheel assemblies (190) would replace the two rear wheel assemblies (150) currently shown. Alternatively, four rear wheel assemblies (150) may be incorporated into examination table (100). Any other suitable combination of wheel assemblies (150, 190) may be utilized as would be apparent to one having ordinary skill in the art in view of the teachings herein.

FIGS. 14A-14D show how actuating mobility assembly (200) may interact with wheel assemblies (150, 190) and lift mechanism (160) in order to actuate wheel assemblies (150, 190) outside of recesses (120) such that wheel assemblies (150, 190) support examination table (100), therefore providing increased mobility of examination table (100).

Figure 14A:
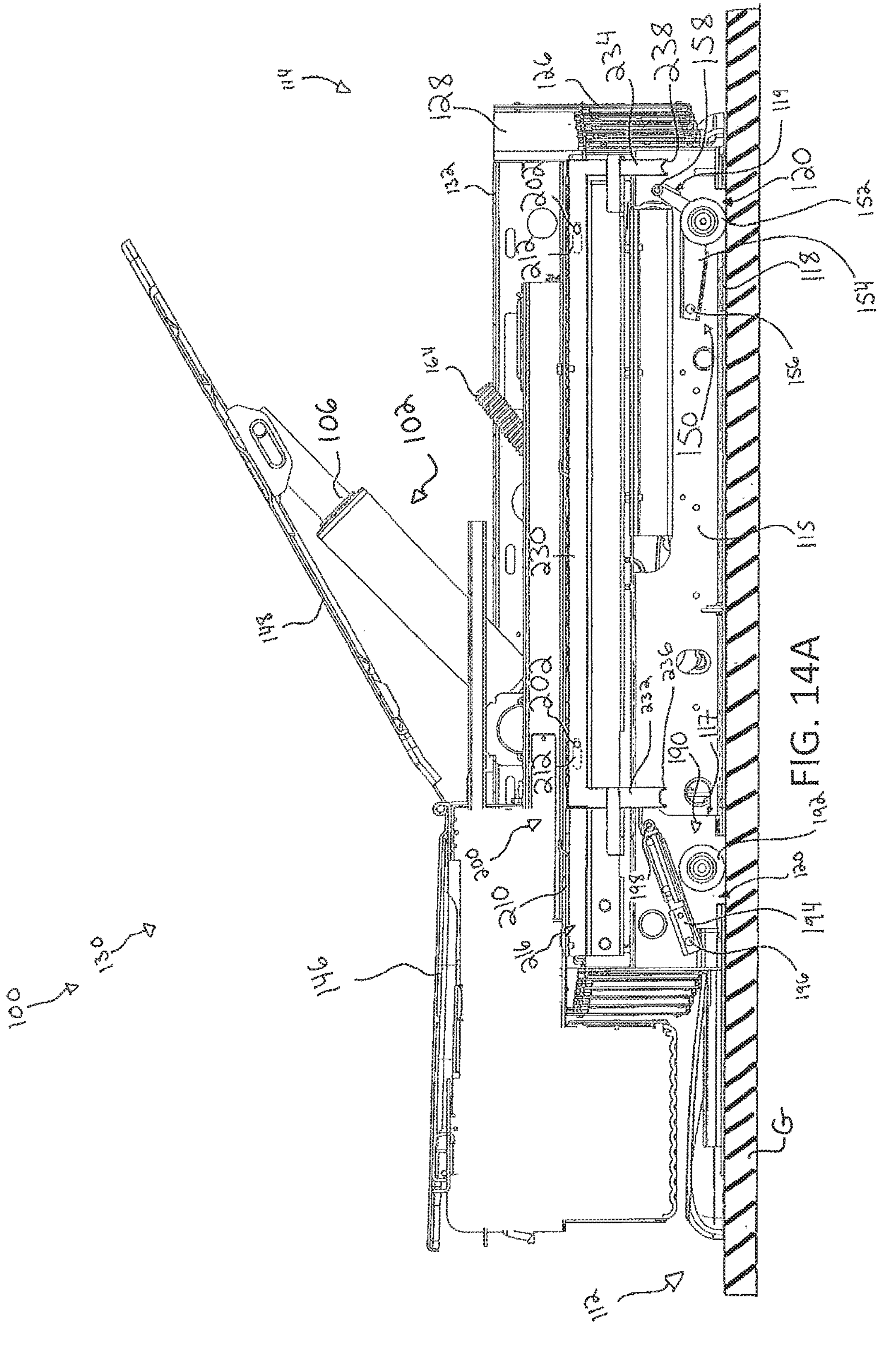
FIG. 14A depicts a cross-sectional view of the medical examination table of FIG. 4A, taken along line 14-14 of FIG. 5, where the table assembly is in the lowered position and the actuating mobility assembly of FIG. 8 is in an inactivated position.

FIG. 14A shows actuating mobility assembly (200) attached to the bottom of table assembly (114). Table assembly (114) is in a completely lowered position. Additionally, slidable beam (230) is in an inactivated position. As can be seen, arched ends (236, 238) of downwardly presented forks (232, 234) are located below and to the side of engagement arms (158, 198). Additionally, wheel assemblies (150, 190) are both rotated about their respective pivot mounts (156, 196) such that wheels (152, 192) are located above recesses (120) of base plate (118). Examination table (100) is thus supported by base plate (118) in this state.

Figure 14B:
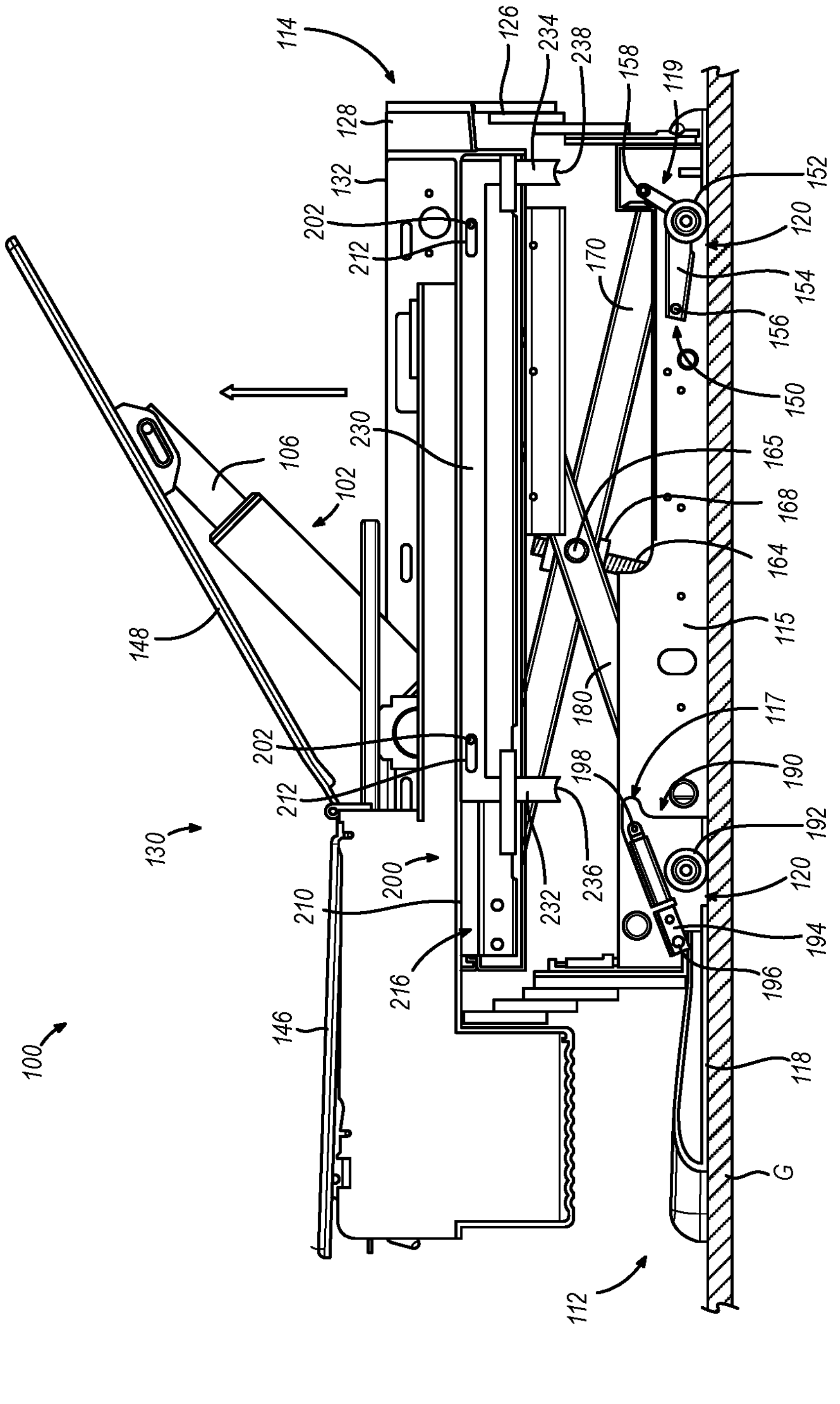
FIG. 14B depicts a cross-sectional view of the medical examination table of FIG. 4A, taken along line 14-14 of FIG. 5, where the table assembly is in a partially raised position and the actuating mobility assembly of FIG. Bis in the inactivated position.
Figure 14C:
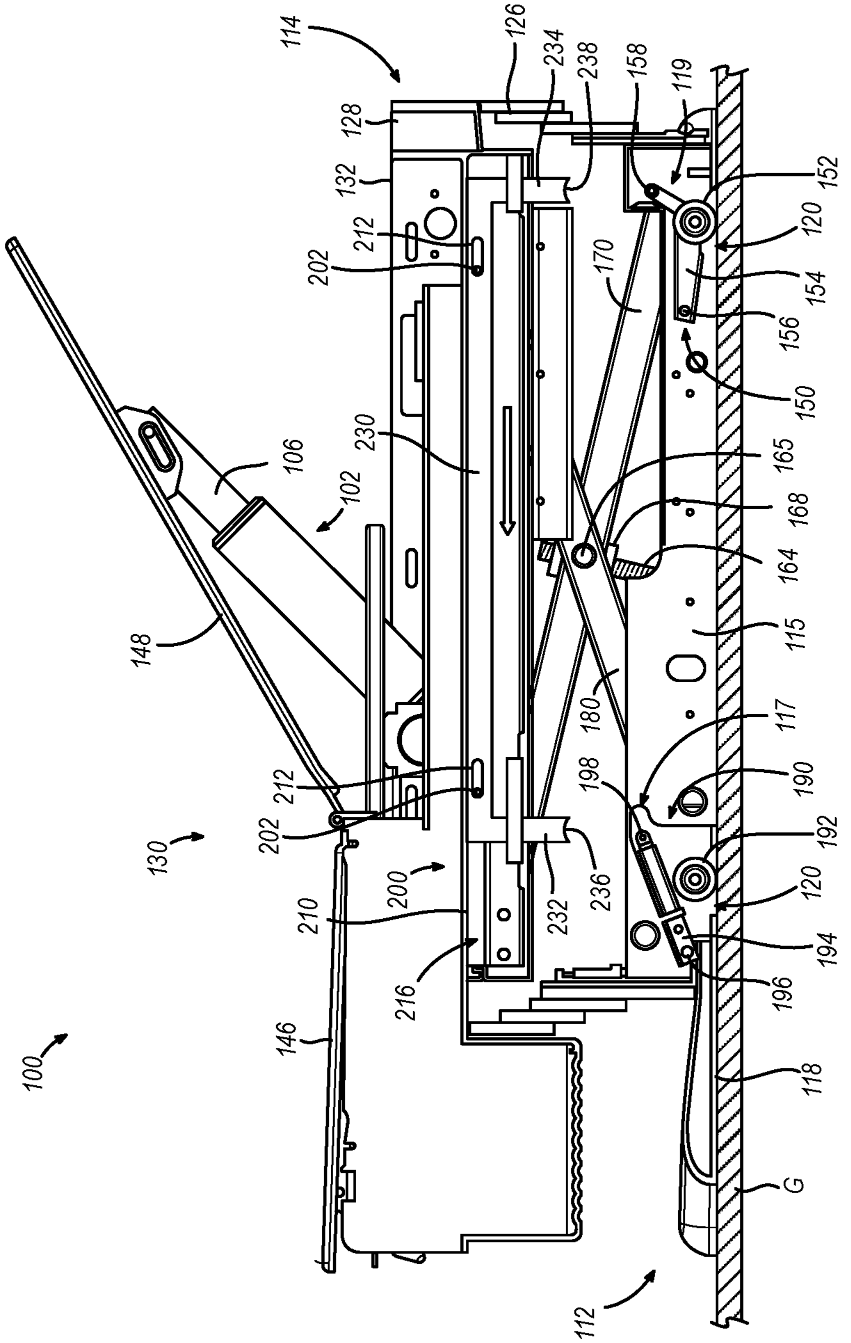
FIG. 14C depicts a cross-sectional view of the medical examination table of FIG. 4A, taken along line 14-14 of FIG. 5, where the table assembly is in the partially raised position and the actuating mobility assembly of FIG. 8 is in the activated position.

As shown in FIG. 14B, a user may activate lift mechanism (160) in order to raise actuating mobility assembly (200) in the vertical direction. Arched ends (236, 238) of downwardly presented forks (232, 234) are then positioned above respective engagement arms (158, 198). As shown in FIG. 14C, a user may then actuate slidable beam (230) within guide channel (216) of mounting frame (210) such that arched ends (236, 239) of downwardly presented forks (232, 234) are longitudinally aligned with respective engagement arms (198, 158).

Figure 14D:
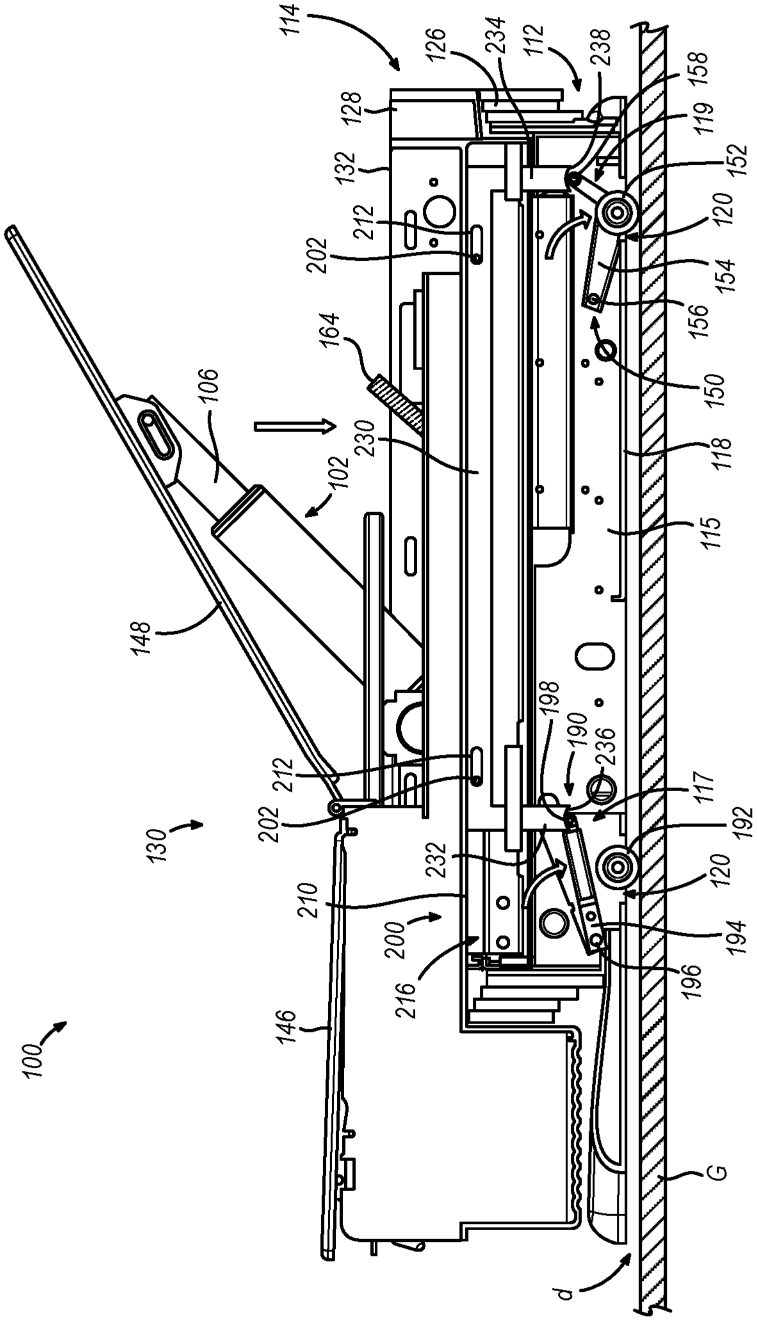
FIG. 14D depicts a cross-sectional view of the medical examination table of FIG. 4A, taken along line 14-14 of FIG. 5, where the table assembly is in the lowered position and the actuating mobility assembly of FIG. 8 is in the activated position.

As shown in FIG. 14D, a user may then activate lift mechanism (160) in order to lower actuating mobility assembly (200) in the vertical direction until table assembly (114) is in a completely lowered position. Since arched ends (236, 238) are longitudinally aligned with respective engagement arms (198, 158), arched ends (236, 238) of downwardly presented forks (232, 234) eventually make contact with engagement arms (198, 158). Contact between downwardly presented forks (232, 234) and engagement arms (198, 158) pivots wheel assemblies (190, 150) about their respective pivot mounts (196, 156), such that wheels (192, 152) eventually extend through recesses (120) of base plate (118). At this stage, wheels (192, 152) define a gap distance (d) between base plate (118) and ground (G). Thus, wheels (192, 152) support examination table (100) in this state, and a user may push or pull examination table on wheels (192, 152) to easily move examination table (100).

Gap distance (d) could be dimensioned in order to prevent examination table (100) from being taken out of an examination room. For example, some examination rooms may have boundary strips located at the threshold of a doorway. Such strips may extend upwardly from the ground a certain distance (e.g., approximately 1 inch). Gap distance (d) may be smaller than the distance defined by such strips. Thus, if a user attempted to move examination table (100) outside of examination room, base member (116) would abut against the strip, thereby preventing removal of examination table (100) from the examination room. Of course, any other suitable gap distance (d) may be utilized as will be apparent to one having ordinary skill in the art in view of the teachings herein. For example, gap distance (d) could be dimensioned larger than the thickness of boundary strips located at the threshold of a doorway. Moreover, some examination rooms may lack boundary strips at doorways, such that the gap distance (d) will not affect the ability to move examination table (100) through a doorway to exit an examination room. It should therefore be understood that the inventors contemplate the ability to move examination table (100) outside of an examination room in some instances.

After examination table (100) has been moved (e.g., for cleaning the floor under examination table (100)) and then repositioned to the location where it is intended to be used for patient examinations, the user may reverse the sequence described above with references to FIGS. 14A-14D. In particular, the user may activate lift mechanism (160) in order to raise actuating mobility assembly (200) in the vertical direction. This will cause forks (232, 234) to relieve the downwardly exerted forces against engagement arms (158, 198). As the downwardly exerted forces against engagement arms (158, 198) are relieved, the weight of examination table (100) will cause wheel assemblies (150, 190) to pivot back to the positions shown in FIG. 14C, such that examination table (100) will once again be supported by base plate (118). The user may then actuate slidable beam (230) within guide channel (216) of mounting frame (210) such that arched ends (236, 238) of downwardly presented forks (232, 234) are moved to the positions shown in FIG. 14B, where forks (232, 234) are no longer aligned with engagement arms (158, 198). The user may then return examination table (100) to the lowered configuration as shown in FIG. 14A.

In some versions, a resilient member (e.g., spring, etc.) may be employed to bias slidable beam (230) within guide channel (216) toward the positions shown in FIGS. 14A-

14B. Thus, when the user activates lift mechanism (160) in order to raise actuating mobility assembly (200) in the vertically upward direction, the resilient member may translate slidable beam (230) within guide channel (216) when downwardly presented forks (232, 234) no longer exert forces against engagement arms (158, 198). In other words, slidable beam (230) may automatically translate to a position where downwardly presented forks (232, 234) are no longer aligned with engagement arms (158, 198) once actuating mobility assembly (200) is raised in the vertically upward direction. This may eliminate the need for the user to actuate slidable beam (230) within guide channel (216) of mounting frame (210) in order to return examination table (100) to the lowered configuration as shown in FIG. 14A. Various suitable kinds of resilient members and assemblies that may be used to provide this resilient bias to slidable beam (230) will be apparent to one having ordinary skill in the art in view of the teachings herein. It should also be understood that this resilient bias may prevent scenarios where cleaning personnel leaves mobility assembly (200) actuated (such that base plate (118) is still raised from the ground (G)) and a doctor thereafter lifts a patient with examination table (100) while mobility assembly (200) is still actuated.

Figure 15:
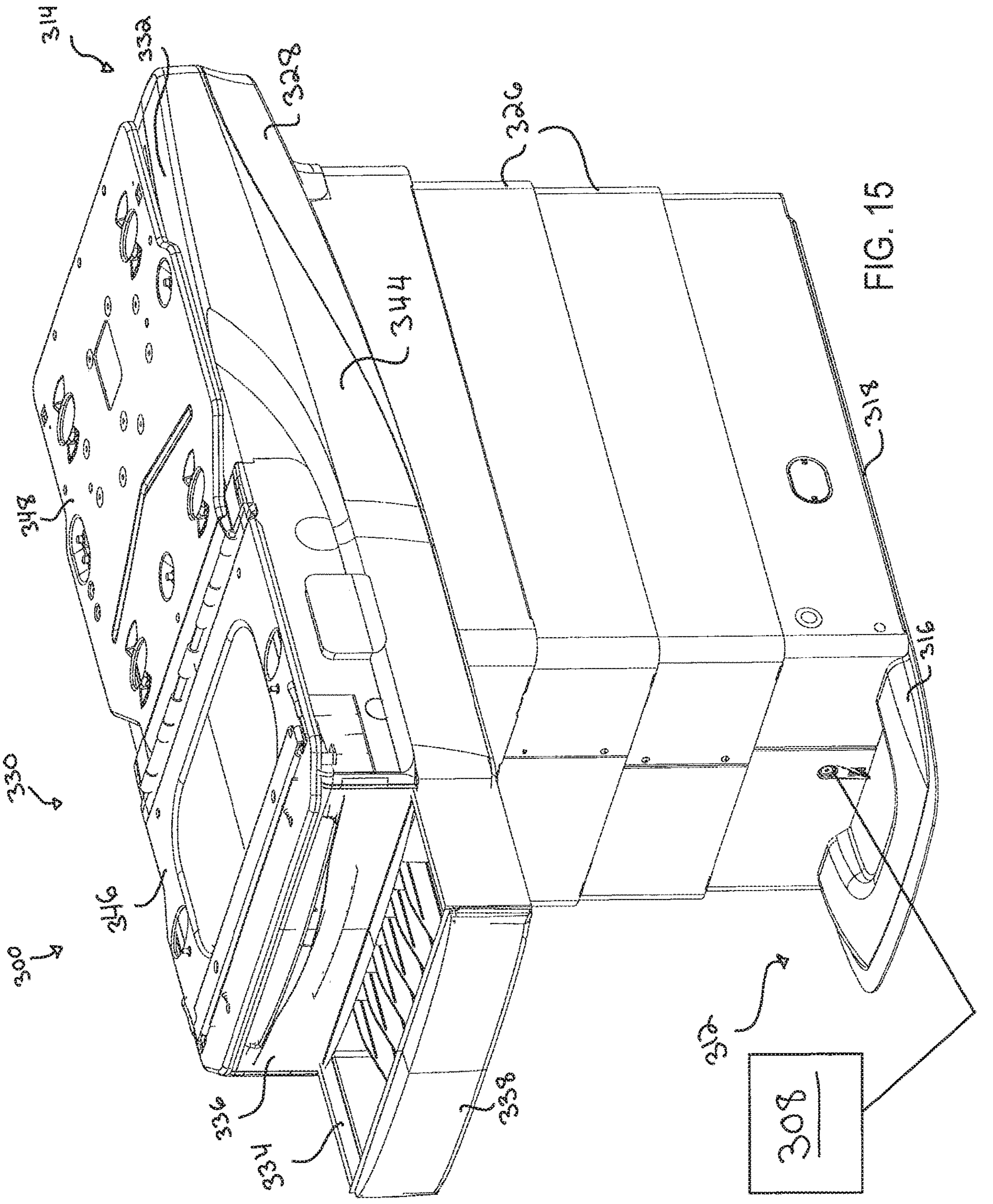
FIG. 15 depicts a perspective view of another exemplary medical examination table, with certain housing and cushion components removed for clarity, where the table assembly is in a raised position.
Figure 16A:
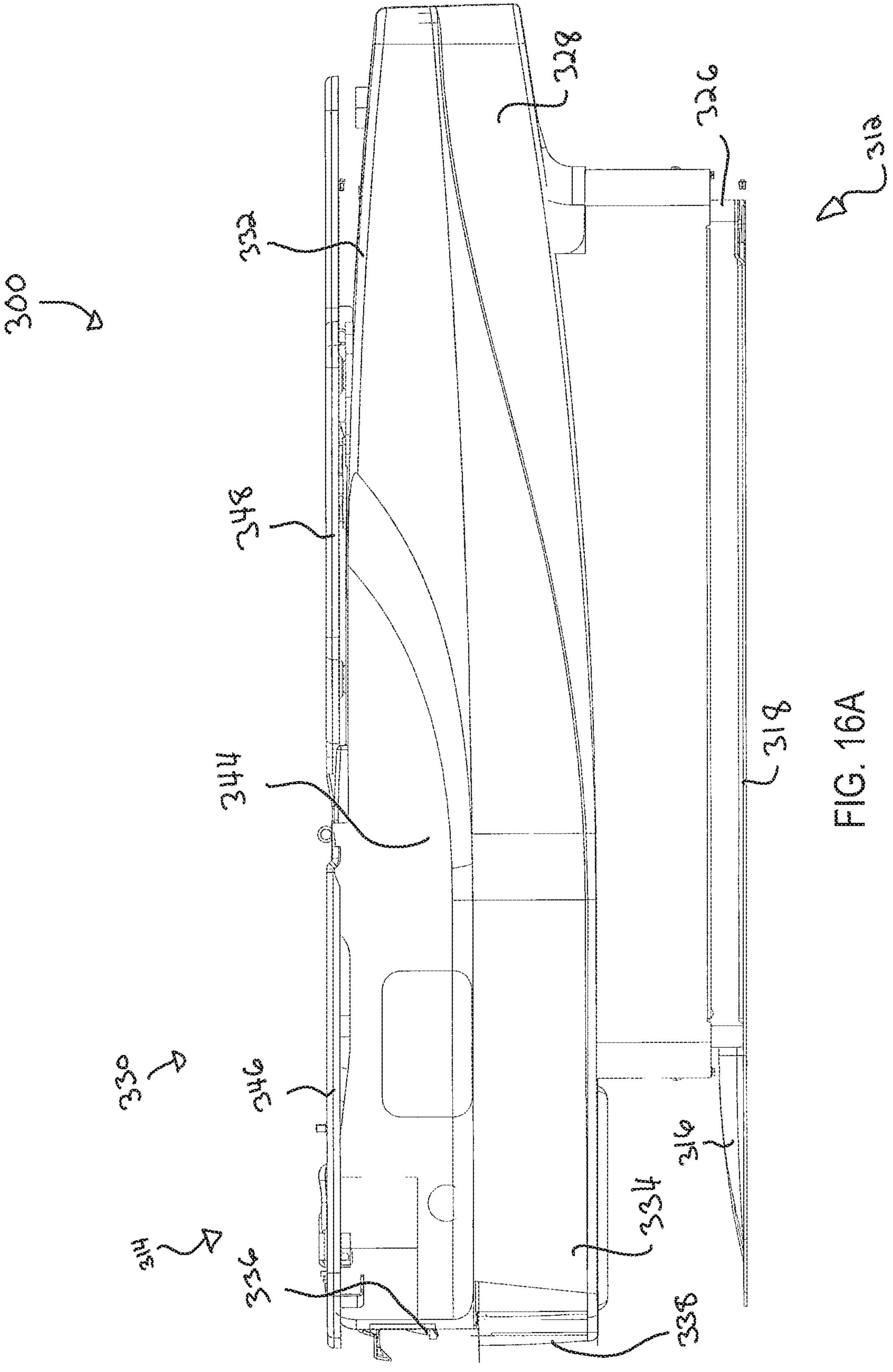
FIG. 16A depicts a side elevational view of the medical examination table of FIG. 15, with certain housing and cushion components removed for clarity, where the table assembly is in a lowered position.
Figure 16B:
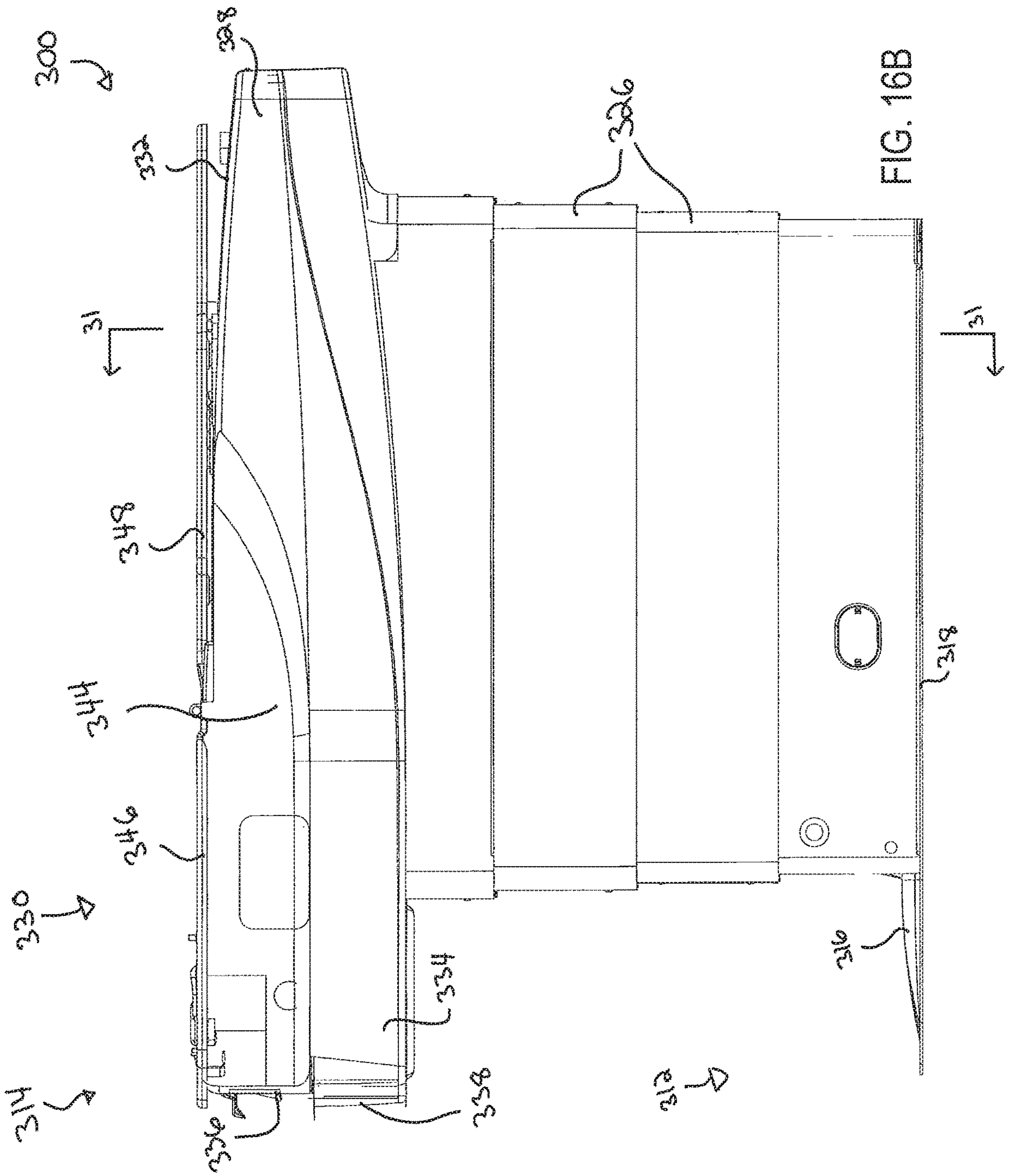
FIG. 16B depicts a side elevational view of the medical examination table of FIG. 15, with certain housing and cushion components removed for clarity, where the table assembly is in a raised position.
Figure 16C:
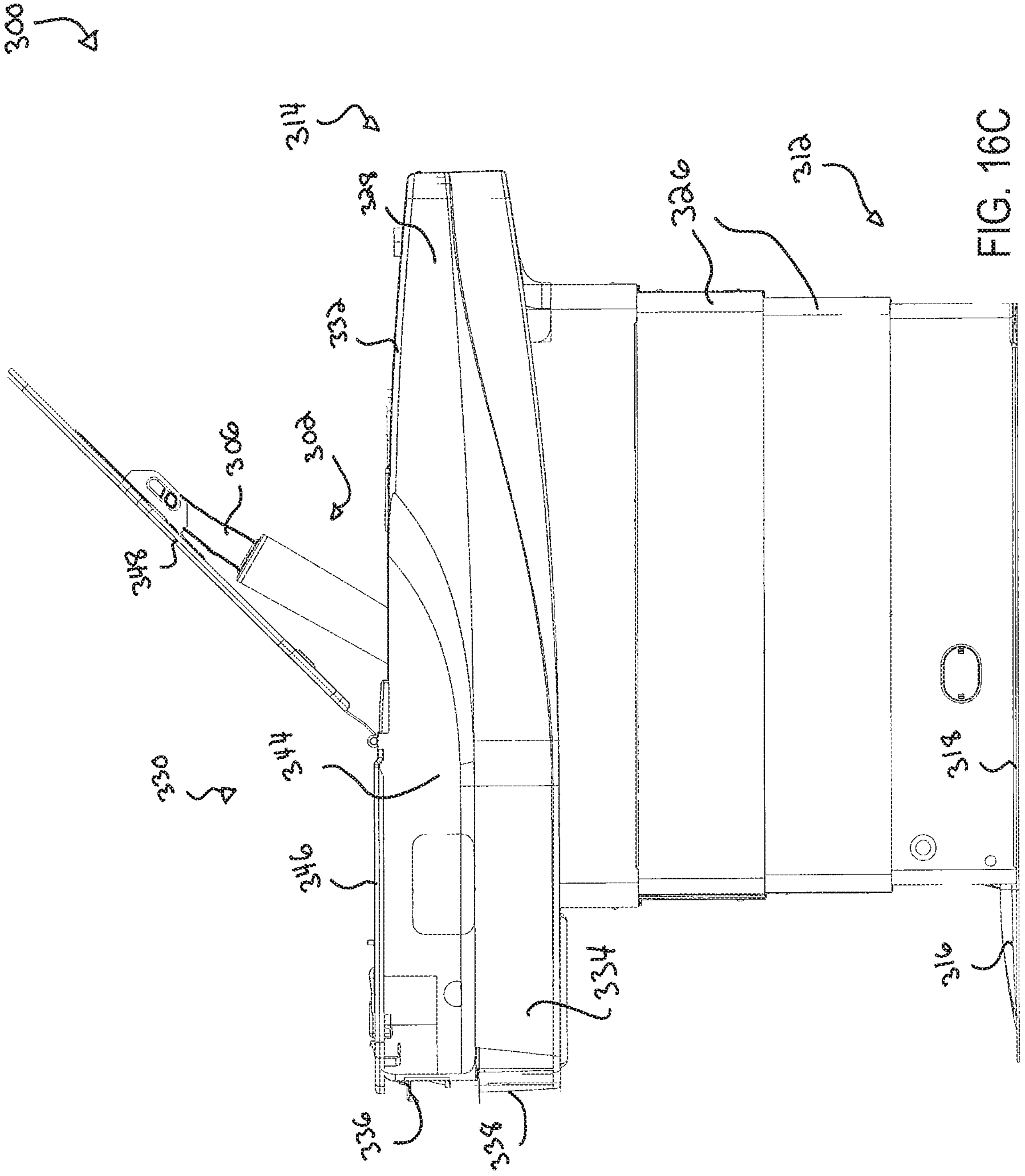
FIG. 16C depicts a side elevational view of the medical examination table of FIG. 15, with certain housing and cushion components removed for clarity, where the table assembly is in a raised position, and a reclining mechanism is in the raised position.
Figure 17:
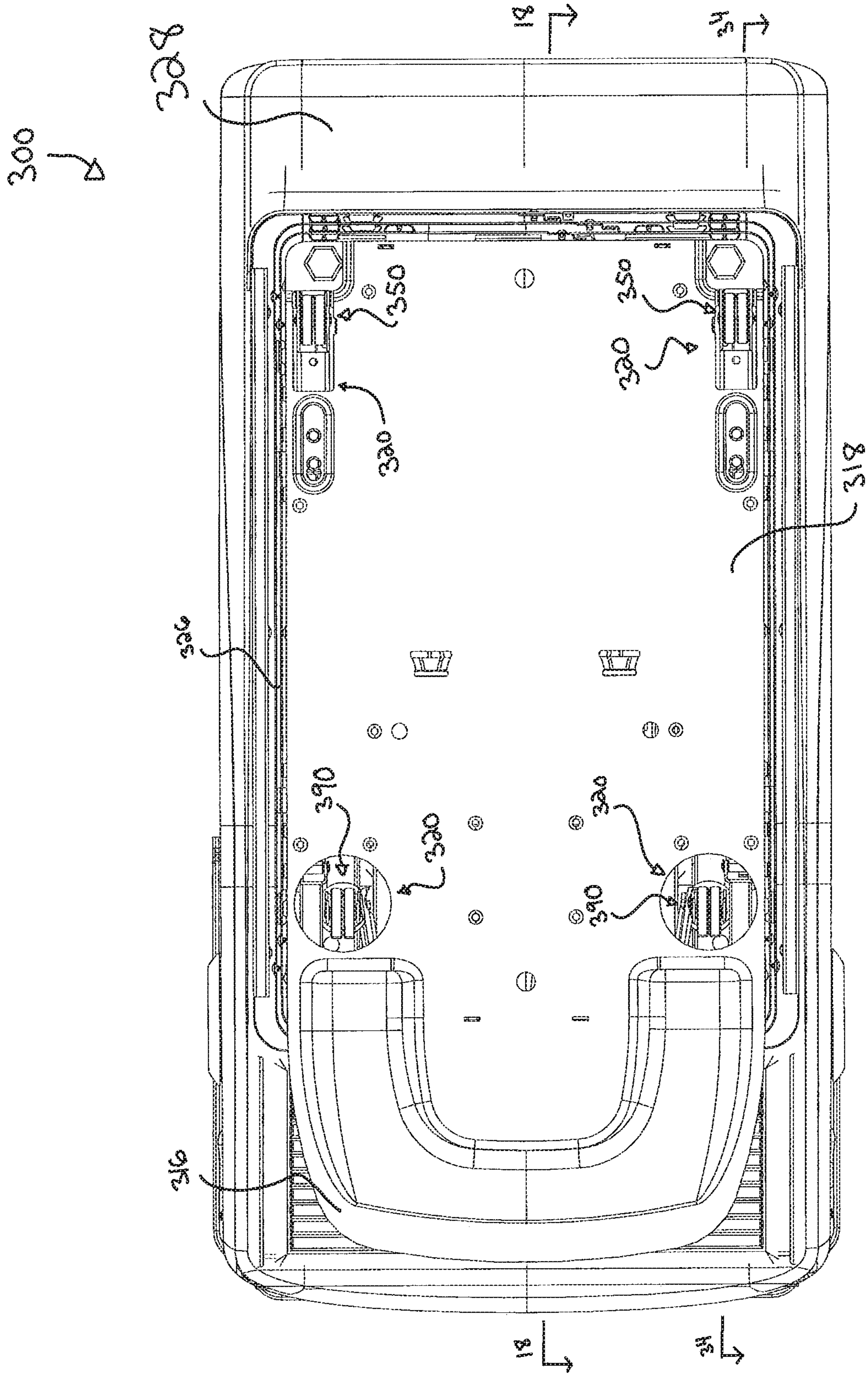
FIG. 17 depicts a bottom plan view of the medical examination table of FIG. 15.

B. Second Exemplary Alternative Medical Examination Table with Selective Mobility FIGS. 15-17 show another exemplary examination table (300) with a pair of front wheel assemblies (390) and a pair of rear wheel assemblies (350). Similar to examination wheel assemblies (190, 150) described above, and as will be described in greater detail below, both front wheel assemblies (390) and rear wheel assemblies (350) are configured to selectively support examination table (300) in order to provide increased mobility of examination table (100). Examination table (300) is substantially similar to examination table (10,100) described above, with the differences elaborated below. It should therefore be understood that, in addition to incorporating the features and operability described below, examination table (300) may incorporate the various features and operability of examination table (10, 100) described above. Moreover, in addition to incorporating the features and operability described below, examination table (300) may be configured and operable in accordance with at least some of the teachings of the various references that are cited herein. Various ways in which the below teachings may be combined with the teachings above and/or with the teachings of the references cited herein will be apparent to those of ordinary skill in the art.

Examination table (300) includes a base assembly (312) and a table assembly (314), which are substantially similar to base assembly (12, 112) and table assembly (14, 114) described above, respectively, with differences elaborated below. It should therefore be understood that, as shown in FIGS. 16A-16B, table assembly (114) may rise and lower relative to a base member (316) of base assembly (312). A telescoping shroud (326) telescopes relative to base member (316) and table assembly (314) when table assembly (314) rises or lowers relative to base member (316) of base assembly (312).

Base member (316) further includes a base plate (318). As best seen in FIG. 17, base plate (318) defines a plurality of recesses (320) that are adjacent to either front wheel assembly (390) or rear wheel assembly (350). Base plate (318) is located at the bottom of examination table (300) such that base plate (318) makes contact with ground (G), thereby supporting examination table (300), when wheel assemblies (350, 390) are retracted within base assembly (312). Examination table (300) is thus supported on base plate (318) when wheel assemblies (350, 390) are retracted within base assembly (312). Base plate (318) provides substantial friction with ground (G) such that examination table (300) is effectively immobile when examination table (300) is being supported by base plate (318) in direct contact with ground (G). In other words, absent some form of mechanical assistance, a normal human operator would be unable to push examination table (300) along ground (G) when examination table (300) is being supported by base plate (318) with wheel assemblies (350, 390) retracted within base assembly (312).

Table assembly (314) includes a support surface (330), a table frame (328), a side surface (344), an upper surface (332) and a front surface (338); which are substantially similar to support surface (30, 130), table frame (28, 128), side surface (44, 144), upper surface (32, 132), and front surface (38, 138) described above, respectively. Therefore, table frame (328) may include a plurality of storage drawers (334) and retractable instrument pans (336) at front surface (338), which are substantially similar to storage drawers (34, 134) and retractable instrument pans (36, 136), respectively.

As shown in FIG. 15, examination table (300) includes a control port (308) that may be used to actuate examination table (300) toward various positions. Control port (308) may be substantially similar to either control panel (60, 108) described above. Control port (308) may also control various features described below in order to actuate examination table (300) toward various positions. However, it should be understood be understood that foot pedal (62) may be readily incorporated into examination table (300) in order to actuate examinable table (300) toward various positions.

Figure 18A:
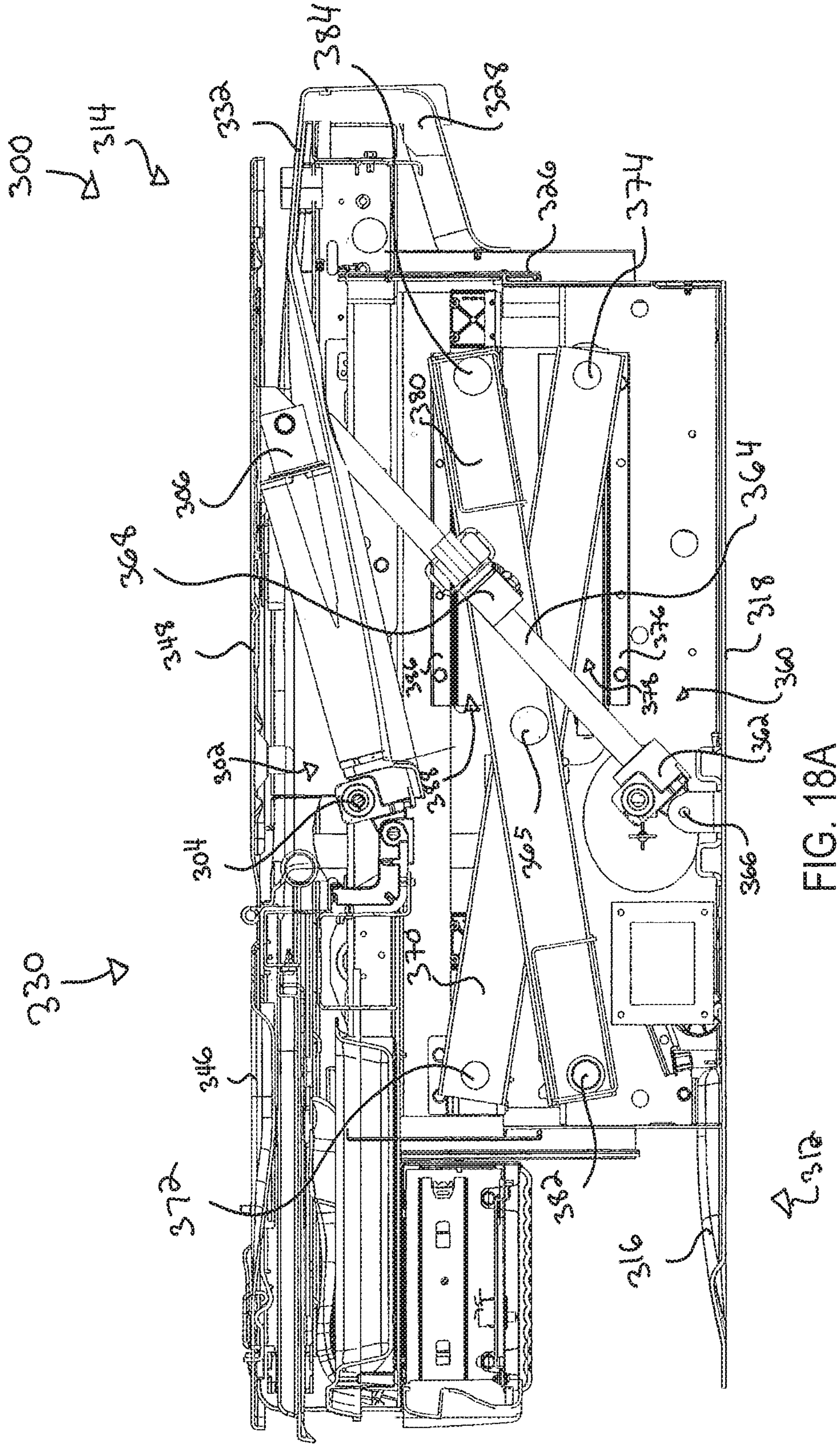
FIG. 18A depicts a cross-sectional view of the medical examination table of FIG. 15, taken along line 18-18 of FIG. 17, where the table assembly is in the lowered position.
Figure 18B:
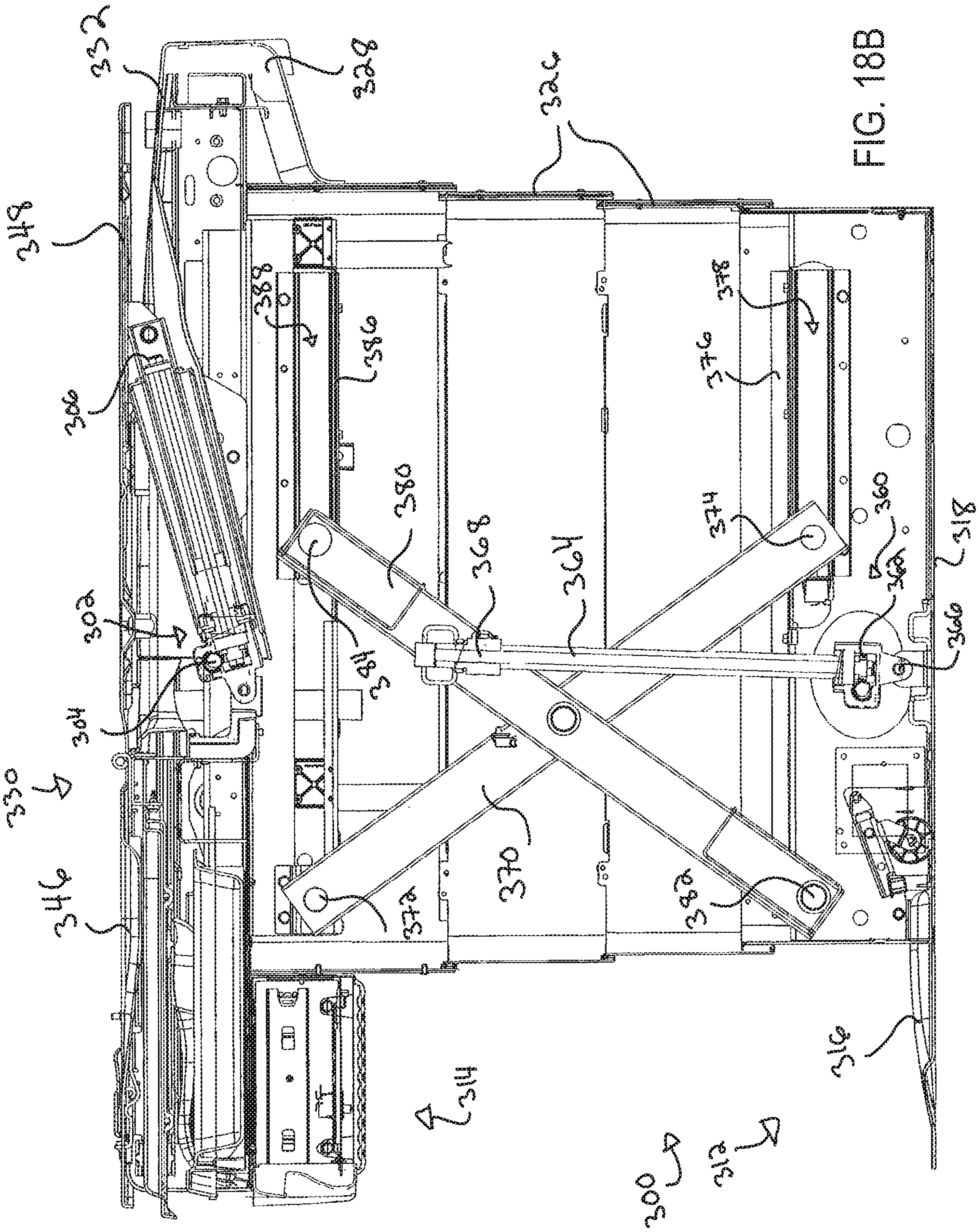
FIG. 18B depicts a cross-sectional view of the medical examination table of FIG. 15, taken along line 18-18 of FIG. 17, where the table assembly is in the raised position.
Figure 19:
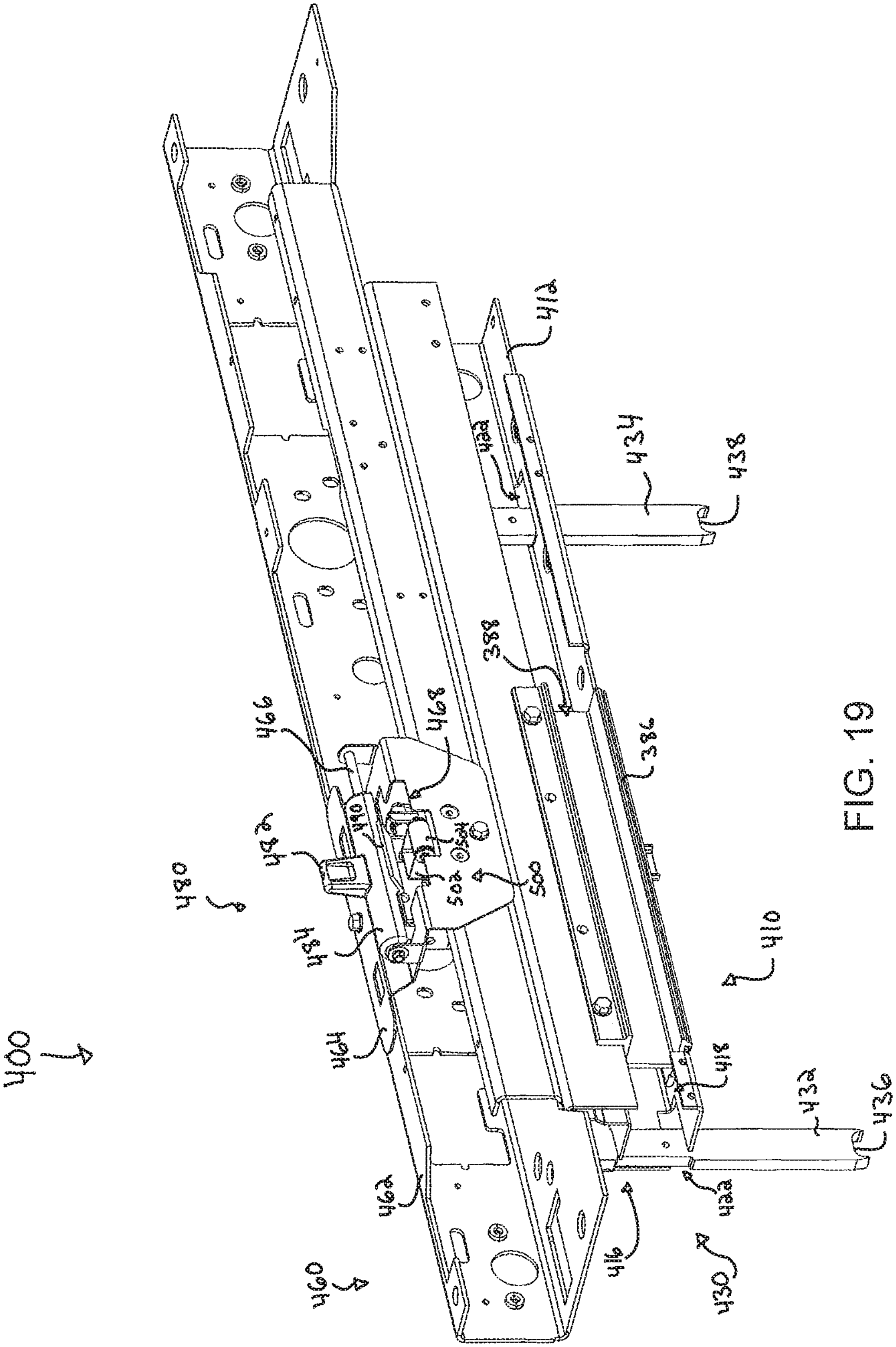
FIG. 19 depicts a perspective view of an actuating mobility assembly of the medical examination table of FIG. 15.
Figure 20:
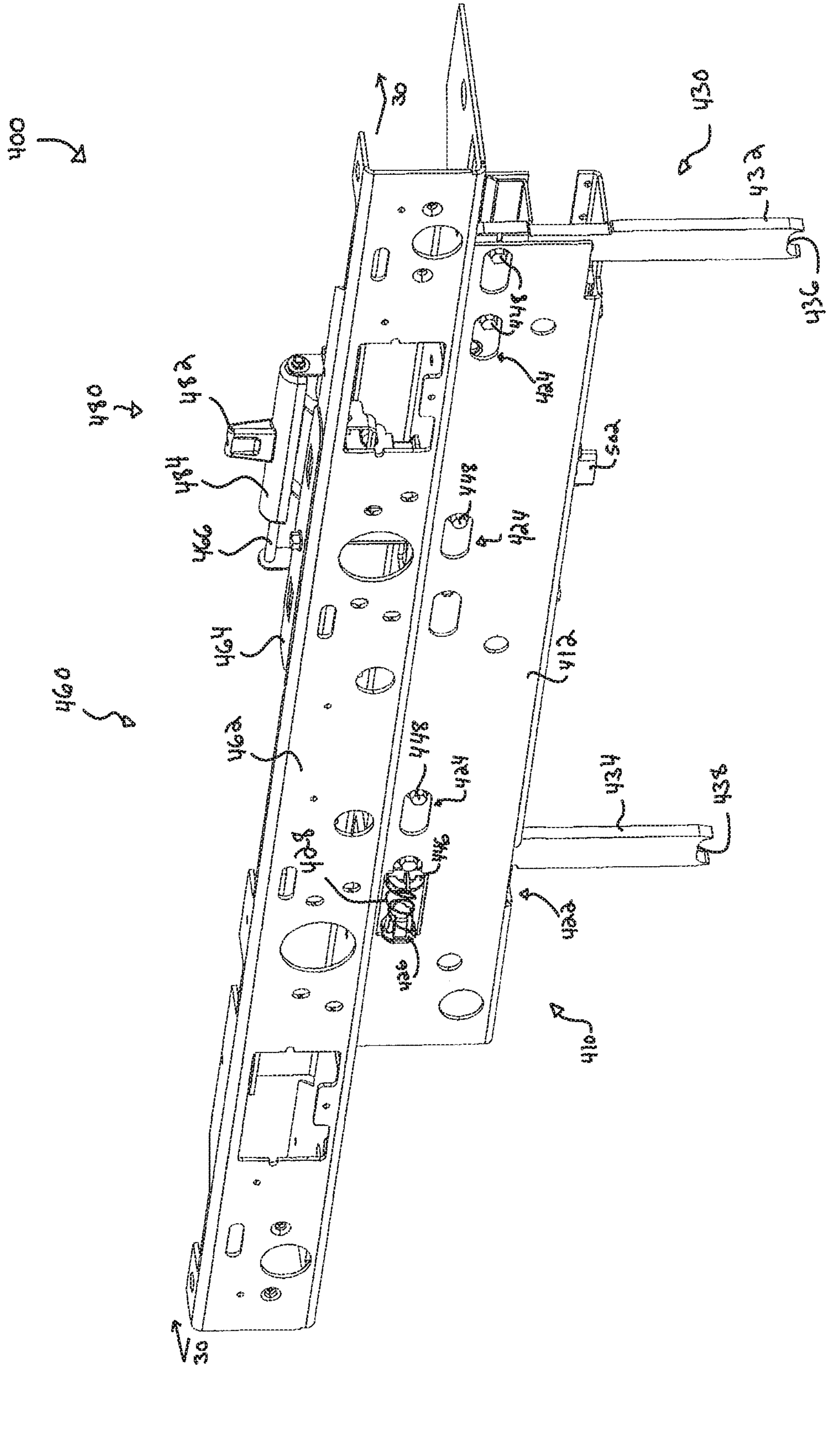
FIG. 20 depicts another perspective view of the actuating mobility assembly of FIG. 19.
Figure 21:
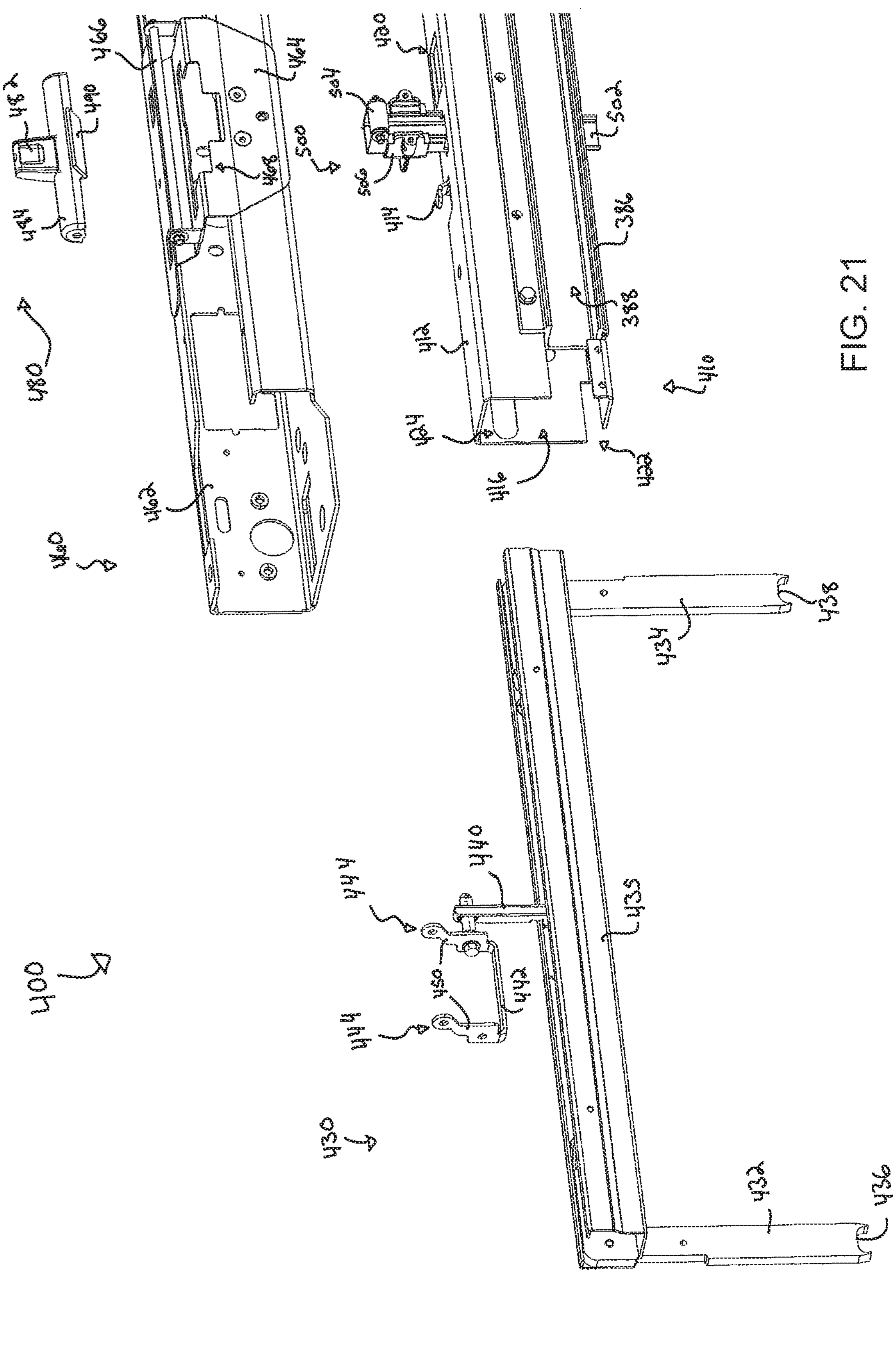
FIG. 21 depicts an exploded perspective view of the actuating mobility assembly of FIG. 19.

Further, support surface (330) is divided into a seat portion (346) and a backrest portion (348). Like support surface (30), support surface (330) may be generally padded or cushioned to more conformably accommodate a patient. Seat portion (346) is rigidly coupled to upper surface (332) of table frame (328) adjacent to front surface (338). Backrest portion (348) extends behind seat portion (346) and may be pivoted with respect to seat portion (346). As best seen in FIGS. 16 and 18A-18B, table assembly (314) further includes a reclining mechanism (302). Reclining mechanism (302) includes a backrest motor (304), and a lift cylinder (306) that is pivotally coupled with backrest portion (348) and table frame (328). Backrest motor (304) may actuate lift cylinder (306) in order to pivot backrest portion (348) relative to seat portion (346). Control port (308) may control backrest motor (304) in order to actuate lift cylinder (306). Therefore, as shown between FIGS. 16B-16C, a user may utilize control port (308) in order to pivot backrest portion (348) relative to seat portion (346). While motor (304) and lift cylinder (306) are used in the present example, it should be understood that any other suitable mechanisms may be utilized to pivot backrest portion (348) relative to seat portion (346) as would be apparent to one having ordinary skill in the art in view of the teachings herein. For example, a hydraulic assembly may be utilized to actuate lift cylinder (306). Alternatively, a threaded rod may be utilized instead of lift cylinder (306).

As best seen in FIGS. 18A-18B, examination table (300) further includes a lift mechanism (360) that is coupled to base assembly (312) and table assembly (314). As will be described in greater detail below, lift mechanism (360) is capable of actuating table assembly (314) in the vertical direction relative to base member (316). Lift mechanism (360) includes a motor (362) that is pivotally coupled to base member (316) via pivot pin (366). Lift mechanism (360)

further includes a threaded rod (364) extending from motor (362), a ball screw nut (368) coupled to threaded rod (364), a pair of lift beams (370, 380), a pair of fixed shafts (372, 382), and a pair of sliding shafts (384, 374).

Motor (362) is capable of rotating threaded rod (364) in a clockwise and counterclockwise direction about the longitudinal axis of threaded rod (364). Additionally, ball screw nut (368) is coupled to threaded rod (364) via complementary threading, such that ball screw nut (368) forms a nut. Therefore, rotation of threaded rod (364) about its own longitudinal axis drives ball screw nut (368) along the length of threaded rod (364). The direction in which ball screw nut (368) travels relative to threaded rod (364) is dependent on the direction in which threaded rod (364) rotates about its own longitudinal axis.

Lift beam (380) is rotatably coupled to ball screw nut (368). Lift beam (180) may be rotatably coupled to ball screw nut (368) via a pin, similar to pin (165) described above. A Pin (365) pivotably couples lift beams (370, 380) to each other, such that lift beams (370, 380), ball screw nut (368), and pin (365) form a scissor assembly. Additionally, lift beam (370) is pivotally coupled to fixed shaft (372) and sliding shaft (374); while lift beam (380) is pivotally coupled to fixed shaft (382) and sliding shaft (374). Fixed shaft (372) is fixed relative to table assembly (314) while fixed shaft (382) is fixed relative to base member (316). Additionally, sliding shaft (374) is slidably disposed within a slot (378) defined by fixed plate (376); while sliding shaft (384) is slidably disposed within slot (388) defined by fixed plate (386). Fixed plate (376) is fixed relative to base member (316) while fixed plate (386) is fixed relative to table assembly (314). Therefore, as best seen in the sequence depicted in FIGS. 18A-18B, activation of motor (362) will cause lift beams (370, 380) to pivot relative to each other in a scissoring fashion, which will in turn provide raising and lowering of table assembly (314) relative to base member (316).

For example, if motor (362) is activated to rotate threaded rod (364) in a first rotational direction about the longitudinal axis of threaded rod (364), ball screw nut (368) travels up threaded rod (364). Because ball screw nut (368) is pivotally coupled to lift beam (380), ball screw nut (368) raises lift beam (380) by pivoting lift beam (380) about fixed shaft (382) while sliding shaft (384) translates and pivots within slots (388). Because lift beam (370) is pivotably coupled with lift beam (380) via pin (365), lift beam (380) raises lift beam (370) by pivoting lift beam (370) about fixed shaft (372) while sliding shaft (374) translates and pivots within slot (378). Motor (362), threaded rod (364), and ball screw nut (368) rotate about pivot pin (366) while table assembly (314) ascends vertically relative to base member (316). Of course, if motor (362) is activated to rotate threaded rod (364) in a second, opposite, rotational direction about the longitudinal axis of threaded rod (364), then table assembly (314) will descend vertically relative to base member (316).

While lift mechanism (360) is used to vertically actuate table assembly (314) relative to base member (316) in this example, it should be understood that any other suitable mechanism may be utilized to vertically actuate table assembly (314) relative to base member (316), such as lift mechanism (20, 160) described above, any of the lift mechanisms described in any of the references that are cited herein, or any other suitable mechanism that would be apparent to one having ordinary skill in the art in view of the teachings herein.

FIGS. 19-31 show components of another exemplary actuating mobility assembly (400). As will be described in greater detail below, actuating mobility assembly (400) may be attached to table assembly (314) in order to selectively lift base plate (318) from the ground (G) such that wheel assemblies (350, 390) support examination table (300) instead of base plate (318) supporting examination table (300).

Actuating mobility assembly (400) includes a beam mounting frame (410), a slidable beam assembly (430), an actuating mounting frame (460), and an actuation assembly (480). As will be described in greater detail below, beam mounting frame (410) and actuating mounting frame (460) are fixed relative to each other and to table assembly (314) while actuation assembly (480) is configured to translate slidable beam assembly (430) relative to frames (410, 460) in order to selectively transition beam assembly (430) from an inactivated state to an activated state and vice versa. Slidable beam assembly (430) may translate from the inactivated state to an activated state when table assembly (314) is lifted from the lowered position. If table assembly (314) is moved to the lowered position when slidable beam assembly (430) is in the activated state, slidable beam assembly (430) may contact wheel assemblies (350, 390) such that wheel assemblies (350, 390) support examination table (300) instead of base plate (318). Additionally, slidable beam assembly (430) may be biased toward the inactivated state such that slidable beam assembly (430) may automatically translate from the activated state to the inactivated state after slidable beam assembly (430) no longer contacts wheel assemblies (350, 390).

Figure 22:
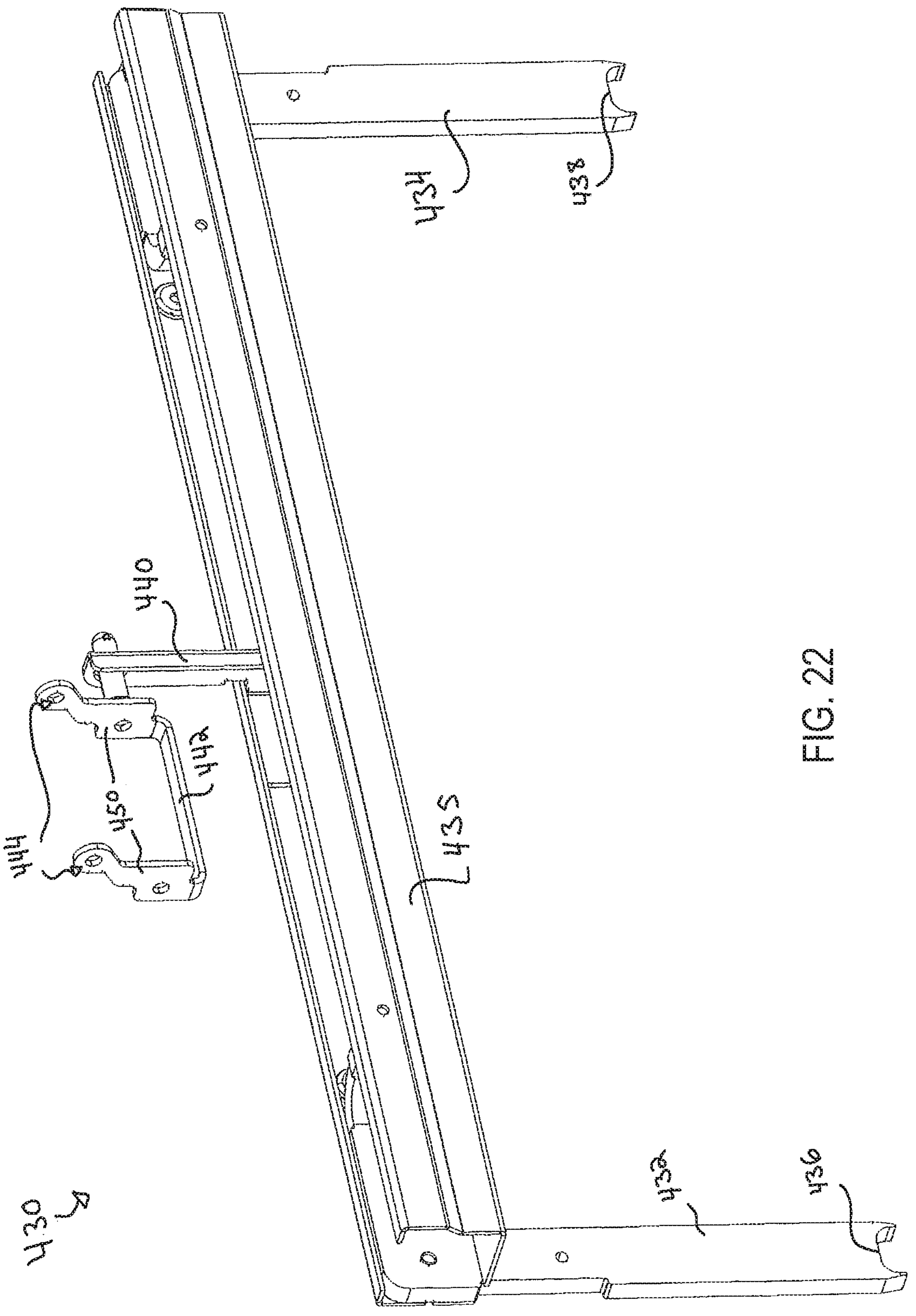
FIG. 22 depicts a perspective view of a slidable beam assembly of the actuating mobility assembly of FIG. 19.
Figure 23:
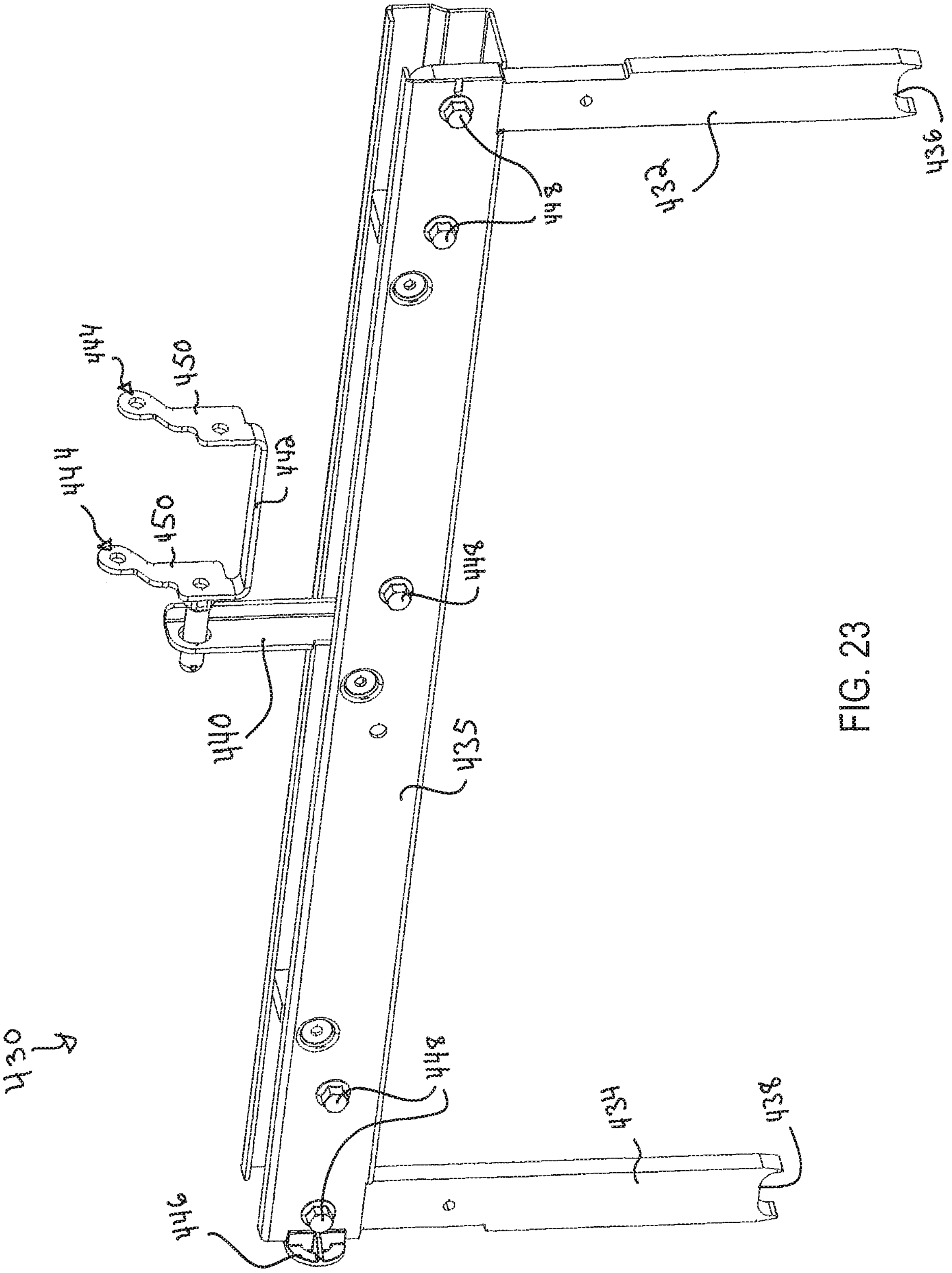
FIG. 23 depicts another perspective view of the slidable beam assembly of FIG. 22.

As best seen in FIGS. 22-23, slidable beam assembly (430) includes a U-shaped body (435), a pair of downwardly presented forks (432, 434), a vertical arm (440) extending upwardly from U-shaped body (435), a coupling bracket (442) fixed to vertical arm (440), and a spring perch (446) attached to a terminating end of U-shaped body (435). U-shaped body (435) is dimensioned to slide within beam mounting frame (410). Spring perch (446) is dimensioned to align with a corresponding spring perch (426) (426) of beam mounting frame (410) such that spring perches (426, 446) support a bias spring (428) when actuating mobility assembly (400) is properly assembled. As will be described in greater detail below, bias spring (428) imparts a biasing force between slidable beam assembly (430) and beam mounting frame (410), such that slidable beam assembly (430) is biased toward the inactivated state.

Downwardly presented forks (432, 434) and vertical arm (440) are attached to the interior of U-shaped body (435) via mounting bolts (448). Downwardly presented forks (433, 434) terminate at arched ends (436, 438) respectively. As will be described in greater detail below, arched ends (436, 438) of downwardly presented forks (432,434) are configured to selectively align with portions of wheel assemblies (350, 390) in the activated position in order to rotate wheel assemblies (350, 390) through recesses (420) to lift base plate (318) from ground (G).

Coupling bracket (442) includes a pair of prongs (450) extending upwardly and each defining a coupling bore (444). As will be described in greater detail below, prongs (450) are dimensioned for a keyed fit with a portion of actuation assembly (480) while coupling bores (444) are dimensioned to slidably couple with a slide bar (466) of actuating mounting frame (460).

Figure 24:
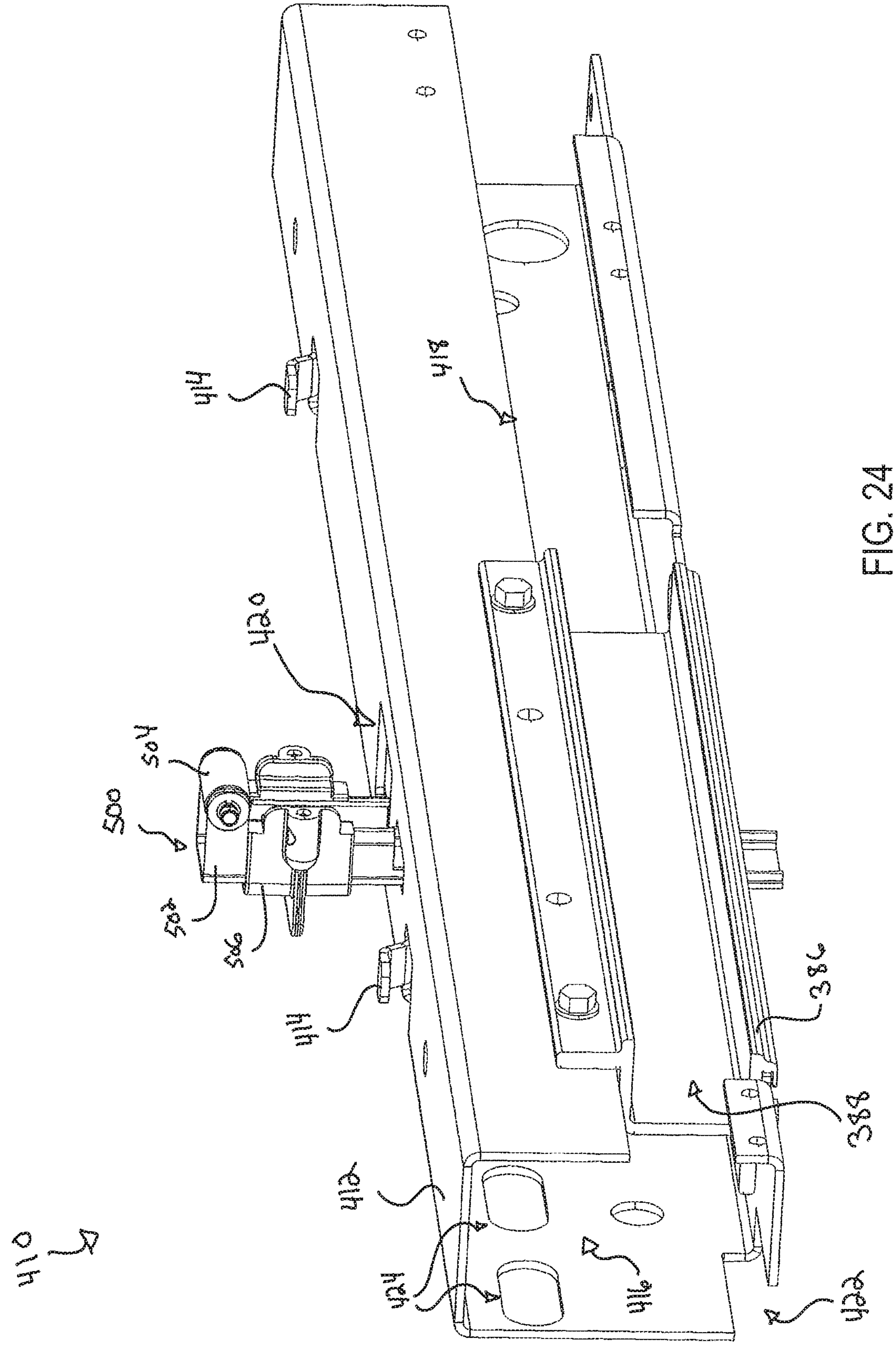
FIG. 24 depicts a perspective view of a beam mounting frame assembly of the actuating mobility assembly of FIG. 19.
Figure 25:
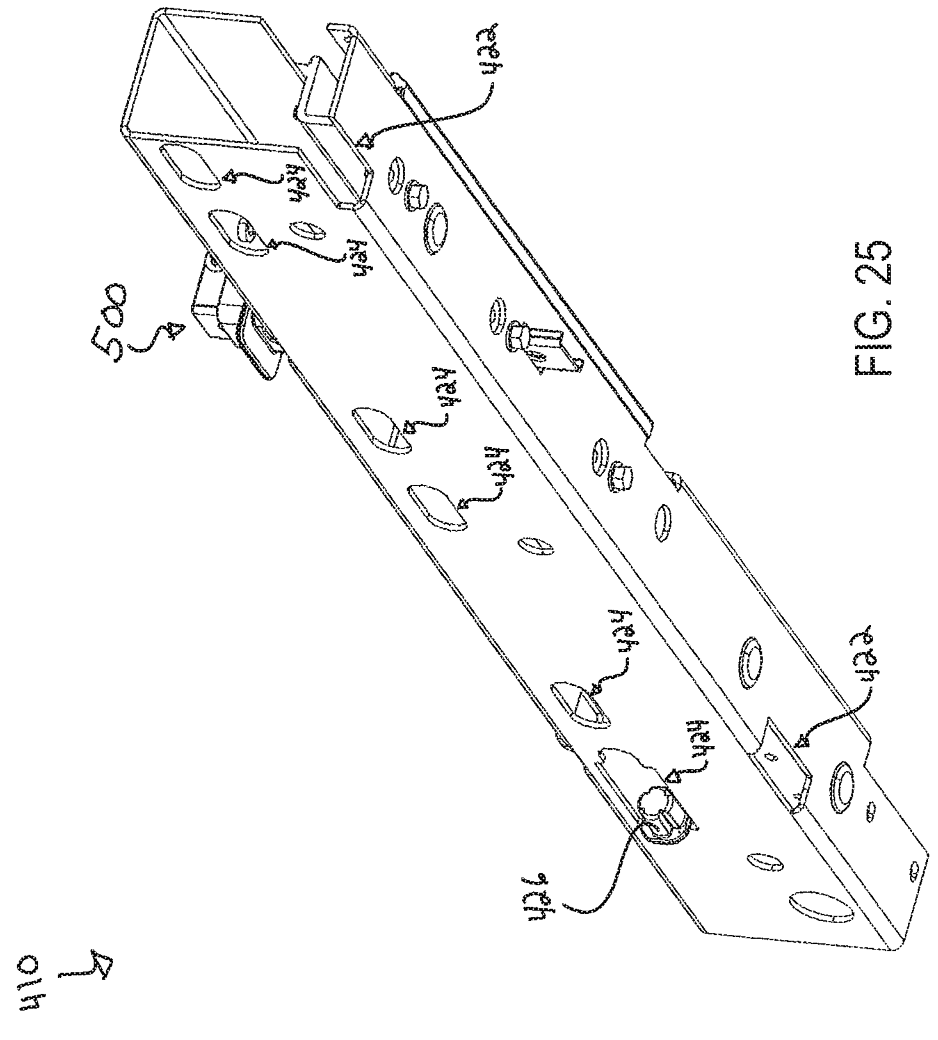
Figure 30A:
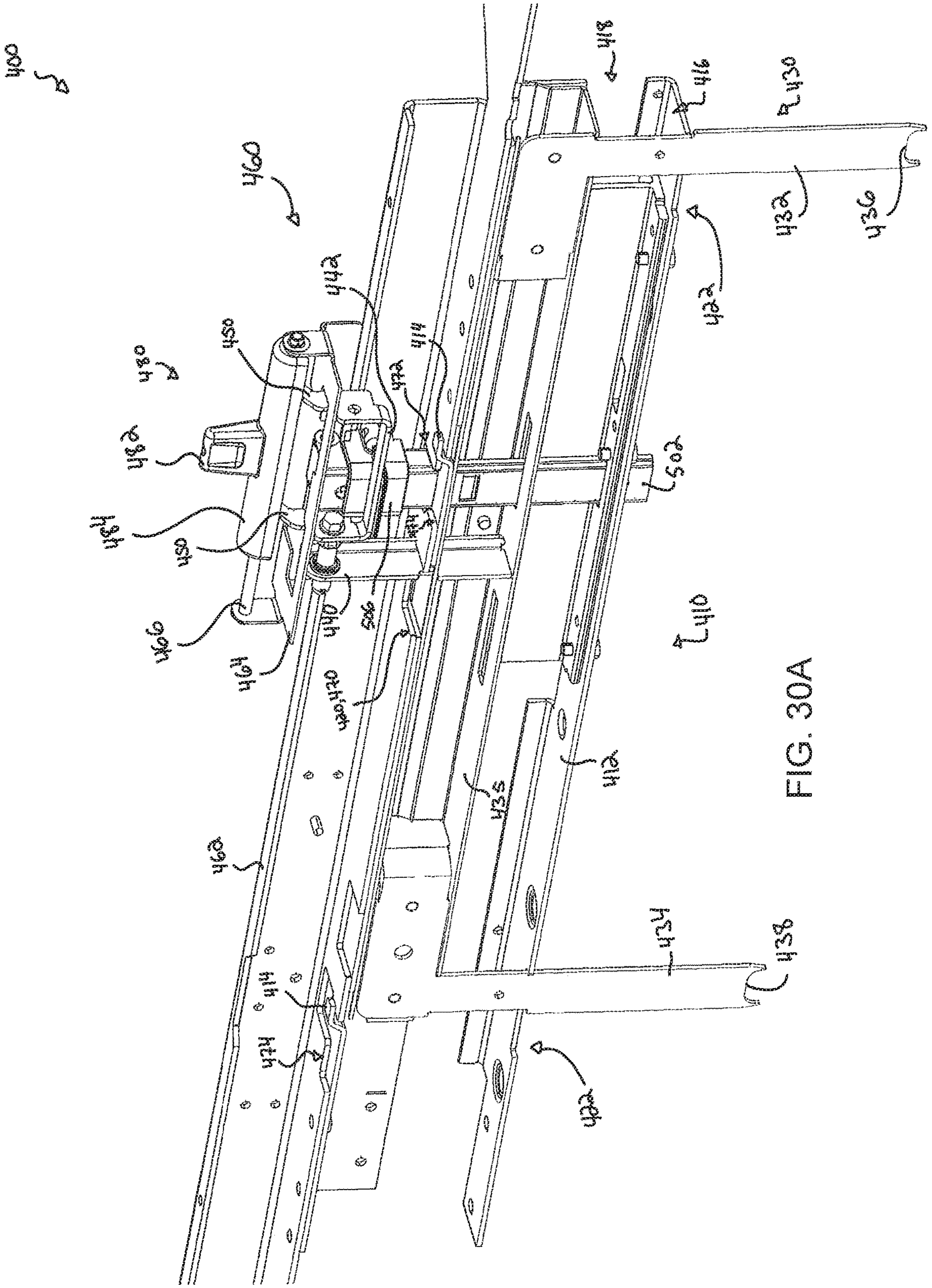
FIG. 30A depicts a perspective cross-sectional view of the actuating mobility assembly of FIG. 19 in an inactivated position, taken along line 30-30 of FIG. 20.
Figure 30B:
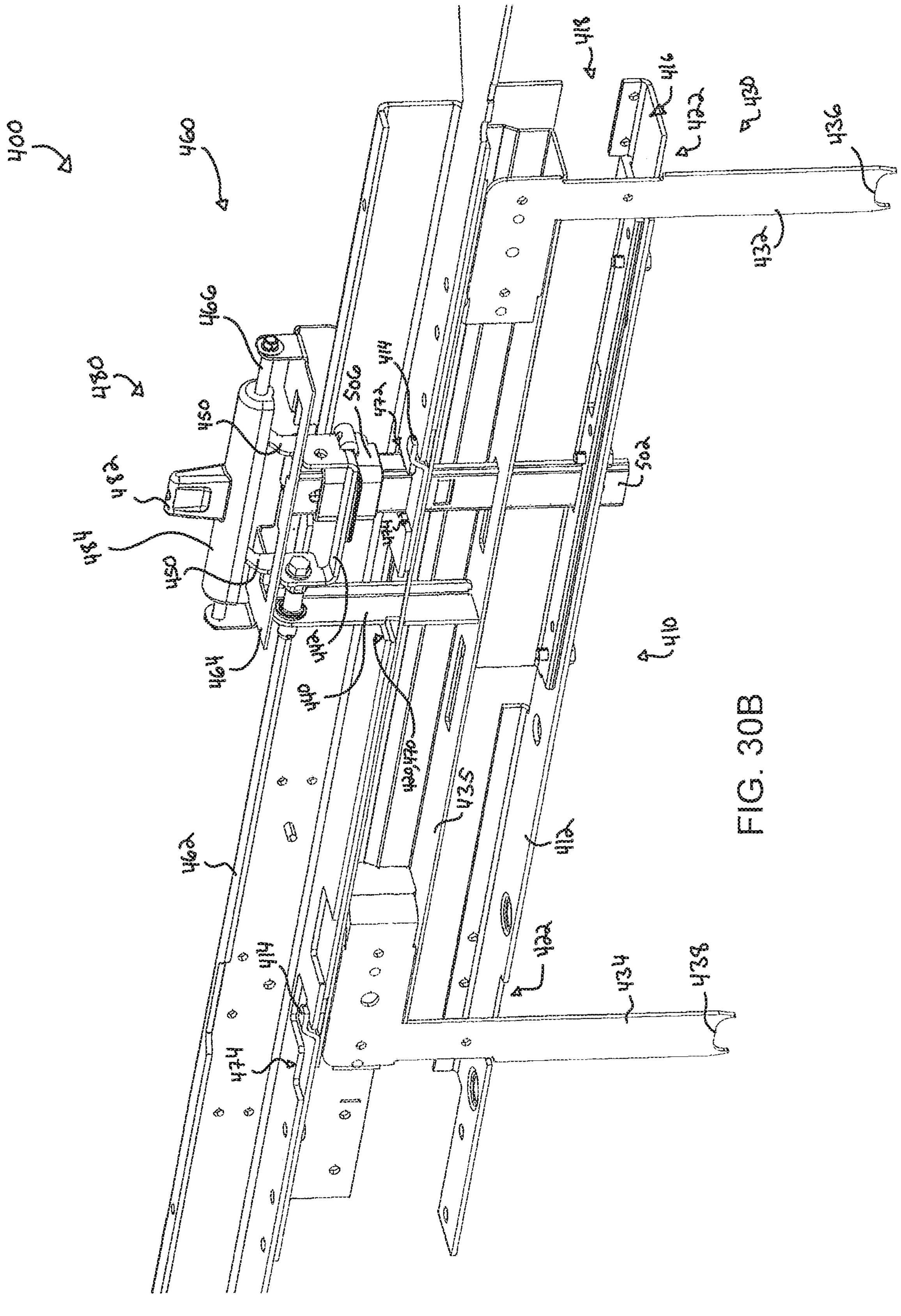
FIG. 30B depicts a perspective cross-sectional view of the actuating mobility assembly of FIG. 19 in an activated position, while the actuation assembly of FIG. 28 is in a first rotational position, taken along line 30-30 of FIG. 20.
Figure 30C:
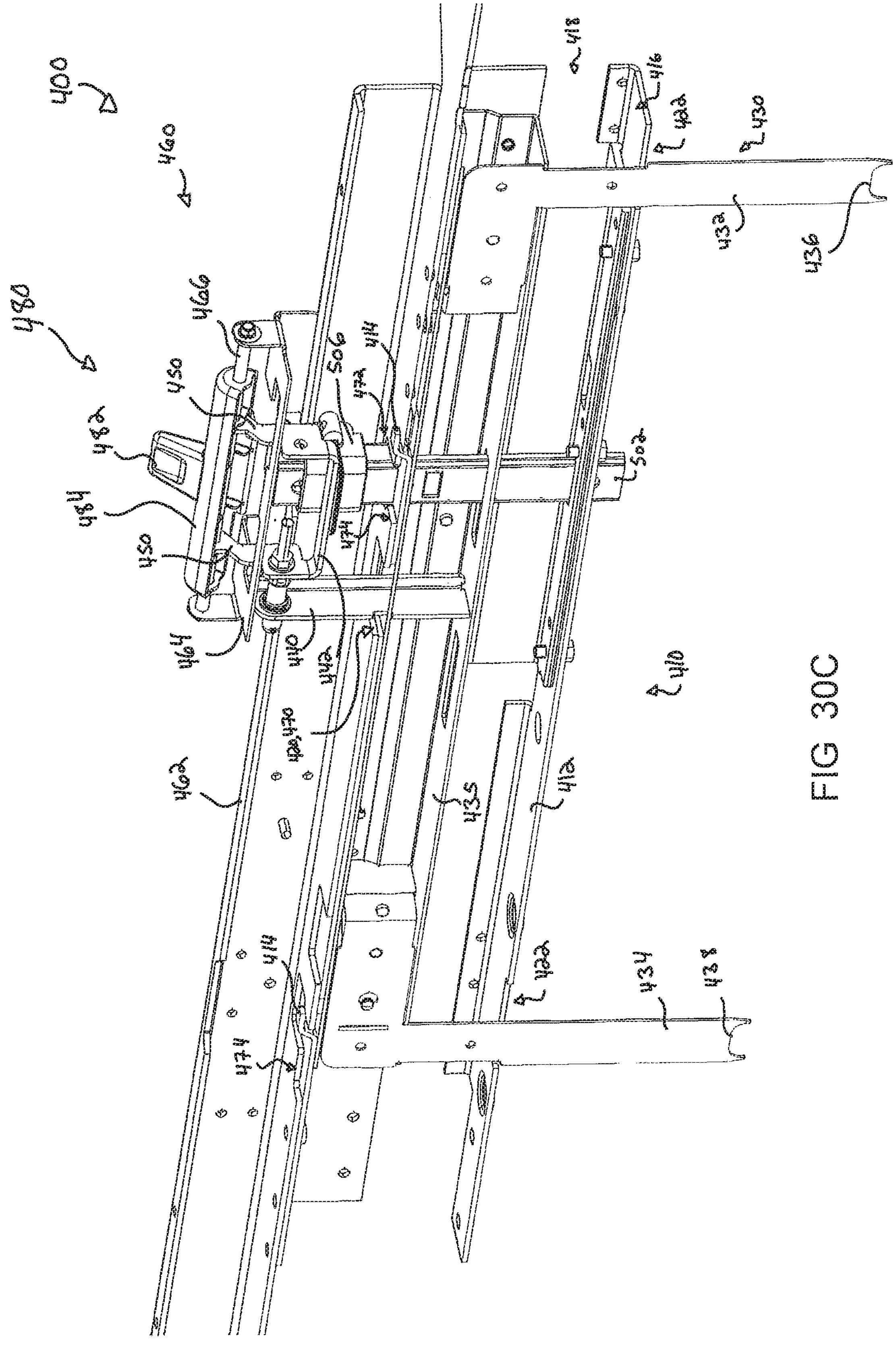
FIG. 30C depicts a perspective cross-sectional view of the actuating mobility assembly of FIG. 19 in the activated position, while the actuation assembly of FIG. 28 is in a second rotational position, taken along line 30-30 of FIG. 20.
Figure 31:
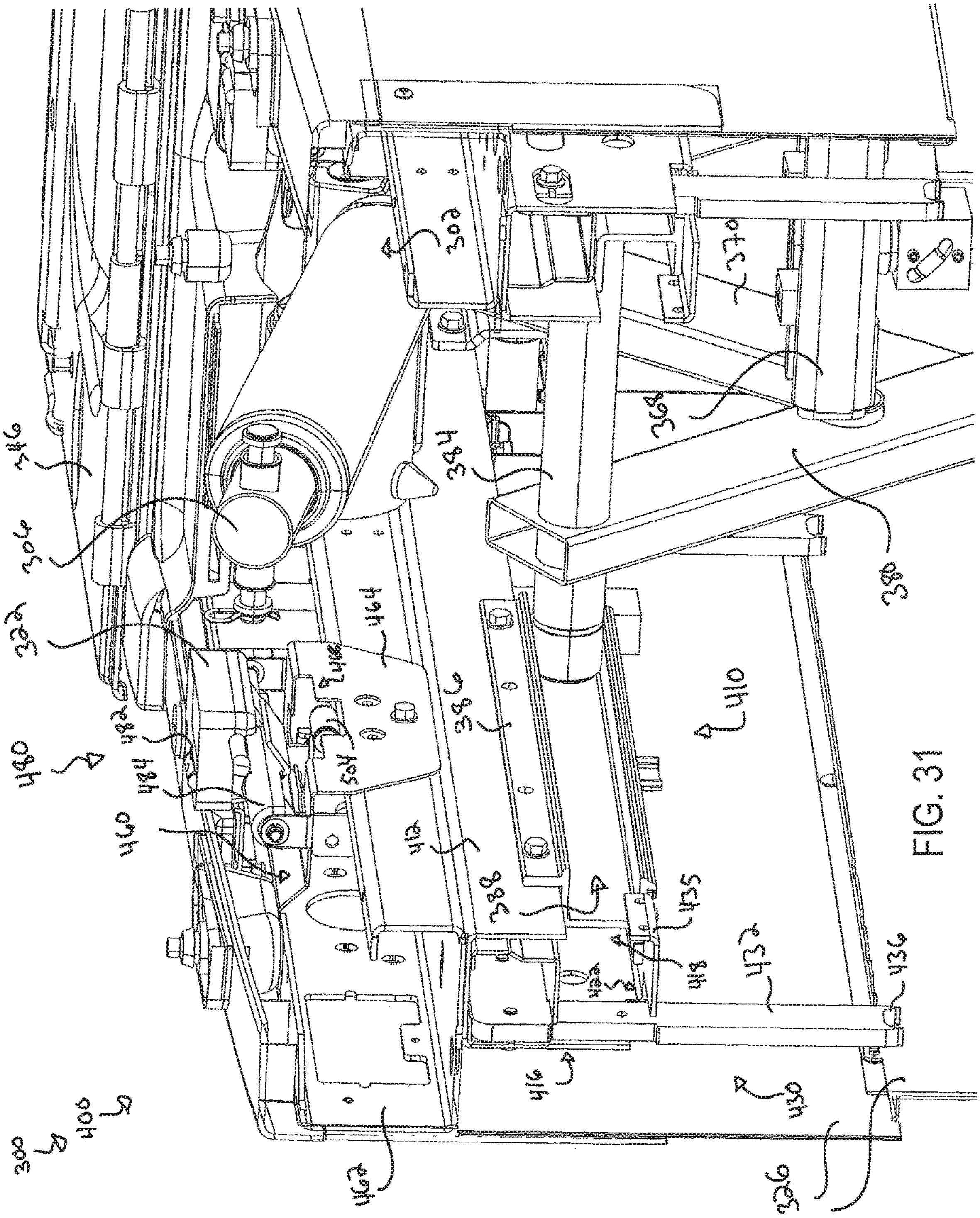
FIG. 31 depicts a cross-sectional perspective view of the examination table of FIG. 15 without certain components for purposes of clarity, taken along line 31-31 of FIG. 16B.

As best seen in FIGS. 24-25, beam mounting frame (410) includes a hollow body (412) with a pair of mounting tabs (414), a lock release assembly (500), and fixed plate (386) fixedly attached to hollow body (412). As best shown in FIGS. 30A-30C, mounting tabs (414) are configured to be inserted within a mounting tab opening (474) of actuating mounting frame (460) in order to fixedly couple beam mounting frame (410) with actuating mounting frame (460). As described above, fixed plate (386) defines slot (388), which slidably receives sliding shaft (384) of lift mechanism (360). Lift mechanism (360) couples with beam mounting frame (310) in order to vertically actuate table assembly (314). Therefore, as table assembly (314) vertically actuates relative to base assembly (312), so do mounting frames (310, 360), as well as the rest of actuating mobility assembly (400).

Hollow body (412) defines a guide channel (416), a plate slot (418), a vertical arm opening (420), a pair of fork opening (422), and a plurality of mounting bolt slots (424). Guide channel (416) is dimensioned to slidably receive U-shaped body (435). Plate slot (418) is dimensioned such that a portion of fixed plate (386) is positioned within guide channel (416) when fixed plate (386) is properly attached to hollow body (412). Fixed plate (386) is positioned through plate slot (418) and within guide channel (416) such that U-shaped beam (435) may slidably rest on top of the portion of fixed plate (386) extending within guide channel (416). Additional support blocks may be coupled within guide channel (416) of hollow body (412) to further slidably support U-shaped beam (435).

Vertical arm opening (420) is dimensioned to receive vertical arm (440). Fork openings (422) are dimensioned to receive downwardly presented forks (432, 434). Finally, mounting bolt slots (424) are dimensioned to receive mounting bolts (448) and spring perch (446). Vertical arm opening (420), fork openings (422), and mounting bolt slots (424) are dimensioned to allow the vertical arm (440), downwardly presented forks (432, 434), and mounting bolts (448) of slidable beam assembly (430), respectively, to translate relative to hollow body (412) while beam assembly (430) translates from the inactivated position to the activated position (as shown in FIGS. 30A-30B and 34B-34C). Slidable beam assembly (430) is thus operable to translate within guide channel (416) to the extent allowed by vertical arm opening (420), fork openings (422), and mounting bolt slots (424).

Lock release assembly (500) includes a sliding body (502), a cam roller (504), and a mount (506). Cam roller (504) is attached to the top of sliding body (502), while sliding body (502) is slidable within the confines of mount (506). As best seen in FIGS. 30A-30C, mount (506) is fixed to a hollow body (462) of actuating mounting frame (460). Additionally, a projection on mount (506) slidingly supports coupling bracket (442). Sliding body (502) slidingly extends through hollow body (412), U-shaped beam (435), and hollow body (462).

Figure 34A:
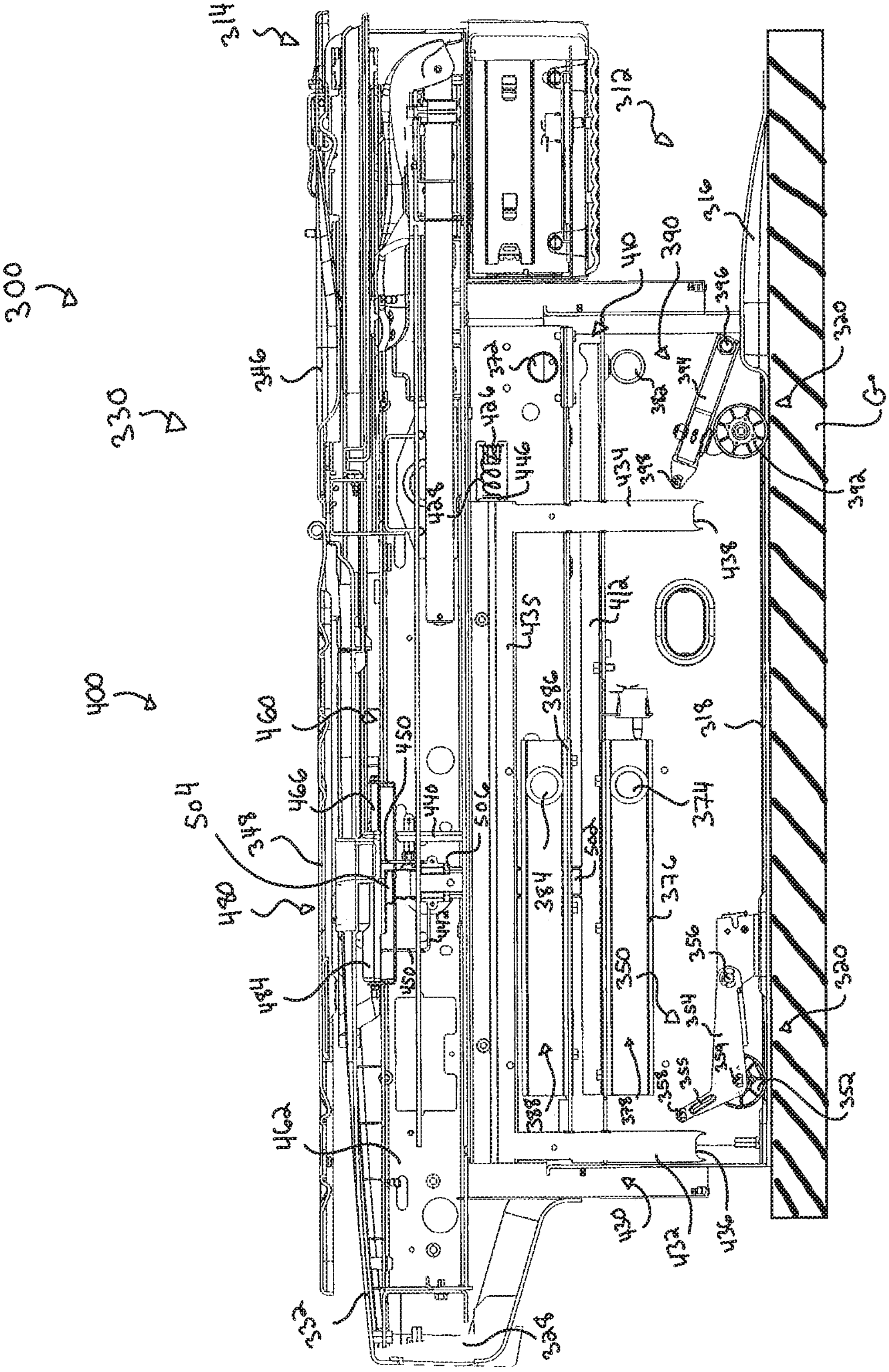
FIG. 34A depicts a cross-sectional view of the medical examination table of FIG. 15, taken along line 34-34 of FIG. 17, where the table assembly is in the lowered position and the actuating mobility assembly of FIG. 19 is in an inactivated position.
Figure 34B:
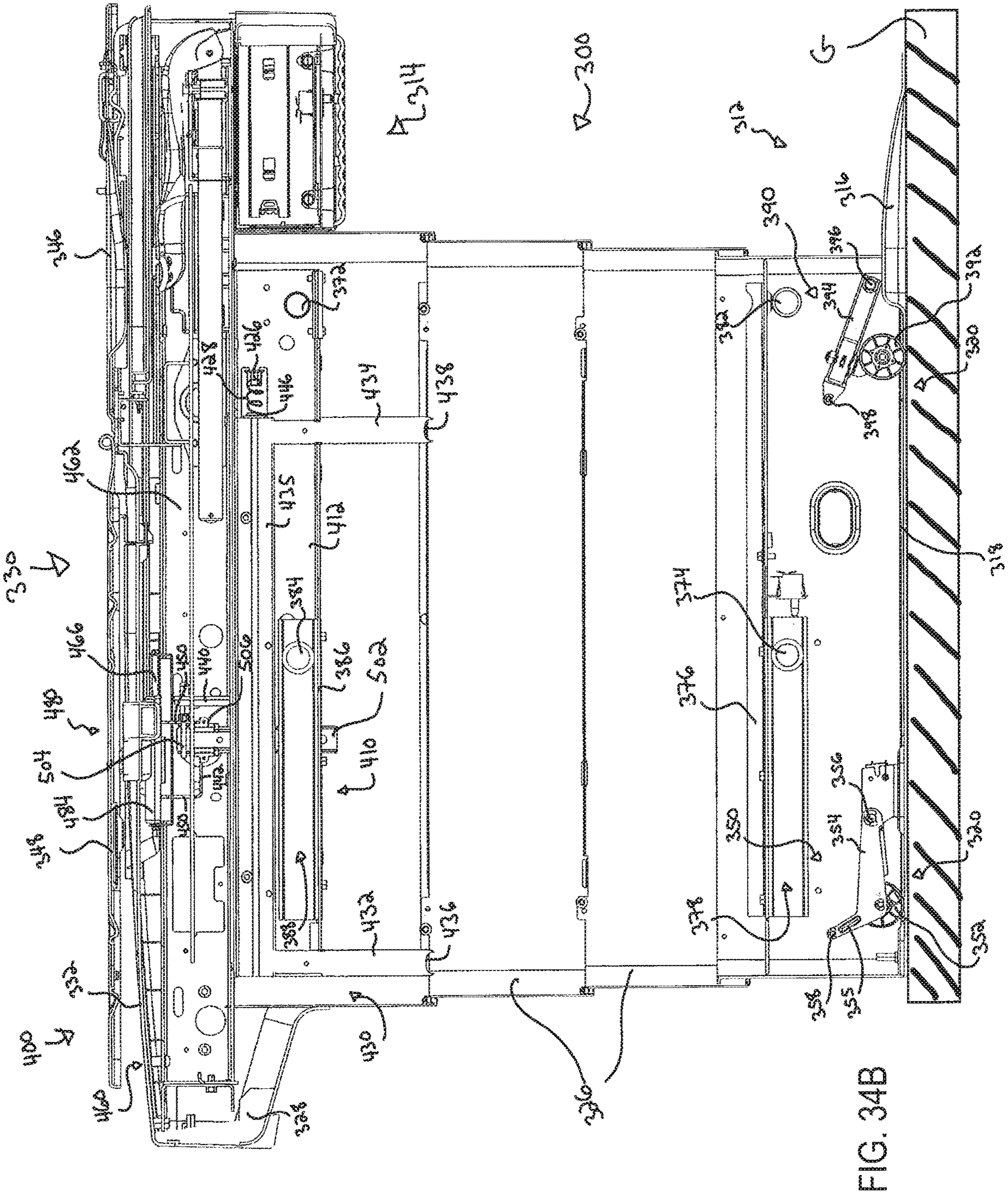
FIG. 34B depicts a cross-sectional view of the medical examination table of FIG. 15, taken along line 34-34 of FIG. 17, where the table assembly is in a partially raised position and the actuating mobility assembly of FIG. 19 is in the inactivated position.
Figure 34C:
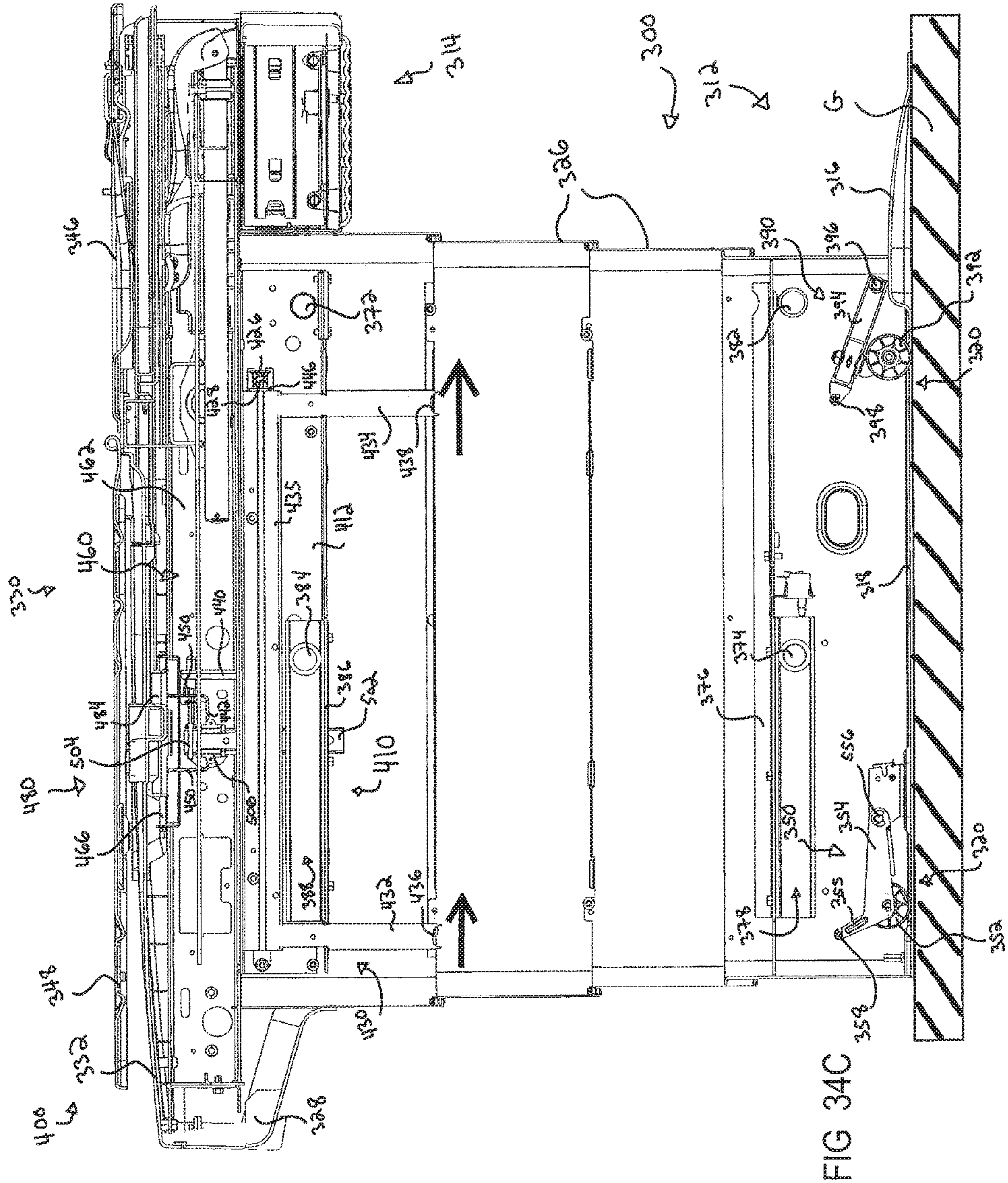
FIG. 34C depicts a cross-sectional view of the medical examination table of FIG. 15, taken along line 34-34 of FIG. 17, where the table assembly is in the partially raised position and the actuating mobility assembly of FIG. 19 is in the activated position.
Figure 34D:
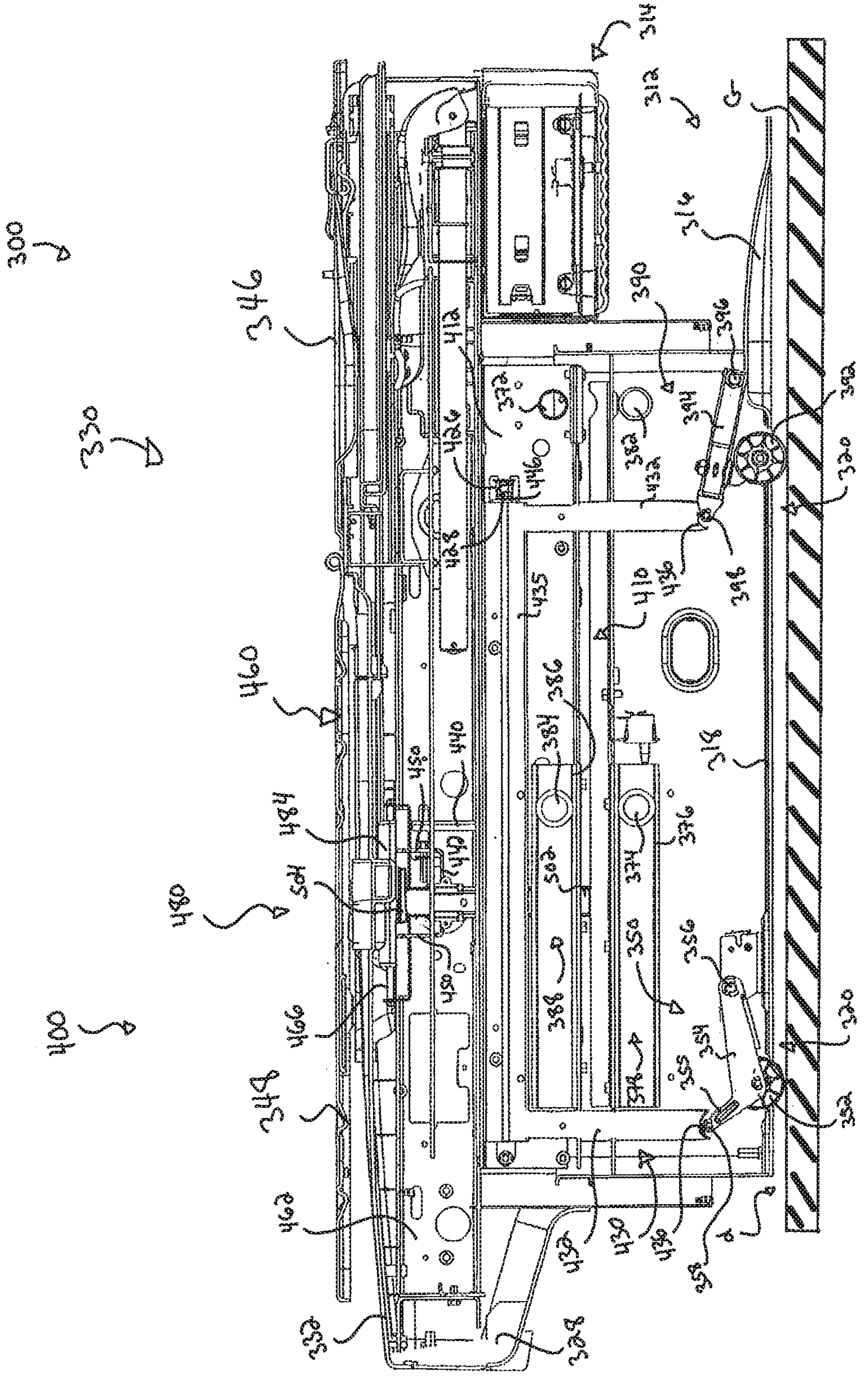
FIG. 34D depicts a cross-sectional view of the medical examination table of FIG. 15, taken along line 34-34 of FIG. 17, where the table assembly is in the lowered position and the actuating mobility assembly of FIG. 19 is in the activated position.
Figure 34E:
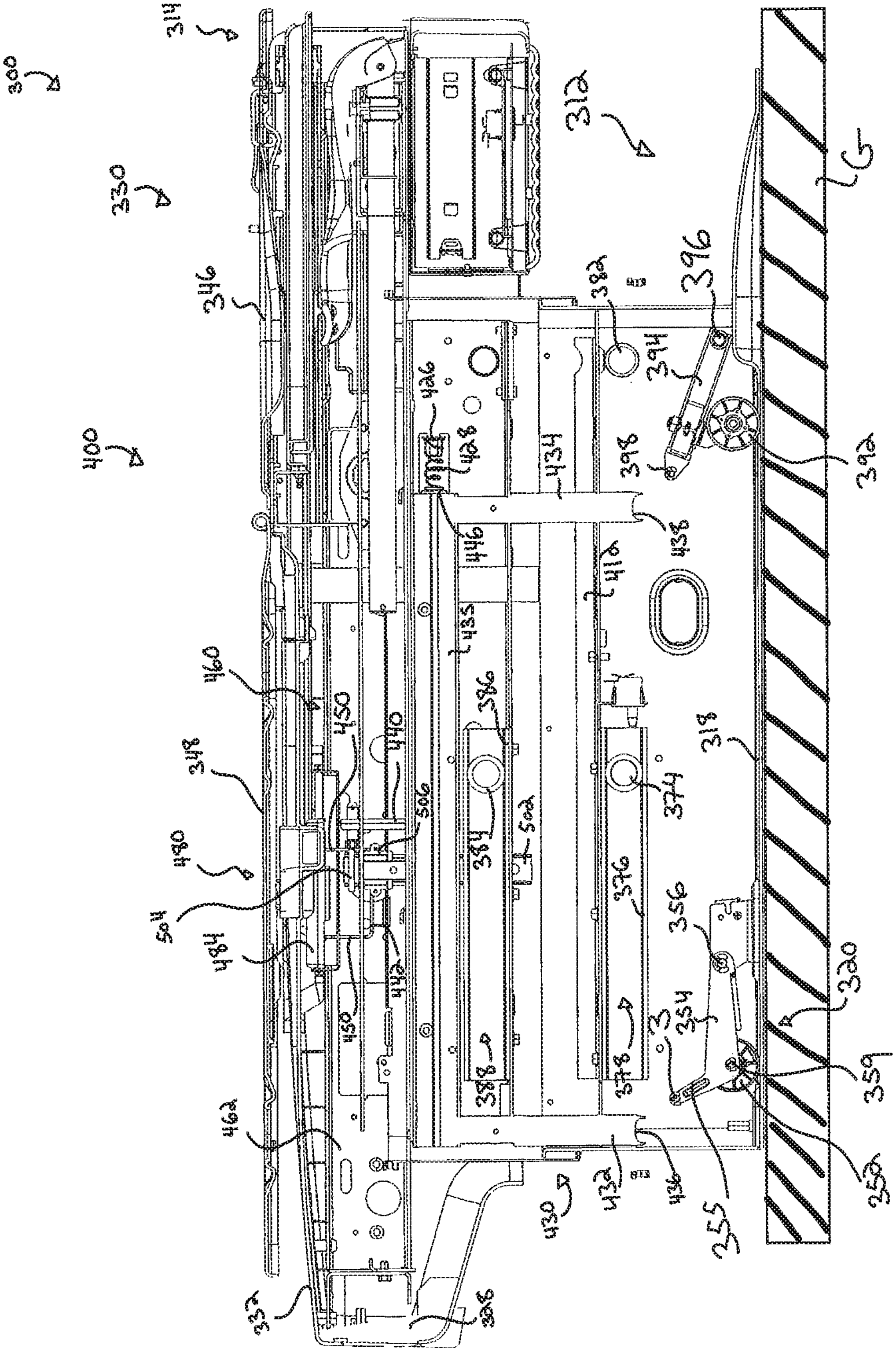
FIG. 34E depicts a cross-sectional view of the medical examination table of FIG. 15, taken along line 34-34 of FIG. 17, where the table assembly is above the lowered position and the actuation mobility assembly of FIG. 19 is in the inactivated position.
Figure 35A:
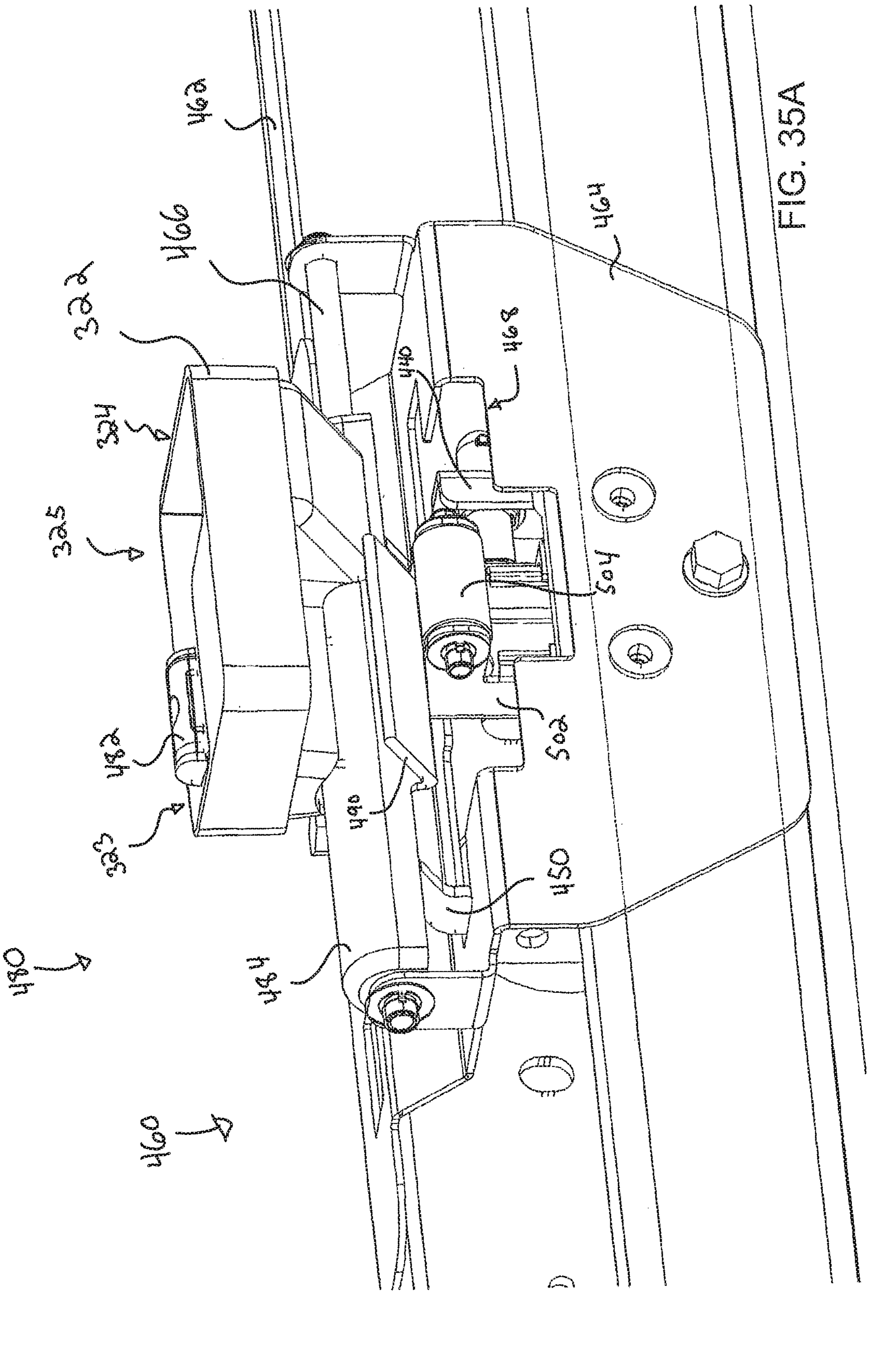
FIG. 35A depicts a perspective view of the actuating mounting frame of FIG. 26 and the actuation assembly of FIG. 28, where a lock release of the actuating mounting frame is in a raised position and the actuation assembly is in a first position within a portion of the table assembly.

Sliding body (502) is operable to vertically actuate relative to the rest of actuating mobility assembly (400) depending on whether table assembly (314) is in the lowered position (as shown in FIGS. 16A, 18A, 34A, and 34D) or raised above the lowered position. In particular, sliding body (502) may be in a raised vertical position (as best shown in FIGS. 35A and 35E) if table assembly (314) is in the lowered position. As best seen in FIGS. 34A and 34D, this is because the bottom end of sliding body (502) abuts against the top portion of fixed plate (376) when table assembly (314) is in the lowered position. Once table assembly (314) is raised above the lowered position, as best seen in FIGS. 34B-34C and 34E, the bottom end of sliding body (502) may no longer abut against the top portion of fixed plate (376). Therefore, the weight of sliding body (502) and cam roller (504) may cause sliding body (502) and cam roller (504) to slide toward a lowered vertical position (as best shown in FIGS. 35B-35D and 35F), where contact between cam roller (504) and a top portion of hollow body (462) support sliding body (502).

As will be described in greater detail below, lock release assembly (500) is configured to vertically actuate as described above in order to contact selected portions of actuation assembly (480) to manipulate the rotational position of actuation assembly (480) relative to slide bar (466) of actuating mounting frame (460).

Figure 26:
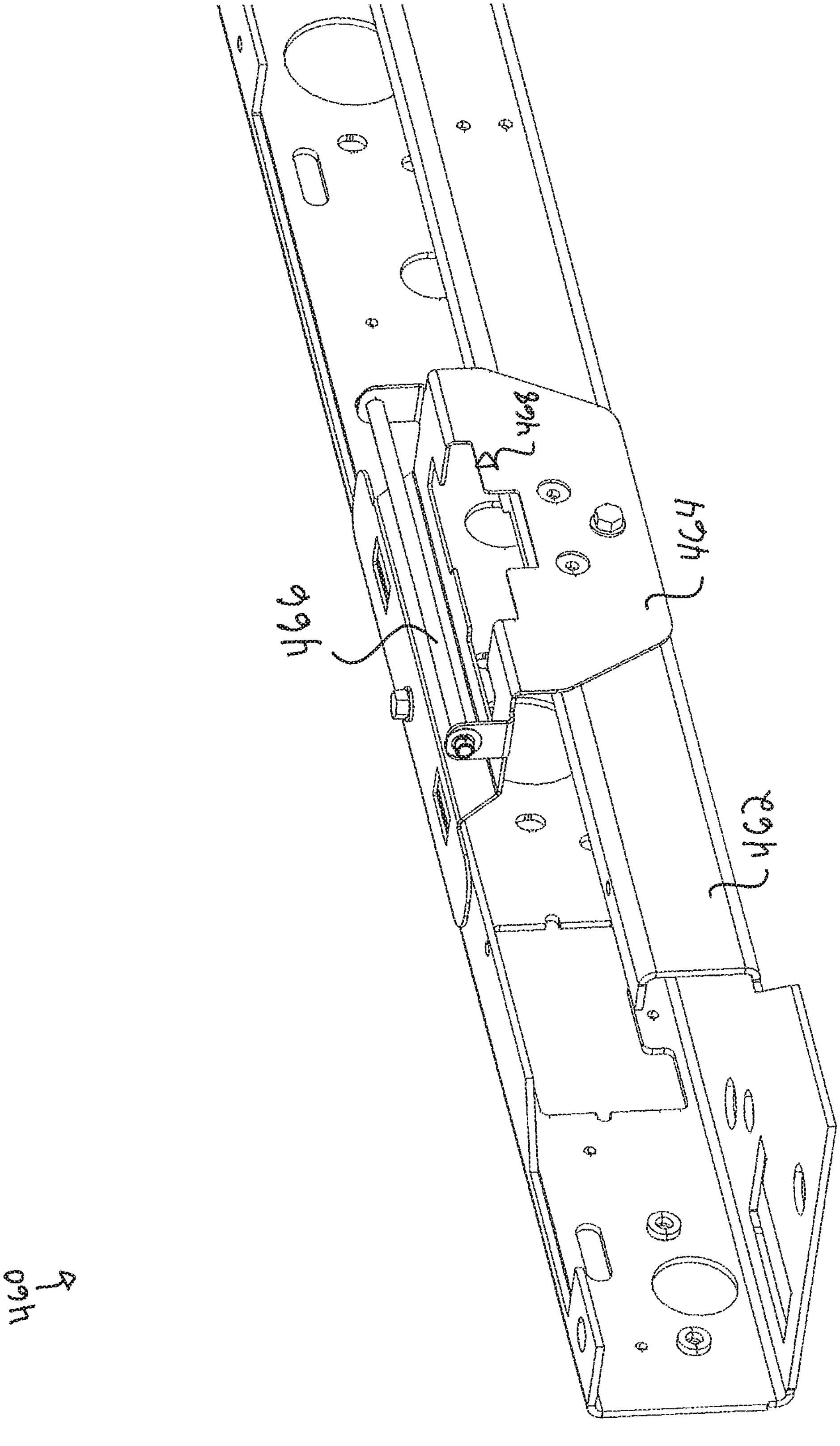
FIG. 26 depicts a perspective view of an actuating mounting frame of the actuating mobility assembly of FIG. 19.
Figure 27:
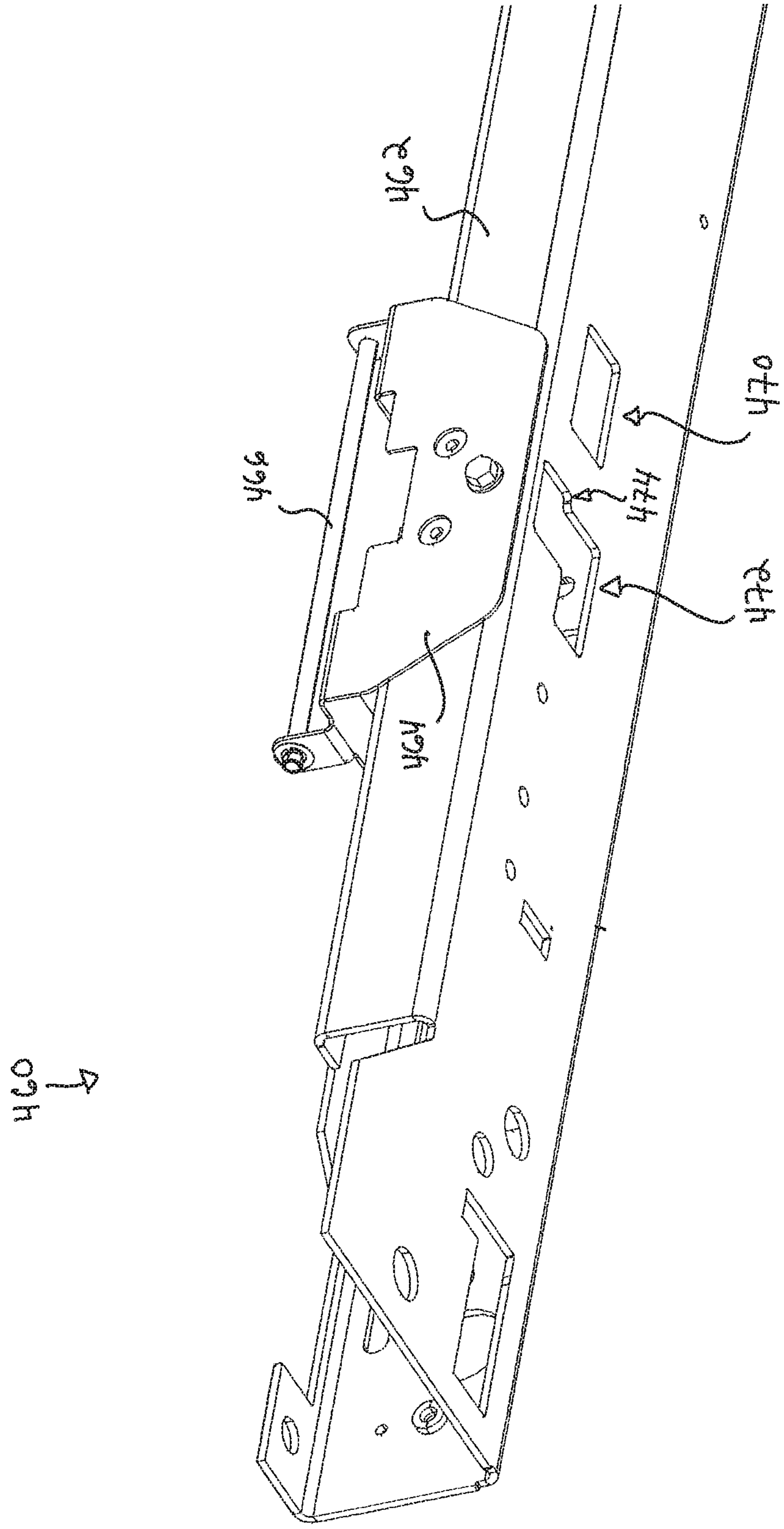
FIG. 27 depicts another perspective view of the actuating mounting frame of FIG. 26.

As best seen in FIGS. 26-27, actuating mounting frame (460) includes hollow body (462), slide bar (466), and a plate (464) fixed to both hollow body (462) and slide bar (466). Slide bar (466) is therefore fixed relative to hollow body (462). Hollow body (462) defines a vertical arm opening (470), a lock release opening (472), and mounting tab openings (474). As best seen in FIGS. 30A-30C, vertical arm opening (470) is dimensioned to align with vertical arm opening (420) of beam mounting frame (410). Similar to vertical arm opening (420) of beam mounting frame (410), vertical arm opening (470) is dimensioned to receive vertical arm (440) of slidable beam assembly (430) such that vertical arm (440) may translate within vertical arm opening (470). Lock release opening (472) is dimensioned to receive sliding body (502) of lock release assembly (500). As described above, mounting tab openings (474) are dimensioned to receive mounting tabs (414) of beam mounting frame (410) in order to fixedly couple beam mounting frame (410) and actuating mounting frame (460).

Plate (464) defines an aperture (468) configured to receive prongs (450) of coupling bracket (442) such that coupling bores (444) may slidably attach with slide bar (466). Therefore, prongs (450) of coupling bracket (442) are slidably coupled with slide bar (466). Because coupling bracket (442) is fixed to the rest of slidable beam assembly (430), slidable beam assembly (430) is also slidably coupled with slide bar (466). As described above, U-shaped body (435) is slidably supported within beam mounting frame (410). Therefore, if prongs (450) of coupling bracket (442) slide along slide bar (466), U-shaped body (435) slides within guide channel (416) of hollow body (412) while downwardly presented forks (432) slide within fork openings (422) of hollow body (412). Aperture (468) is also configured to receive sliding body (502) and cam roller (504).

Figure 28:
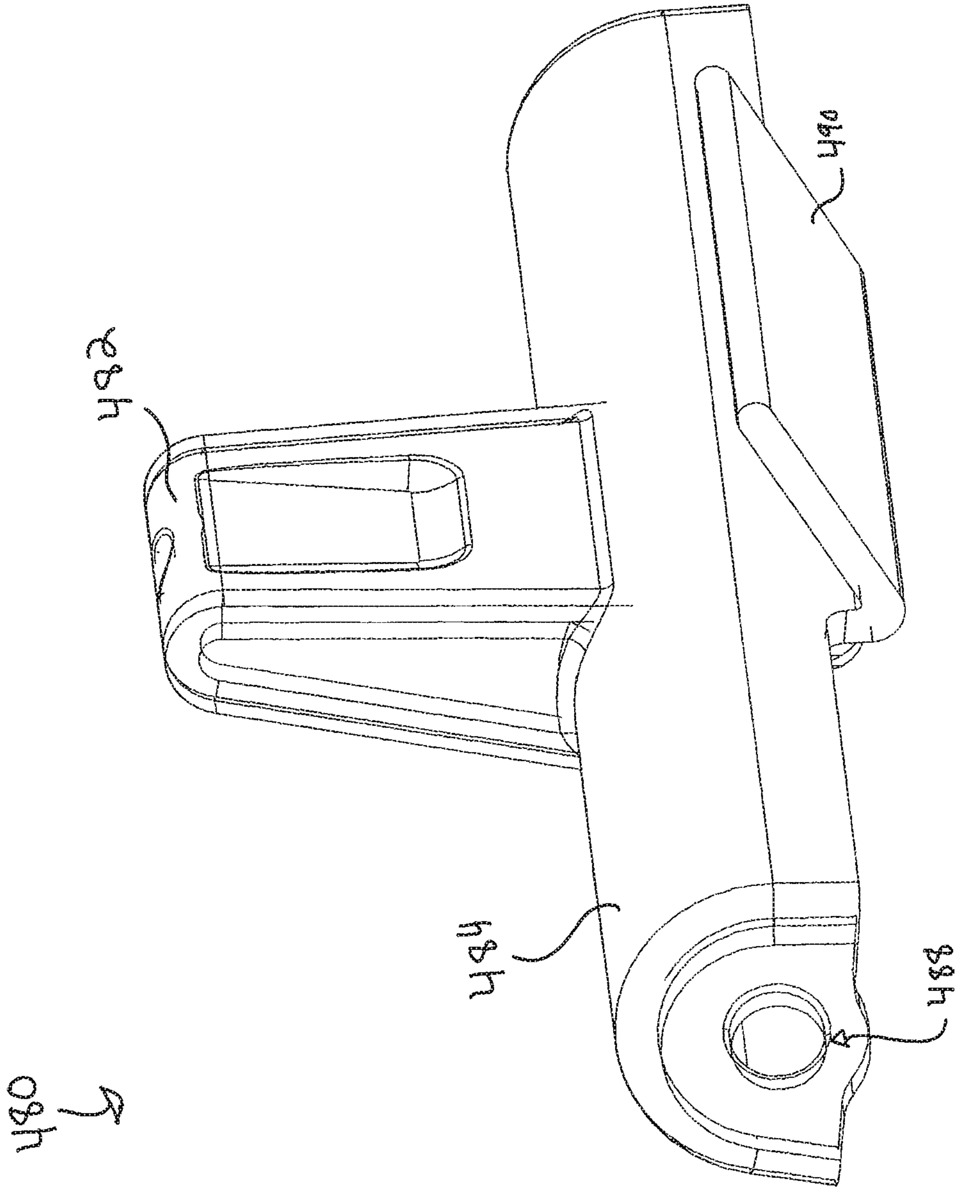
FIG. 28 depicts a perspective view of an actuation assembly of the actuating mobility assembly of FIG. 19.
Figure 29:
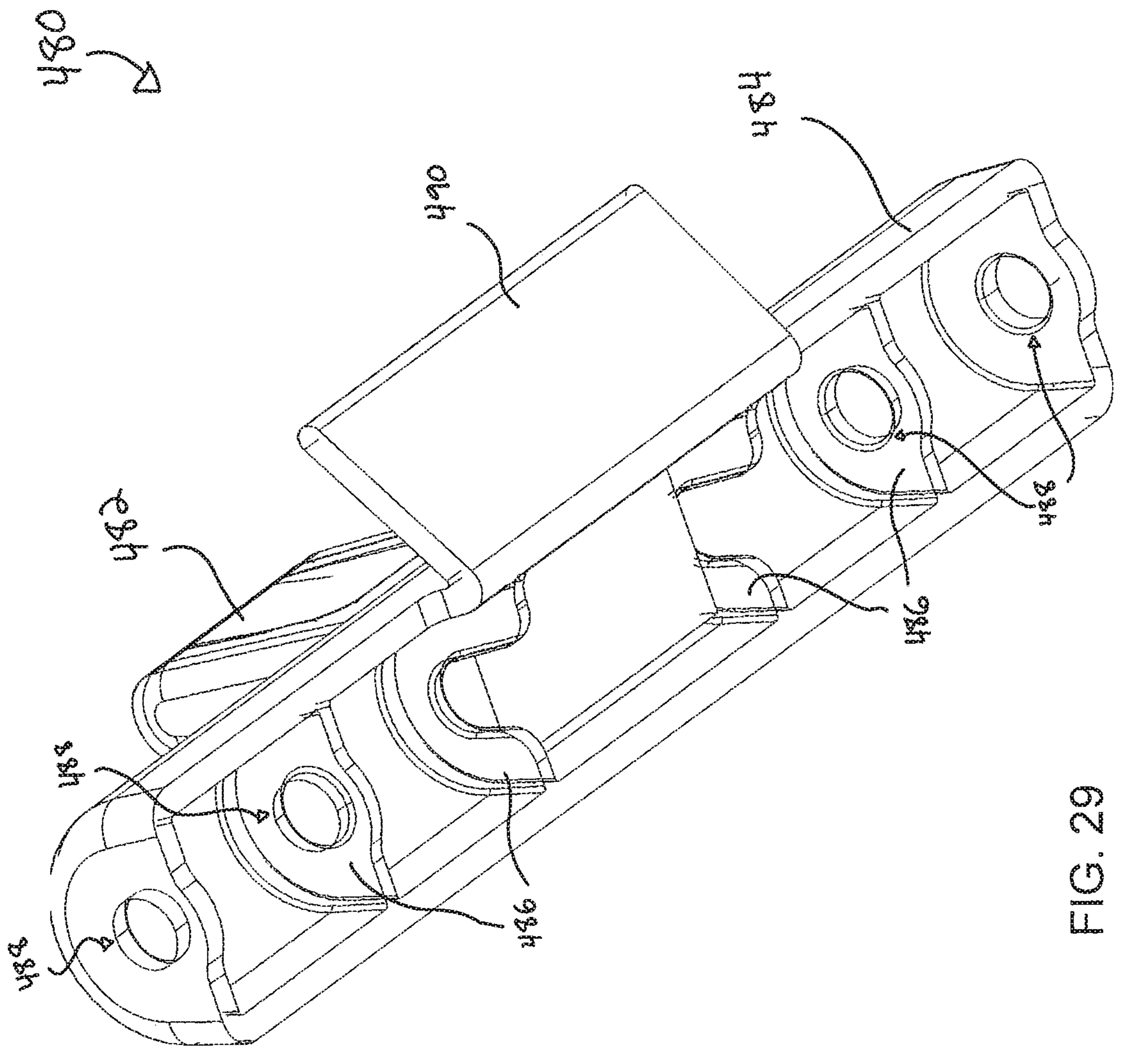
FIG. 29 depicts another perspective view of the actuating assembly of FIG. 28.

As best seen in FIGS. 28-29, actuation assembly (480) includes a lever handle (482) extending upwardly from a cylindrical actuating member (484), and an angled camming arm (490) extending away from cylindrical actuating member (484). Lever handle (482) is configured to be grasped by an operator in order to drive cylindrical actuating member (484) in a linear direction along slide bar (466) and in a rotational direction about the longitudinal axis of slide bar (466). As shown in FIGS. 31 and 35A-35F, and as will be described in greater detail below, lever handle (482) may be housed within a locking body (322) of table assembly (314) in order to selectively lock actuation assembly (480) and slidable beam assembly (430) into the activated state.

As will be described in greater detail below, cylindrical actuating member (484) is dimensioned to slidably couple with slide bar (466) while coupling with prongs (450) of coupling bracket (442) such that cylindrical actuating member (484) may both longitudinally drive coupling bracket (442) and rotate relative to prong (450) of coupling bracket (442) along the longitudinal axis of slide bar (466). Therefore, lever handle (482) may actuate cylindrical actuating member (484) in a linear direction along slide bar (466) in order to translate slidable beam assembly (430) from the inactivated state to the activated state. Additionally, lever handle (482) may rotate cylindrical actuating member (484) about the longitudinal axis of slide bar (466) in order to selectively lock slidable beam assembly (430) in the activated state. As will also be described in greater detail below, camming arm (490) is configured to selectively engage cam roller (504) of lock release assembly (500) in the raised vertical position to rotate lever handle (482) about the longitudinal axis of slide bar (466), thereby rotating lever handle (482) out of the locked position.

As best seen in FIG. 29, cylindrical actuating member (484) includes a plurality of ribs (486) defining slide bar openings (488). Cylindrical actuating member (484) slidably couples with slide bar (466) through slide bar openings (488). Additionally, two ribs (486) are spaced apart to form a keyed fit with prongs (450) of coupling bracket (442). Therefore, ribs (486) may abut against prongs (450) of coupling bracket (442) in order to longitudinally drive coupling bracket (442) along slide bar (466); but ribs (486) may also accommodate rotation of cylindrical actuating member (484) about slide bar (466) without moving coupling bracket (442). While in the current example, cylindrical actuating member (484) fixedly couples with prongs (450) through a keyed fit with ribs (486), any other suitable coupling means may be used as would be apparent to one having ordinary skill in the art in view of the teachings herein. For example, a latch system may be utilized to couple cylindrical actuating member (484) with prongs (450).

FIGS. 30A-30C show an assembled actuating mobility assembly (400) properly assembled while actuating slidable beam assembly (430) from the inactivated position to the activated position.

As seen between FIGS. 30A-30B, an operator may grasp and move lever handle (482) in order to drive cylindrical actuating member (484) in a linear direction defined by slide bar (466). Because cylindrical actuating member (484) is also coupled to prongs (450) of coupling bracket (442) via a keyed fit, and because prongs (450) of coupling bracket (442) are slidably coupled with slide bar (466), coupling bracket (442) also translates in the linear direction defined by slide bar (466). As described above, coupling bracket (442) extends through aperture (468) of plate (464) to accommodate linear translation of coupling bracket (442). Additionally, coupling bracket (442) is fixed to vertical arm (440). Therefore, vertical arm (440) translates in the linear direction defined by slide bar (466) in response to linear movement of cylindrical actuating member (484).

Vertical arm (440) extends through vertical arm openings (420, 470), which accommodate translation of vertical arm (440) relative to mounting frames (410, 460). Vertical arm (440) is also fixed to U-shaped body (435) such that U-shaped body (435) translates in the linear direction defined by slide bar (466) in response to translation of cylindrical actuating member (484). Additionally, downwardly presented forks (332, 334) are coupled to U-shaped body (435). Therefore, downwardly presented forks (332, 334) translate in the linear direction defined by slide bar (466) in response to actuation of cylindrical actuating member (484). Additionally, downwardly presented forks (332, 334) extend through fork openings (422) to accommodate translation of downwardly presented forks (332, 334) relative to mounting frames (310, 360). Therefore, actuation of cylindrical actuating member (384) will translate downwardly presented forks (332, 334) from the position shown in FIG. 30A to the position shown in FIG. 30B.

It should be understood that slidable beam assembly (430) is in the activated state as shown in FIG. 30B. However, as described above, slidable beam assembly (430) is biased toward the inactivated state via bias spring (428) located between spring perches (426, 446). Therefore, if an operator released lever handle (482) while in the position shown in FIG. 30B, actuation assembly (480) and slidable beam assembly (430) would both actuate back to the inactivated state. However, as shown between FIGS. 30B and 30C, an operator may grasp and rotate lever handle (482) in order to rotate actuation assembly (480) around the longitudinal axis of slide bar (466). As will be described in greater detail below, lever handle (482) may be housed within a portion of table assembly (314) such that rotation of lever handle (482) selectively locks actuation assembly (480) and slidable beam assembly (430) in the activated position when in the position shown in FIGS. 30C.

Figure 35B:
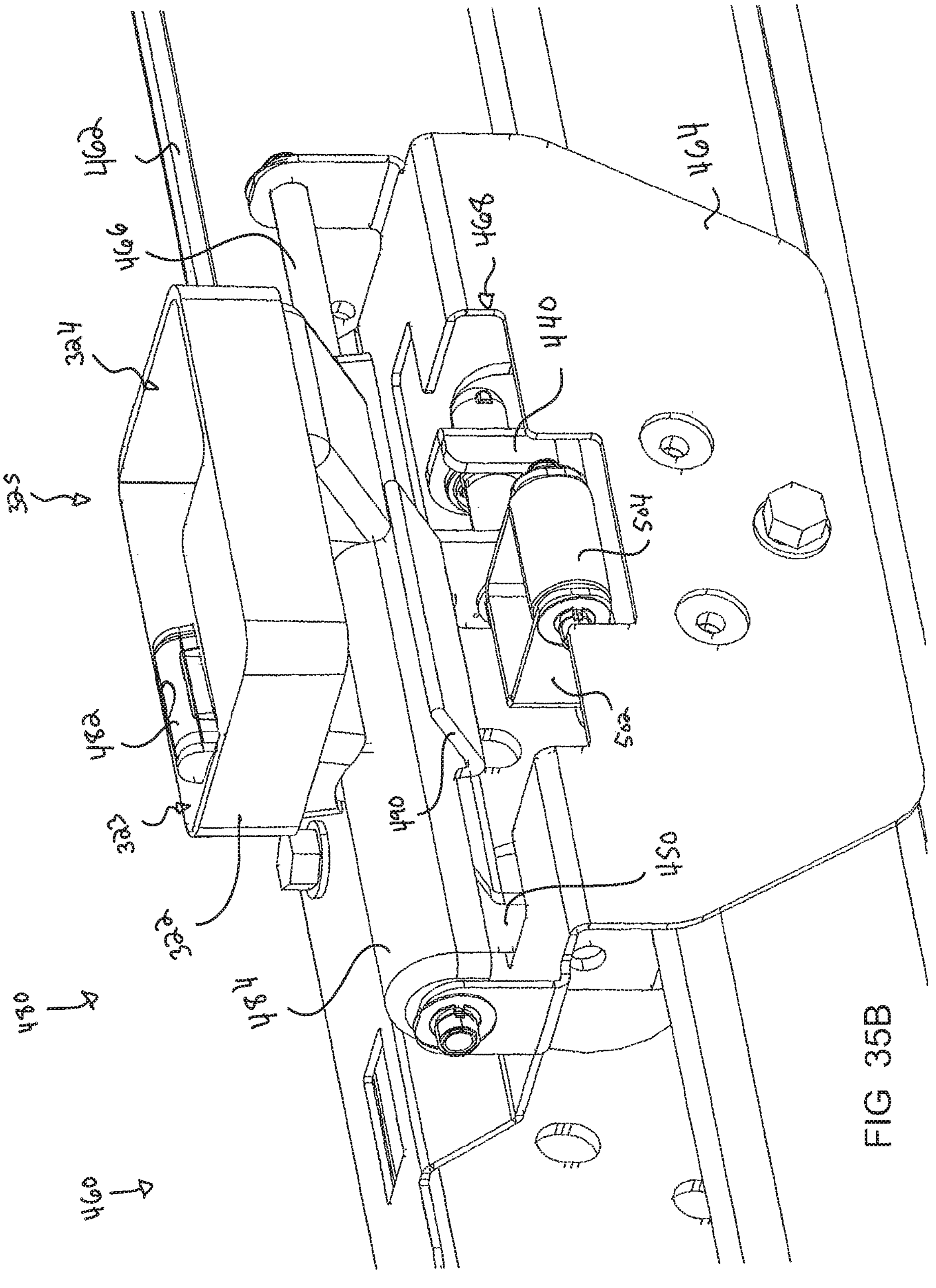
FIG. 35B depicts a perspective view of the actuating mounting frame of FIG. 26 and the actuation assembly of FIG. 28, where the lock release of the actuating mounting frame is in a lowered position and the actuation assembly is in the first position within a portion of the table assembly.
Figure 35C:
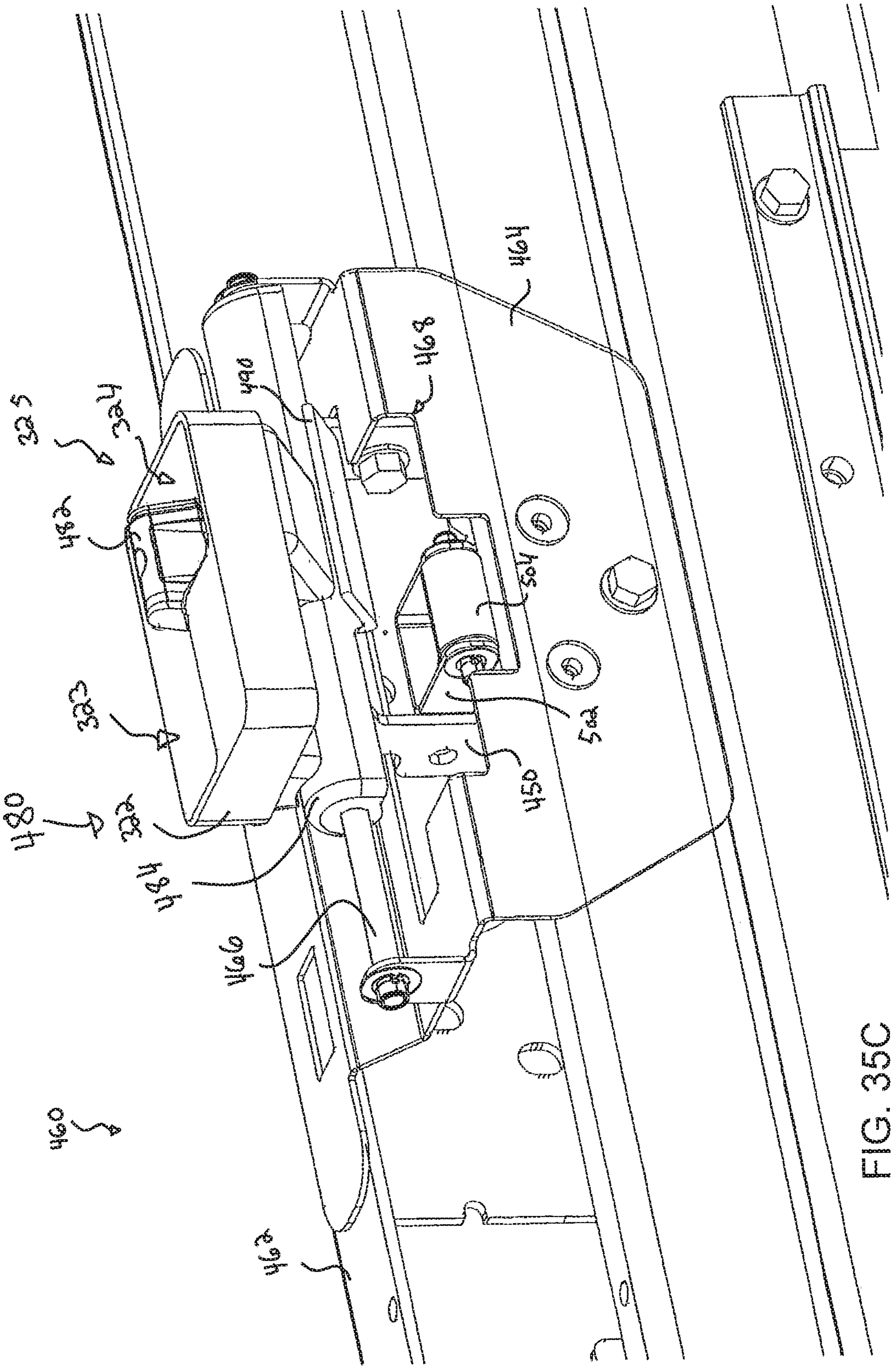
FIG. 35C depicts a perspective view of the actuating mounting frame of FIG. 26 and the actuation assembly of FIG. 28, where the lock release of the actuating mounting frame is in the lowered position and the actuation assembly is in a second position within a portion of the table assembly.
Figure 35D:
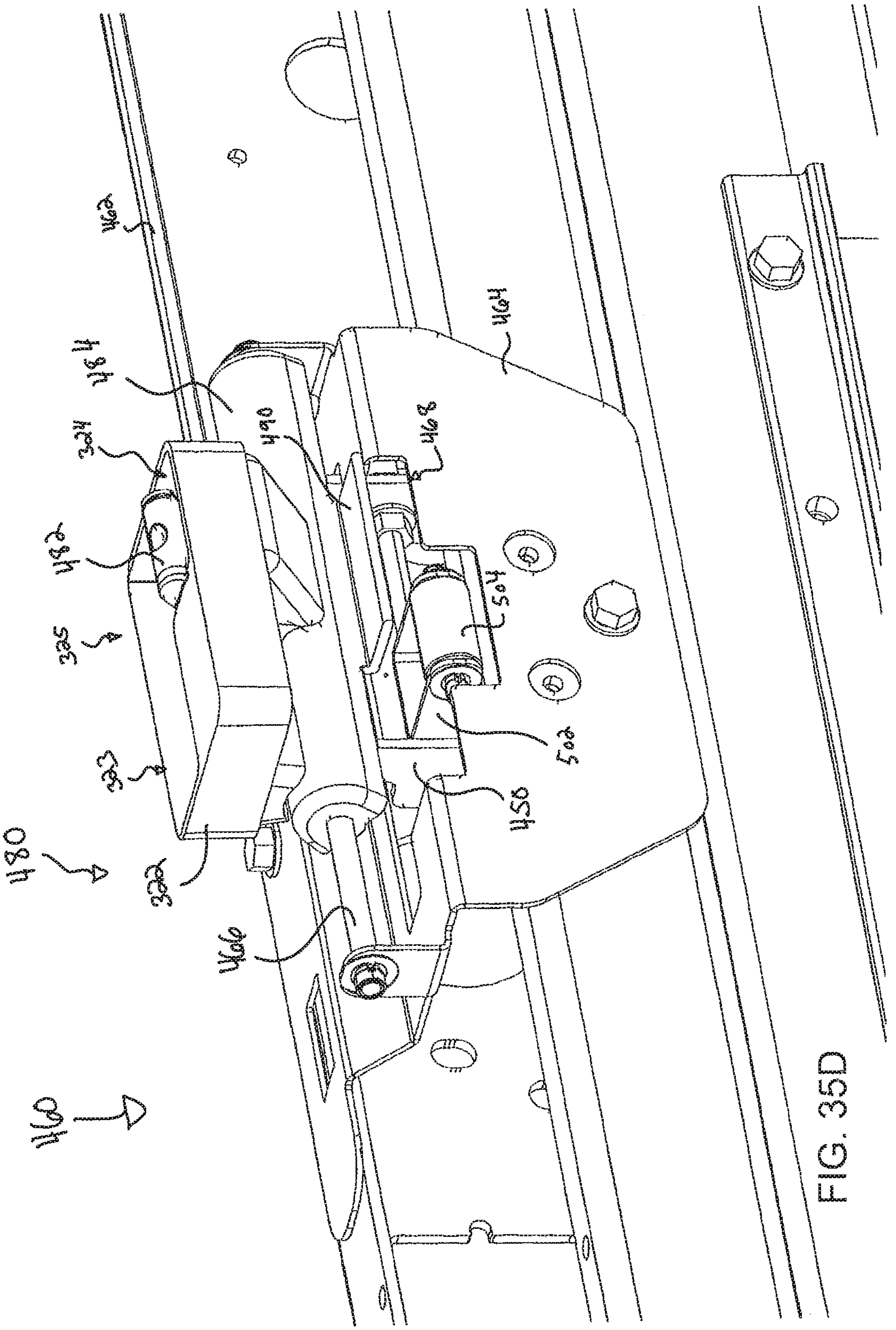
FIG. 35D depicts a perspective view of the actuating mounting frame of FIG. 26 and the actuation assembly of FIG. 28, where the lock release of the actuating mounting frame is in the lowered position and the actuation assembly is in a third position within a portion of the table assembly.
Figure 35E:
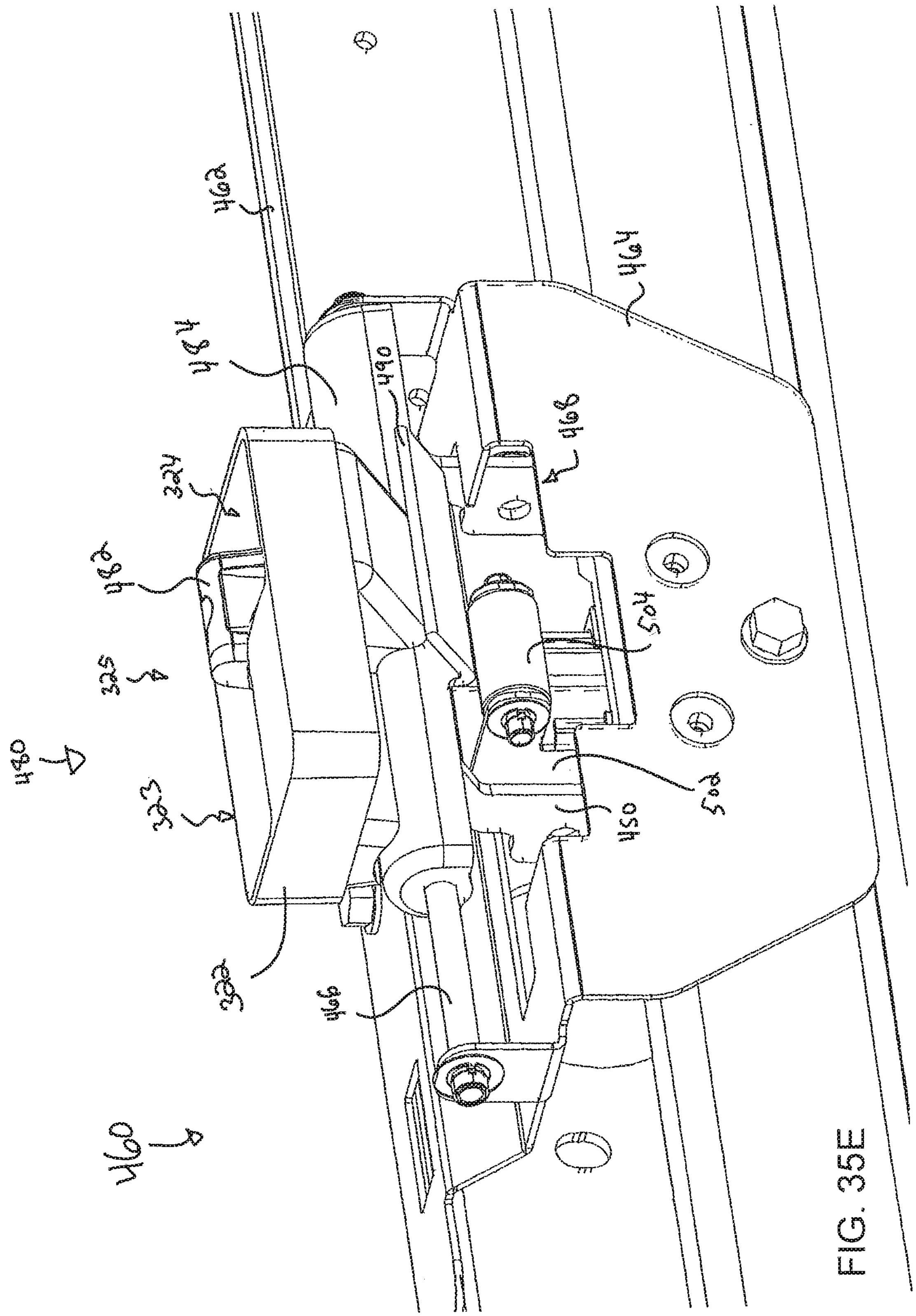
FIG. 35E depicts a perspective view of the actuating mounting frame of FIG. 26 and the actuation assembly of FIG. 28, where the lock release of the actuating mounting frame is in the raised position and the actuation assembly is in the second position with a portion of the table assembly.

As shown in FIGS. 31 and 35A-35F, table assembly (314) includes a locking body (322) defining an L-shaped handle path (325). Lever handle (482) is housed within L-shaped handle path (325). L-shaped handle path (325) includes a narrow portion (323) and a wide portion (324). While lever handle (482) is within the confines of narrow portion (323), slidable beam assembly (430) is in the inactivated state and lever handle (482) is restricted from rotating cylindrical actuating member (484) about the longitudinal axis of slide bar (466). However, when lever handle (482) is within the confines of wide portion (324), slidable beam assembly (430) is in the activated state and lever handle (482) may rotate within wide portion (324) (as shown in FIG. 35D). When lever handle (482) is rotated within wide portion (324), walls of wide portion (324) may contact lever handle (482) as to prevent bias spring (428) from actuating both slidable beam assembly (430) and actuation assembly (480) back into the inactivated state. In other words, rotation of lever handle (482) within wide portion (324) of L-shaped handle path (325) acts as a locking mechanism to prevent slidable beam assembly (430) to actuating back into the inactivate state.

Figure 32:
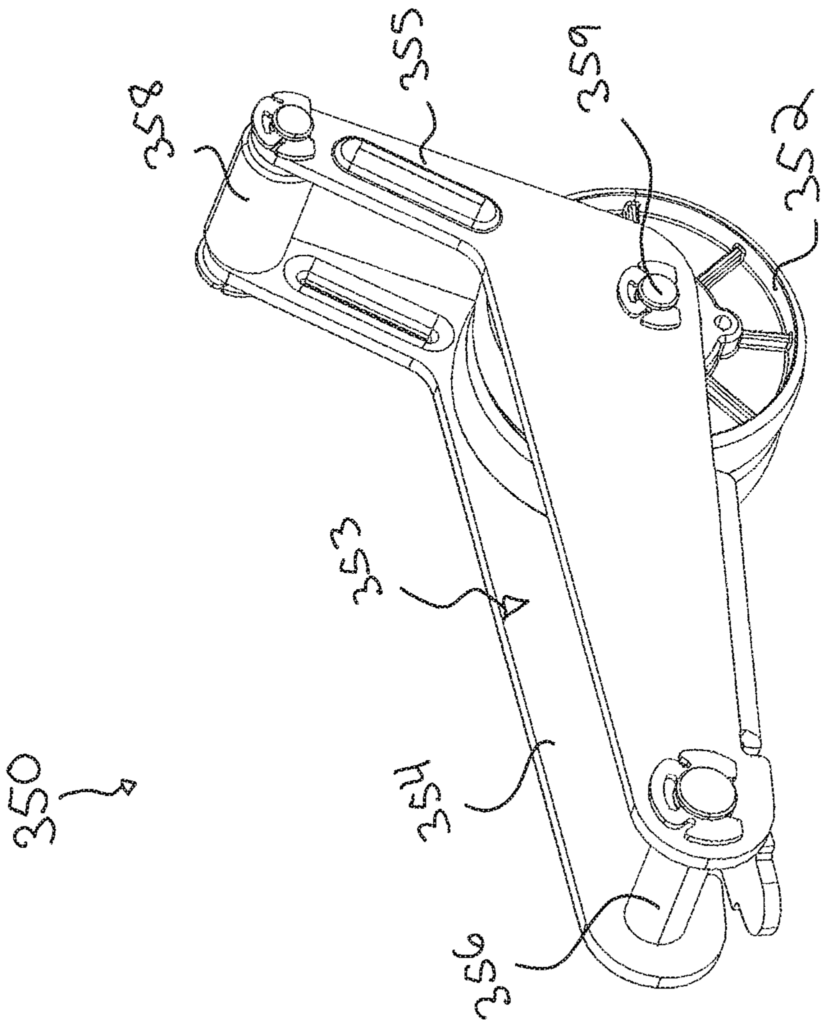
FIG. 32 depicts a perspective view of a rear wheel assembly of the medical examination table of FIG. 15.

FIG. 32 shows rear wheel assembly (350) of the present example. Rear wheel assembly (350) includes an assembly frame (354) defining a channel (353), a pair of legs (355) extending from assembly frame (354), a wheel (352) housed within channel (353) and pivotally fixed to frame (354) via pivot pin (359), a pivot mount (356) pivotally fixed to assembly frame (354), and an engagement arm (358) rotatably attached at the terminating ends of legs (355). Since wheel (352) is housed within channel (353), wheel (352) is constrained to rotate in the direction defined by assembly frame (354). As shown in FIGS. 34A-34D, pivot mount (356) is pivotally fixed to base assembly (312). Therefore, rear wheel assembly (350) may rotate about pivot mount (356) relative to base assembly (312); and therefore relative to base member (316). It should be understood that base assembly (312) may include a frame defining slots to house pivoting portions of wheel assembly (350), similar to frame (115) described above.

Figure 33:
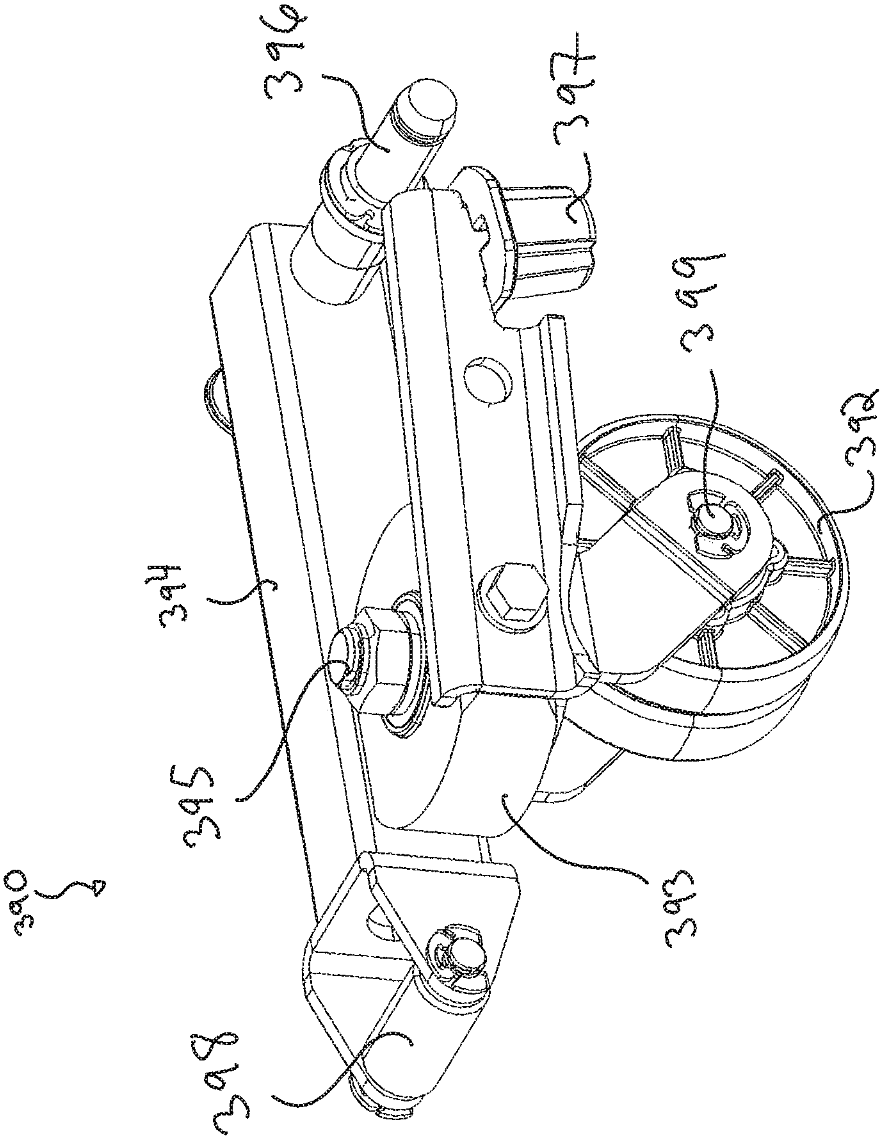
FIG. 33 depicts a perspective view of a front wheel assembly of the medical examination table of FIG. 15.

FIG. 33 shows front wheel assembly (390) of the present example. Front wheel assembly (390) includes an assembly frame (394), a pivot mount (396) pivotally fixed to one end of assembly frame (394), an engagement arm (398) rotatably attached to the opposite end of assembly frame (394) relative to pivot mount (396), a wheel (392) pivotally attached to a swivel caster (393) via pivot pin (399), a mounting pin (395) attaching swivel caster (393) to assembly frame (394), and a pivot stop (397) configured to arrest pivoting motion of front wheel assembly (390) through contact with base assembly (312). It should be understood that swivel caster (393) may rotate relative to assembly frame (394). Because wheel (392) is attached to swivel caster (393) via pivot pin (399), wheel (392) may also rotate relative to assembly frame (394). Therefore, while wheel (352) of rear wheel assembly (350) is constrained to rotate in a direction defined by assembly frame (354), wheel (392) has no such constraint. In some alternative versions, wheel (352) of rear wheel assembly (350) is also mounted to a swivel caster like swivel caster (393). While one mounting pin (395) is used to attach swivel caster (393) to assembly frame (394) in the present example, any suitable number of mounting pins (395) may be used as would be apparent to one having ordinary skill in the art in view of the teachings herein. As shown in FIGS. 34A-34D, pivot mount (396) is pivotally fixed to base assembly (312). Therefore, front wheel assembly (390) may rotate about pivot mount (396), relative base assembly (312), and therefore relative to base member (316).

While two front wheel assemblies (390) are attached to the front end of examination table (300) and two rear wheel assemblies (350) are attached to the rear end of examination table (300) in the present example, any combination of front wheel assemblies (390) and rear end assemblies (350) may be utilized. For example, four front wheel assemblies (390) may be incorporated into examination table (300). Thus, two front wheel assemblies (390) would replace the two rear wheel assemblies (350) currently shown. Alternatively, four rear wheel assemblies (350) may be incorporated into examination table (300). Any other suitable combination of wheel assemblies (350, 390) may be utilized as would be apparent to one having ordinary skill in the art in view of the teachings herein.

FIGS. 34A-34E show how actuating mobility assembly (400) may interact with wheel assemblies (350, 390) and lift mechanism (360) in order to actuate wheel assemblies (350, 390) outside of recesses (320) such that wheel assemblies (350, 390) support examination table (300), therefore providing increased mobility of examination table (300). Additionally, FIGS. 35A-35F show how actuation assembly (480) may selectively lock and unlock slidable beam assembly (430) into and out of the activated state during exemplary operation.

FIG. 34A shows actuating mobility assembly (400) attached to the bottom of table assembly (314). Table assembly (314) is in a completely lowered position. Additionally, slidable beam assembly (430) is in an inactivated position. In particular, slidable beam assembly (430) is biased in the inactivated position via bias spring (428). As can be seen, arched ends (436, 438) of downwardly presented forks (432, 434) are located below and to the side of engagement arms (358, 398). Additionally, wheel assemblies (350, 390) are both rotated about their respective pivot mounts (356, 396) such that wheels (352, 392) are located above recesses (320) of base plate (318). Examination table (300) is thus supported by base plate (318) in this state. In other words, no wheels (352, 392) contact the ground (G) in this state, such that base plate (318) contacts the ground (G). In some variations, base plate (318) includes a set of non-wheel feet that contact the ground (G) in this state. Even in such variations, no wheels (352, 392) contact the ground (G) in this state. FIG. 35A shows actuation assembly (480) while actuation mobility assembly (400) is in the position shown in FIG. 34A. As can be seen, lever handle (482) is within narrow portion (323) of L-shaped handle path (325) defined by locking body (322). Therefore, lever handle (482) is restricted from rotating cylindrical actuating member (484) about the longitudinal axis of slide bar (466). Additionally, because table assembly (314) is the completely lowered position, sliding body (502) is in the raised vertical position due to the bottom portion of sliding body (502) abutting against fixed plate (376).

As shown in FIG. 34B, a user may activate lift mechanism (360) in order to raise actuating mobility assembly (400) in the vertical direction. Arched ends (436, 438) of downwardly presented forks (432, 434) are then positioned above, but to the side of, respective engagement arms (358, 398). FIG. 35B shows actuation assembly (480) while actuation mobility assembly (400) is in the position shown in FIG. 34B. Because table assembly is raised above the lowered position, sliding body (502) no longer abuts against fixed plate (376). Therefore, sliding body (502) slides within actuating mobility assembly (400) to the lowered vertical position where cam roller (504) rests against a top portion of hollow body (463) to support sliding body (502).

As shown in FIG. 34C, a user may then utilize actuation assembly (480) as described above to actuate slidable beam (430) within guide channel (416) of beam mounting frame (410) such that arched ends (436, 439) of downwardly presented forks (432, 434) are longitudinally aligned with respective engagement arms (398, 358). As with the state shown in FIG. 34A, in the states shown in FIGS. 34B-34C, examination table (300) is supported by base plate (318) through direct contact between base plate (318) and the ground (G), such that no wheels (352, 392) contact the ground (G) in states shown in FIGS. 34B-34C.

FIGS. 35C-35D show actuation assembly (480) while actuation mobility assembly (400) transitions to the position shown in FIG. 34C. In particular, an operator may drive lever handle (482) from narrow portion (323) to wide portion (324) of L-shaped handle portion as shown in FIG. 35C. With lever handle (482) in wide portion (324) of L-shaped handle portion (325), an operator may further rotate lever handle (482) away from narrow portion (323) such that lever handle (482) rests within wide portion (323). As mentioned above, bias spring (428) biases slidable beam assembly (430) and actuation assembly (480) toward the inactivated position. However, since lever handle (482) is within wide portion (324) of L-shaped handle portion (325), lever handle (482) is forced against an interior wall of wide portion (324), preventing bias spring (428) from driving actuation assembly (48) and slidable beam assembly (430) into the inactivated. In other words, when lever handle (482) is rotated within wide portion (324) to the position shown in FIG. 35D, slidable beam assembly (430) and actuation assembly (480) is effectively locked in the activated position.

As shown in FIG. 34D, a user may then activate lift mechanism (360) in order to lower actuating mobility assembly (400) in the vertical direction until table assembly (314) is in a completely lowered position. Since arched ends (436, 438) are longitudinally aligned with respective engagement arms (398, 358), arched ends (436, 438) of downwardly presented forks (432, 434) eventually make contact with engagement arms (398, 358). Contact between downwardly presented forks (432, 434) and engagement arms (398, 358) pivots wheel assemblies (390, 350) about their respective pivot mounts (396, 356), such that wheels (392, 352) eventually extend through recesses (320) of base plate (318). At this stage, wheels (392, 352) define a gap distance (d) between base plate (318) and ground (G). Thus, wheels (392, 352) support examination table (300) in this state, and a user may push or pull examination table (300) on wheels (392, 352) to easily move examination table (300).

FIG. 35E shows actuation assembly (480) while actuation mobility assembly (400) is in the position shown in FIG. 34D. because table assembly (314) is the completely lowered position, sliding body (502) is in the raised vertical position due to the bottom portion of sliding body (502) abutting against fixed plate (376). Cam roller (504) abuts against camming arm (490) of actuation assembly (480), which in turn rotates lever handle (482) to align with narrow portion (323) of L-shaped handle path (325). It should be understood that lever handle (482) no longer abuts against an interior wall of wide portion (324). However, actuation assembly (480) and slidable bar assembly (430) is still held in the activated position due to contact between engagement arms (398, 358) and downwardly presented forks (432, 434) overcoming the bias force of bias spring (428).

Gap distance (d) could be dimensioned in order to prevent examination table (300) from being taken out of an examination room. For example, some examination rooms may have boundary strips located at the threshold of a doorway. Such strips may extend upwardly from the ground a certain distance (e.g., approximately 1 inch). Gap distance (d) may be smaller than the distance defined by such strips. Thus, if a user attempted to move examination table (300) outside of examination room, base member (316) would abut against the strip, thereby preventing removal of examination table (300) from the examination room. Of course, any other suitable gap distance (d) may be utilized as will be apparent to one having ordinary skill in the art in view of the teachings herein. For example, gap distance (d) could be dimensioned larger than the thickness of boundary strips located at the threshold of a doorway. Moreover, some examination rooms may lack boundary strips at doorways, such that the gap distance (d) will not affect the ability to move examination table (300) through a doorway to exit an examination room. It should therefore be understood that the inventors contemplate the ability to move examination table (300) outside of an examination room in some instances.

Figure 35F:
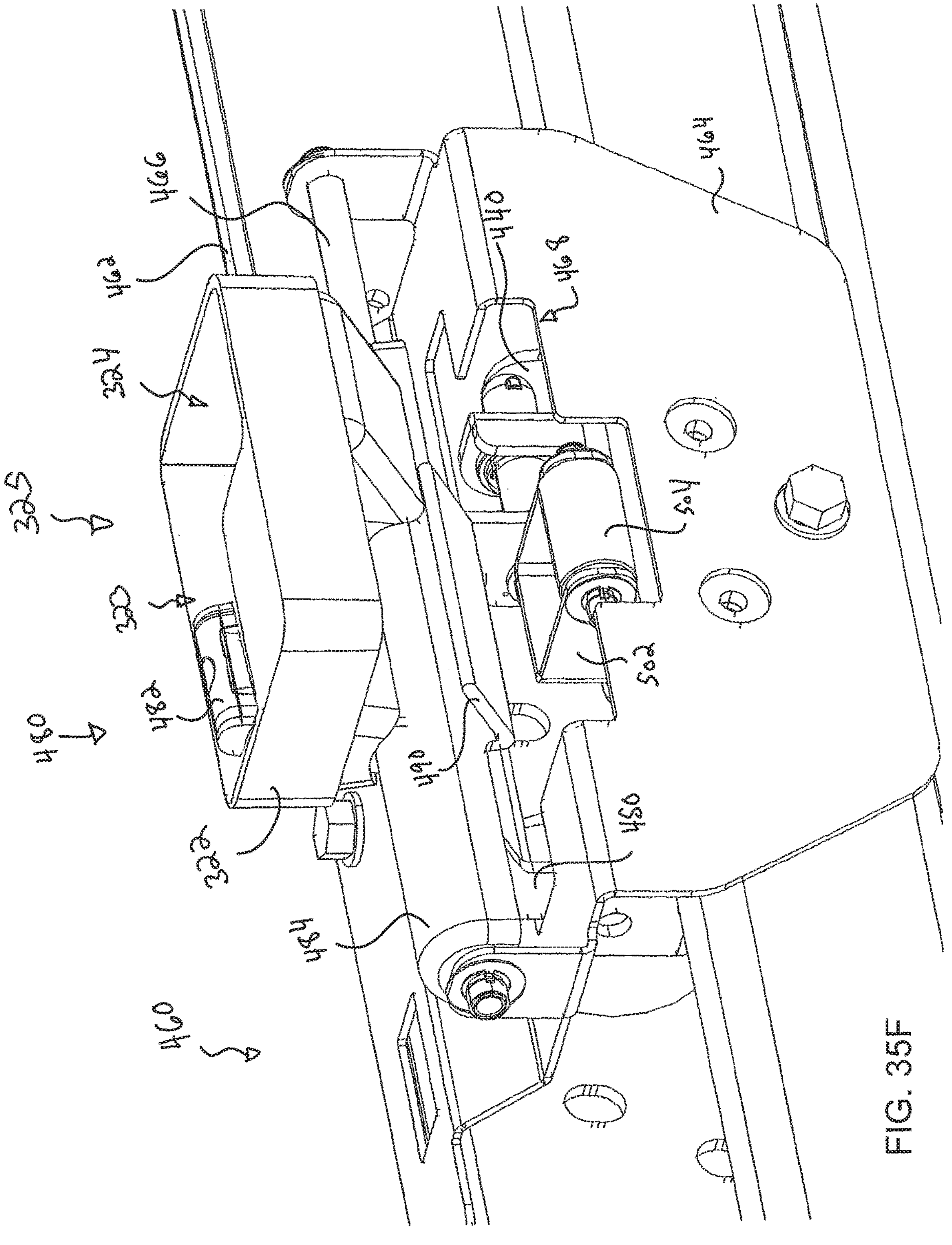
FIG. 35F depicts a perspective view of the actuating mounting frame of FIG. 26 and the actuation assembly of FIG. 28, where the lock release of the actuating mounting frame is in the lowered position and the actuation assembly is in the first position within a portion of the table assembly.

After examination table (300) has been moved (e.g., for cleaning the floor under examination table (300)) and then repositioned to the location where it is intended to be used for patient examinations, the user may activate lift mechanism (360) in order to raise actuating mobility assembly (400) in the vertical direction to the position shown in FIG. 34E. This will cause forks (432, 434) to relieve the downwardly exerted forces against engagement arms (358, 398). As the downwardly exerted forces against engagement arms (358, 398) are relieved, the weight of examination table (300) will cause wheel assemblies (350, 390) to pivot back to the positions shown in FIG. 34C, such that examination table (300) will once again be supported by base plate (318), without wheels (392, 352) contacting the ground (G). Because engagement arms (358, 398) no longer contact forks (432, 434), and because lever handle (482) is aligned with narrow portion (323) of L-shaped handle portion (325), bias spring (428) drives slidable beam (430) and actuation assembly (480) into the inactivated position as shown in FIGS. 34E and 35F. As a result, forks (432, 434) are no longer aligned with engagement arms (358, 398). The user may then return examination table (300) to the lowered configuration as shown in FIG. 34A.

Some versions of examination table (100, 300) may include a lockout feature that selectively prevents movement of slidable beam (230, 430) within guide channel (216, 416). By way of example only, the lockout feature may be configured to prevent movement of slidable beam (230, 430) within guide channel (216, 416) when table assembly (114, 314) is raised beyond a certain distance relative to base assembly (112, 312). In addition or in the alternative, a lockout feature may be configured to prevent movement of slidable beam (230, 430) within guide channel (216, 416) when a weight sensor in examination table (100, 300) senses the weight of a patient on table assembly (114, 314). Other suitable conditions that may be used to trigger a lockout feature will be apparent to those of ordinary skill in the art in view of the teachings herein. Similarly, various suitable components and configurations that may be used to incorporate a lockout feature into examination table (100, 300) will be apparent to those of ordinary skill in the art in view of the teachings herein.

As another merely illustrative variation, examination table (100, 300) may include a feature that prevents a patient from getting onto table assembly (114, 314) when wheels (192, 152, 392, 352) are supporting examination table (100, 300). By way of example only, examination table (100, 300) may include a gate feature that is activated to prevent access to support surface (130, 330) when wheels (192, 152, 392, 352) are supporting examination table (100, 300). As another merely illustrative example, examination table (100, 300) may include an audible and/or visual alarm to indicate to a patient that they should not get on table assembly (114, 314) when wheels (192, 152, 392, 352) are supporting examination table (100, 300). Such an alarm may be triggered once or more than once (e.g., periodically) as soon as wheels (192, 152, 392, 352) are supporting examination table (100, 300). As yet another variation, such an alarm may be triggered in response to data from a weight sensor detecting a patient attempting to get onto table assembly (114, 314) when wheels (192, 152, 392, 352) are supporting examination table (100, 300). Other suitable features that may be used to prevent a patient from getting onto table assembly (114, 314) when wheels (192, 152, 392, 352) are supporting examination table (100, 300) will be apparent to those of ordinary skill in the art in view of the teachings herein.

III. Exemplary Combinations

The following examples relate to various non-exhaustive ways in which the teachings herein may be combined or applied. It should be understood that the following examples are not intended to restrict the coverage of any claims that may be presented at any time in this application or in subsequent filings of this application. No disclaimer is intended. The following examples are being provided for nothing more than merely illustrative purposes. It is contemplated that the various teachings herein may be arranged and applied in numerous other ways. It is also contemplated that some variations may omit certain features referred to in the below examples. Therefore, none of the aspects or features referred to below should be deemed critical unless otherwise explicitly indicated as such at a later date by the inventors or by a successor in interest to the inventors. If any claims are presented in this application or in subsequent filings related to this application that include additional features beyond those referred to below, those additional features shall not be presumed to have been added for any reason relating to patentability.

Example 1

A medical examination table, wherein the medical examination is operable to transition between a first mobility configuration and a second mobility configuration, the medical examination table comprising: (a) a base assembly configured to support the medical examination table in the first mobility configuration; (b) a table assembly; (c) a table actuation assembly connected to the base assembly and the table assembly, wherein the table actuation assembly is configured to raise and lower the table assembly relative to the base member to thereby transition the table assembly between a lowered position and a raised position; (d) a wheel assembly associated with the base assembly, wherein the wheel assembly is configured to support the medical examination table in the second mobility configuration; and (e) an actuating mobility assembly associated with the table assembly, wherein the actuating mobility assembly is configured to cooperate with the table actuation assembly to thereby actuate the wheel assembly relative to the base assembly to thereby transition the medical examination table between the first mobility configuration to the second mobility configuration.

Example 2

The medical examination table of Example 1, wherein the wheel assembly comprises a front wheel assembly and a rear wheel assembly.

Example 3

The medical examination table of Example 2, wherein the front wheel assembly and the rear wheel assembly are pivotally connected to the base assembly.

Example 4

The medical examination table of Example 3, wherein the front wheel assembly comprises a first engagement arm, wherein the rear wheel assembly comprises a second engagement arm.

Example 5

The medical examination table of Example 4, wherein the actuating mobility assembly is configured to contact the first engagement arm and the second engagement arm to rotate the front wheel assembly and the rear wheel assembly such that the medical examination table moves from the first mobility configuration to the second mobility configuration.

Example 6

The medical examination table of any one or more of Examples 1 through 5, wherein the actuating mobility assembly comprises a downwardly presented fork slidably coupled with the table assembly.

Example 7

The medical examination table of Example 6, wherein the downwardly presented fork is configured to translate from an inactivated state to an activated state.

Example 8

The medical examination table of Example 7, wherein the downwardly presented fork is configured to align with the wheel assembly in the activated state.

Example 9

The medical examination table of Example 8, wherein the downwardly presented fork is configured to contact the wheel assembly when the table assembly actuates from the raised position toward the lowered position while the downwardly presented fork is in the activated state.

Example 10

The medical examination table of any one or more of Examples 1 through 9, wherein the base member comprises a base plate defining a plurality of recesses, wherein the base plate is configured to support the medical examination table in the first mobility configuration.

Example 11

The medical examination table of Example 10, wherein the wheel assembly is configured to be housed within the base member while the medical examination table is in the first mobility configuration.

Example 12

The medical examination table of Example 11, wherein the wheel assembly is configured to extend through the plurality of recesses while the medical examination table is in the second mobility configuration.

Example 13

The medical examination table of Example 12, wherein the wheel assembly and the base plate are configured to define a gap while the medical examination table is in the second mobility configuration.

Example 14

The medical examination table of any one or more of Examples 1 through 13, further comprising a control module configured to activate the actuating mobility assembly.

Example 15

The medical examination table of Example 14, wherein the control module is further configured to activate the table actuation assembly.

Example 16

The medical examination table of any one or more of Examples 1 through 15, wherein the wheel assembly comprises a swivel caster.

Example 17

A medical examination table, wherein the medical examination is operable to transition between a first mobility configuration and a second mobility configuration, the medical examination table comprising: (a) a base assembly configured to support the medical examination table in the first mobility configuration; (b) a table assembly; (c) a table actuation assembly connected to the base assembly and the table assembly, wherein the table actuation assembly is configured to raise and lower the table assembly relative to the base member to thereby transition the table assembly between a lowered position and a raised position; (d) a wheel assembly associated with the base assembly, wherein the wheel assembly is configured to support the medical examination table in a second mobility configuration; and (e) an actuating mobility assembly associated with the table assembly, wherein the actuating mobility assembly is configured to actuate relative to the table assembly from an inactivated state to an activated state, wherein the actuating mobility assembly is configured to move the medical examination table from the first mobility configuration to the second mobility configuration in response to the table assembly descending to the lowered position while the actuating mobility assembly is in the activated state.

Example 18

The medical examination table of Example 17, wherein the medical examination table comprises an actuation assembly configured to move the actuating mobility assembly from the inactivated state to the activated state.

Example 19

The medical examination table of Example 18, further comprising a control module configured to activate the actuation assembly to move the actuation mobility assembly from the inactivated state to the activated state.

Example 20

A medical examination table, wherein the medical examination is operable to transition between a first mobility configuration and a second mobility configuration, the medical examination table comprising: (a) a base assembly configured to support the medical examination table in the first mobility configuration; (b) a table assembly; (c) a table actuation assembly connected to the base assembly and the table assembly, wherein the table actuation assembly is configured to raise and lower the table assembly relative to the base member from a lowered position to a raised position; (d) a wheel assembly associated with the base assembly, wherein the wheel assembly is configured to support the medical examination table in the second mobility configuration; and (e) an actuating mobility assembly slidably coupled with the table assembly, wherein the actuating mobility assembly is operable to transition the medical examination table from the first mobility configuration to the second mobility configuration in response to the table assembly descending from the raised position to the lowered position.

IV. Miscellaneous

Having shown and described various embodiments of the present invention, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometrics, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

I claim:

1. A medical examination table, wherein the medical examination table is operable to transition between a first mobility configuration and a second mobility configuration, the medical examination table comprising: (a) a base assembly configured to support the medical examination table in the first mobility configuration, wherein the base assembly includes a base member; (b) a table assembly; (c) a table actuation assembly connected to the base assembly and the table assembly, wherein the table actuation assembly is configured to raise and lower the table assembly relative to the base member to thereby transition the table assembly between a lowered position and a raised position; (d) a wheel assembly associated with the base assembly, wherein the wheel assembly is configured to support the medical examination table in the second mobility configuration; and (e) an actuating mobility assembly associated with the table assembly, wherein the actuating mobility assembly is configured to cooperate with the table actuation assembly to thereby actuate the wheel assembly relative to the base assembly to thereby transition the medical examination table between the first mobility configuration to the second mobility configuration, wherein the actuating mobility assembly comprises a cylindrical actuating member coupled with the table assembly, wherein the actuating mobility assembly comprises a lever handle extending upwardly and directly coupled to the cylindrical actuating member.

2. The medical examination table of claim 1, wherein the wheel assembly comprises a front wheel assembly and a rear wheel assembly.

3. The medical examination table of claim 2, wherein the front wheel assembly and the rear wheel assembly are pivotally connected to the base assembly.

4. The medical examination table of claim 3, wherein the front wheel assembly comprises a first engagement arm, wherein the rear wheel assembly comprises a second engagement arm.

5. The medical examination table of claim 4, wherein the actuating mobility assembly is configured to contact the first engagement arm and the second engagement arm to rotate the front wheel assembly and the rear wheel assembly such that the medical examination table moves from the first mobility configuration to the second mobility configuration.

6. The medical examination table of claim 1, wherein the lever handle is configured to translate the cylindrical actuating member from an inactivated state to an activated state.

7. The medical examination table of claim 6, wherein in the activated state, the lever handle is configured to lock the cylindrical actuating member in the activated state.

8. The medical examination table of claim 7, wherein the actuation mobility assembly further comprises a slide bar, wherein the lever handle is configured to drive the cylindrical actuating member in a linear direction along the slide bar and in a rotational direction about a longitudinal axis of the slide bar.

9. The medical examination table of claim 1, wherein the base member comprises a base plate defining a plurality of recesses, wherein the base plate is configured to support the medical examination table in the first mobility configuration.

10. The medical examination table of claim 9, wherein the wheel assembly is configured to be housed within the base member while the medical examination table is in the first mobility configuration.

11. The medical examination table of claim 10, wherein the wheel assembly is configured to extend through the plurality of recesses while the medical examination table is in the second mobility configuration.

12. The medical examination table of claim 11, wherein the wheel assembly and the base plate are configured to define a gap while the medical examination table is in the second mobility configuration.

13. The medical examination table of claim 1, further comprising a control module configured to activate the actuating mobility assembly.

14. The medical examination table of claim 13, wherein the control module is further configured to activate the table actuation assembly.

15. The medical examination table of claim 1, wherein the wheel assembly comprises a swivel caster.

16. A medical examination table, wherein the medical examination table is operable to transition between a first mobility configuration and a second mobility configuration, the medical examination table comprising: (a) a base assembly configured to support the medical examination table in the first mobility configuration, wherein the base assembly includes a base member; (b) a table assembly; (c) a table actuation assembly connected to the base assembly and the table assembly, wherein the table actuation assembly is configured to raise and lower the table assembly relative to the base member to thereby transition the table assembly between a lowered position and a raised position; (d) a wheel assembly associated with the base assembly, wherein the wheel assembly is configured to support the medical examination table in the second mobility configuration; and (e) an actuating mobility assembly associated with the table assembly, comprising: (i) a beam mounting frame, (ii) a slidable beam assembly, and (iii) an actuating mounting frame, wherein the beam mounting frame and the actuating mounting frame are fixed relative to each other and are fixed to the table assembly, wherein the actuating mobility assembly is configured to actuate relative to the table assembly from an inactivated state to an activated state, wherein the actuating mobility assembly is configured to move the medical examination table from the first mobility configuration to the second mobility configuration in response to the table assembly descending to the lowered position while the actuating mobility assembly is in the activated state, wherein the medical examination table comprises an actuation assembly configured to translate the slidable beam assembly in order to move the actuating assembly from the inactivated state to the activated state.

17. The medical examination table of claim 16, further comprising a control module configured to translate the slidable beam assembly in order to move the actuating mobility assembly from the inactivated state to the activated state.

* * * * *